United States Patent
Mandella et al.

(10) Patent No.: US 10,191,559 B2
(45) Date of Patent: Jan. 29, 2019

(54) COMPUTER INTERFACE FOR MANIPULATED OBJECTS WITH AN ABSOLUTE POSE DETECTION COMPONENT

(71) Applicant: Electronic Scripting Products, Inc., Palo Alto, CA (US)

(72) Inventors: Michael J. Mandella, Palo Alto, CA (US); Hector H. Gonzalez-Banos, Mountain View, CA (US); Marek Alboszta, Montara, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 0 days.

(21) Appl. No.: 15/914,797

(22) Filed: Mar. 7, 2018

(65) Prior Publication Data

US 2018/0217673 A1 Aug. 2, 2018

Related U.S. Application Data

(60) Continuation of application No. 14/922,748, filed on Jan. 11, 2016, now Pat. No. 9,939,911, which is a (Continued)

(51) Int. Cl.
*G06F 3/01* (2006.01)
*G01B 21/04* (2006.01)
(Continued)

(52) U.S. Cl.
CPC .............. *G06F 3/017* (2013.01); *A63F 13/20* (2014.09); *A63F 13/211* (2014.09); (Continued)

(58) Field of Classification Search
CPC combination set(s) only.
See application file for complete search history.

(56) References Cited

U.S. PATENT DOCUMENTS

| 3,028,500 A | 4/1962 | Wallmark |
| 3,209,201 A | 9/1965 | Anger |
| (Continued) | | |

FOREIGN PATENT DOCUMENTS

| EP | 0649549 B1 | 2/1997 |
| EP | 1128319 A1 | 1/2001 |
| (Continued) | | |

OTHER PUBLICATIONS

Kanatani, K., "Geometric Computation for Machine Vision", 1993, Oxford Engineering Science Series 37, Chapters 2-3.
(Continued)

*Primary Examiner* — Anand P Bhatnagar
(74) *Attorney, Agent, or Firm* — Marek Alboszta

(57) ABSTRACT

A manipulated object using high optical contrast features and an on-board photodetector that detects light produced, reflected or scattered by the features and outputs data indicative thereof. The manipulated object uses one or more controllers to determine its position and/or orientation, including full pose, in the real three-dimensional environment based on data from the photodetector. Data from one or more auxiliary motion sensing devices, e.g., a relative motion sensor such as an inertial device or other auxiliary motion device relying on acoustics, optics or electromagnetic waves within or outside the visible spectrum, can be used to supplement the position and/or orientation data from the photodetector. The manipulated object can be embodied by any suitable device manipulated by a user, including a tablet computer or a phone.

27 Claims, 29 Drawing Sheets

Related U.S. Application Data continuation of application No. 14/551,367, filed on Nov. 24, 2014, now Pat. No. 9,235,934, which is a continuation of application No. 13/889,748, filed on May 8, 2013, now Pat. No. 8,897,494, which is a division of application No. 13/134,006, filed on May 25, 2011, now Pat. No. 8,553,935, which is a division of application No. 12/586,226, filed on Sep. 18, 2009, now Pat. No. 7,961,909, which is a continuation-in-part of application No. 12/584,402, filed on Sep. 3, 2009, now Pat. No. 7,826,641, which is a continuation-in-part of application No. 11/591,403, filed on Oct. 31, 2006, now Pat. No. 7,729,515, and a continuation-in-part of application No. 10/769,484, filed on Jan. 30, 2004, now Pat. No. 8,542,219.

(60) Provisional application No. 60/780,937, filed on Mar. 8, 2006.

(51) Int. Cl.
  *G06F 3/03* (2006.01)
  *G06F 3/0346* (2013.01)
  *G06F 3/0354* (2013.01)
  *G06F 3/0481* (2013.01)
  *G06K 9/22* (2006.01)
  *G02B 27/01* (2006.01)
  *G06T 19/00* (2011.01)
  *A63F 13/20* (2014.01)
  *A63F 13/428* (2014.01)
  *A63F 13/211* (2014.01)
  *A63F 13/213* (2014.01)
  *A63F 13/812* (2014.01)
  *G06F 3/0484* (2013.01)
  *G06T 7/73* (2017.01)

(52) U.S. Cl.
  CPC .......... *A63F 13/213* (2014.09); *A63F 13/428* (2014.09); *A63F 13/812* (2014.09); *G01B 21/04* (2013.01); *G02B 27/0172* (2013.01); *G06F 3/01* (2013.01); *G06F 3/0304* (2013.01); *G06F 3/0317* (2013.01); *G06F 3/0325* (2013.01); *G06F 3/0346* (2013.01); *G06F 3/03545* (2013.01); *G06F 3/04815* (2013.01); *G06F 3/04845* (2013.01); *G06K 9/22* (2013.01); *G06T 7/73* (2017.01); *G06T 19/006* (2013.01); *G02B 2027/0178* (2013.01); *G06F 2203/04806* (2013.01); *G06T 2207/30241* (2013.01)

(56) References Cited

U.S. PATENT DOCUMENTS

| | | |
|---|---|---|
| 3,370,460 A | 2/1968 | Haake et al. |
| 3,678,283 A | 7/1972 | LaBaw |
| 3,918,814 A | 11/1975 | Weiser |
| 4,070,649 A | 1/1978 | Wright, Jr. et al. |
| 4,471,162 A | 9/1984 | Aono et al. |
| 4,495,646 A * | 1/1985 | Gharachorloo .......... G06K 9/24 382/188 |
| 4,649,504 A | 3/1987 | Krouglicof et al. |
| 4,749,849 A | 6/1988 | Hoeberechts et al. |
| 4,777,329 A | 10/1988 | Mallicoat |
| 4,877,951 A | 10/1989 | Muro |
| 4,885,433 A | 12/1989 | Schier |
| 5,005,979 A * | 4/1991 | Sontag ................. G01B 11/002 250/458.1 |
| 5,059,789 A * | 10/1991 | Salcudean ............ G01B 11/002 250/206.1 |
| 5,103,486 A | 4/1992 | Grippi |
| 5,166,668 A | 11/1992 | Aoyagi |
| 5,215,397 A | 6/1993 | Taguchi et al. |
| 5,226,091 A | 7/1993 | Howell |
| 5,237,647 A | 8/1993 | Roberts et al. |
| 5,294,792 A | 3/1994 | Lewis et al. |
| 5,321,416 A | 6/1994 | Bassett et al. |
| 5,333,209 A | 7/1994 | Sinden et al. |
| 5,388,059 A * | 2/1995 | DeMenthon .............. G06T 7/70 702/152 |
| 5,398,691 A | 3/1995 | Martin et al. |
| 5,434,371 A | 7/1995 | Brooks |
| 5,477,012 A | 12/1995 | Sekendur |
| 5,484,966 A | 1/1996 | Segen |
| 5,517,579 A | 5/1996 | Baron et al. |
| 5,533,141 A | 7/1996 | Futatsugi et al. |
| 5,544,255 A | 8/1996 | Smithies et al. |
| 5,548,092 A | 8/1996 | Shriver |
| 5,577,135 A | 11/1996 | Grajski et al. |
| 5,581,276 A | 12/1996 | Cipolla et al. |
| 5,587,558 A | 12/1996 | Matsushima |
| 5,588,139 A | 12/1996 | Lanier et al. |
| 5,592,401 A * | 1/1997 | Kramer .............. A63B 69/3608 340/524 |
| 5,615,132 A | 3/1997 | Horton et al. |
| 5,640,589 A | 6/1997 | Takayama et al. |
| 5,645,077 A | 7/1997 | Foxlin |
| 5,647,017 A | 7/1997 | Smithies et al. |
| 5,652,412 A | 7/1997 | Lazzouni et al. |
| 5,661,506 A | 8/1997 | Lazzouni et al. |
| 5,694,153 A * | 12/1997 | Aoyagi ................. G05G 9/047 345/156 |
| 5,717,168 A | 2/1998 | DeBuisser et al. |
| 5,737,740 A | 4/1998 | Henderson et al. |
| 5,742,264 A | 4/1998 | Inagaki et al. |
| 5,748,808 A | 5/1998 | Taguchi et al. |
| 5,750,939 A | 5/1998 | Makinwa et al. |
| 5,768,417 A | 6/1998 | Errico et al. |
| 5,774,602 A | 6/1998 | Taguchi et al. |
| 5,781,661 A | 7/1998 | Hiraiwa et al. |
| 5,812,269 A | 9/1998 | Svetkoff et al. |
| 5,818,955 A | 10/1998 | Smithies et al. |
| 5,850,058 A | 12/1998 | Tano et al. |
| 5,852,434 A | 12/1998 | Sekendur |
| 5,856,844 A * | 1/1999 | Batterman .............. G01S 5/163 345/158 |
| 5,869,834 A | 2/1999 | Wipenmnyr |
| 5,870,492 A | 2/1999 | Shimizu et al. |
| 5,884,239 A | 3/1999 | Romanik |
| 5,889,505 A | 3/1999 | Toyama et al. |
| 5,902,968 A | 5/1999 | Sato et al. |
| 5,923,318 A | 7/1999 | Zhai et al. |
| 5,930,380 A | 7/1999 | Kashi et al. |
| 5,939,702 A | 8/1999 | Knighton et al. |
| 5,945,981 A | 8/1999 | Paull et al. |
| 5,959,617 A | 9/1999 | Bird et al. |
| 5,960,124 A | 9/1999 | Taguchi et al. |
| 5,977,958 A | 11/1999 | Baron et al. |
| 5,981,884 A | 11/1999 | Sato et al. |
| 6,009,210 A | 12/1999 | Kang |
| 6,023,275 A | 2/2000 | Horvitz et al. |
| 6,028,955 A | 2/2000 | Cohen et al. |
| 6,031,936 A | 2/2000 | Nakamura |
| 6,044,165 A | 3/2000 | Perona et al. |
| 6,050,490 A | 4/2000 | Leichner et al. |
| 6,064,751 A | 5/2000 | Smithies et al. |
| 6,081,261 A | 6/2000 | Wolff et al. |
| 6,084,985 A | 7/2000 | Dofting et al. |
| 6,091,835 A | 7/2000 | Smithies et al. |
| 6,100,877 A | 8/2000 | Chery et al. |
| 6,104,387 A | 8/2000 | Chery et al. |
| 6,104,388 A | 8/2000 | Nagai et al. |
| 6,108,444 A | 8/2000 | Syeda-Mahmood |
| 6,111,565 A | 8/2000 | Chery et al. |
| 6,124,847 A | 9/2000 | Chery et al. |
| 6,130,666 A | 10/2000 | Persidsky |
| 6,147,681 A | 11/2000 | Chery et al. |
| 6,153,836 A | 11/2000 | Goszyk |
| 6,167,376 A | 12/2000 | Ditzik |
| 6,176,837 B1 | 1/2001 | Foxlin |

(56) References Cited

U.S. PATENT DOCUMENTS

| | | |
|---|---|---|
| 6,177,927 B1 | 1/2001 | Chery et al. |
| 6,181,329 B1 | 1/2001 | Stork et al. |
| 6,184,873 B1 | 2/2001 | Ward et al. |
| 6,188,392 B1 | 2/2001 | O'Connor et al. |
| 6,195,475 B1 * | 2/2001 | Beausoleil, Jr. ........ H04N 1/047 |
| | | 382/312 |
| 6,208,330 B1 | 3/2001 | Hasegawa et al. |
| 6,212,296 B1 | 4/2001 | Stork et al. |
| 6,213,398 B1 | 4/2001 | Southworth et al. |
| 6,243,503 B1 | 6/2001 | Teufel et al. |
| 6,249,274 B1 | 6/2001 | Svancarek et al. |
| 6,262,719 B1 | 7/2001 | Bi et al. |
| 6,292,177 B1 | 9/2001 | Holtzman et al. |
| 6,303,921 B1 | 10/2001 | Hastings et al. |
| 6,324,296 B1 | 11/2001 | McSheery et al. |
| 6,330,359 B1 | 12/2001 | Kawabata |
| 6,334,003 B1 | 12/2001 | Yokota |
| 6,335,723 B1 | 1/2002 | Wood et al. |
| 6,335,724 B1 | 1/2002 | Takekawa et al. |
| 6,335,727 B1 | 1/2002 | Morishita et al. |
| 6,342,917 B1 | 1/2002 | Amenta |
| 6,348,914 B1 | 2/2002 | Tuli |
| 6,366,697 B1 | 4/2002 | Goldberg et al. |
| 6,373,047 B1 | 4/2002 | Adan et al. |
| 6,375,572 B1 | 4/2002 | Masuyama et al. |
| 6,396,481 B1 | 5/2002 | Challa et al. |
| 6,414,673 B1 | 7/2002 | Wood et al. |
| 6,415,256 B1 | 7/2002 | Ditzik |
| 6,417,836 B1 | 7/2002 | Kumar et al. |
| 6,421,042 B1 | 7/2002 | Omura et al. |
| 6,422,775 B1 | 7/2002 | Bramlett et al. |
| 6,424,340 B1 | 7/2002 | Holtzman et al. |
| 6,429,856 B1 | 8/2002 | Omura et al. |
| 6,437,314 B1 | 8/2002 | Usuda et al. |
| 6,454,482 B1 * | 9/2002 | Silverbrook ........ B41J 2/17503 |
| | | 345/140.1 |
| 6,456,749 B1 | 9/2002 | Kasabach et al. |
| 6,474,159 B1 | 11/2002 | Foxlin et al. |
| 6,474,888 B1 | 11/2002 | Lapstun et al. |
| 6,492,981 B1 | 12/2002 | Stork et al. |
| 6,493,736 B1 | 12/2002 | Forcier |
| 6,502,114 B1 | 12/2002 | Forcier |
| 6,556,190 B2 | 4/2003 | Fleck et al. |
| 6,565,611 B1 | 5/2003 | Wilcox et al. |
| 6,573,887 B1 | 6/2003 | Odonnell, Jr. |
| 6,577,299 B1 | 6/2003 | Schiller et al. |
| 6,587,809 B2 | 7/2003 | Majoe |
| 6,592,039 B1 | 7/2003 | Smith et al. |
| 6,625,296 B2 | 9/2003 | Price et al. |
| 6,625,299 B1 | 9/2003 | Meisner et al. |
| 6,627,870 B1 | 9/2003 | Lapstun et al. |
| 6,628,847 B1 | 9/2003 | Kasabach et al. |
| 6,641,482 B2 | 11/2003 | Masuyama et al. |
| 6,650,320 B1 | 11/2003 | Zimmerman |
| 6,661,920 B1 | 12/2003 | Skinner |
| 6,681,629 B2 | 1/2004 | Foxlin et al. |
| 6,686,579 B2 | 2/2004 | Fagin et al. |
| 6,686,910 B2 | 2/2004 | Odonnell, Jr. |
| 6,687,876 B1 | 2/2004 | Schilit et al. |
| 6,689,966 B2 | 2/2004 | Wiebe |
| 6,720,949 B1 | 4/2004 | Pryor et al. |
| 6,724,930 B1 * | 4/2004 | Kosaka ............... G01B 11/002 |
| | | 382/154 |
| 6,727,885 B1 | 4/2004 | Ishino et al. |
| 6,747,690 B2 | 6/2004 | Molgaard |
| 6,750,848 B1 | 6/2004 | Pryor |
| 6,753,828 B2 | 6/2004 | Tuceryan et al. |
| 6,781,133 B2 | 8/2004 | Karplus et al. |
| 6,797,895 B2 * | 9/2004 | Lapstun ............. G06F 3/03545 |
| | | 178/18.03 |
| 6,798,403 B2 | 9/2004 | Kitada et al. |
| 6,811,489 B1 | 11/2004 | Shimizu et al. |
| 6,842,175 B1 | 1/2005 | Schmalstieg et al. |
| 6,844,871 B1 | 1/2005 | Hinckley et al. |
| 6,852,032 B2 | 2/2005 | Ishino |
| 6,922,632 B2 | 7/2005 | Foxlin |
| 6,952,003 B2 | 10/2005 | Skurnik et al. |
| 6,952,026 B2 | 10/2005 | Lindholm |
| 6,982,697 B2 * | 1/2006 | Wilson .................... G08C 17/00 |
| | | 345/156 |
| 6,993,206 B2 | 1/2006 | Ishino et al. |
| 6,995,445 B2 | 2/2006 | Forrest et al. |
| 7,000,469 B2 | 2/2006 | Foxlin et al. |
| 7,022,966 B2 | 4/2006 | Gonzo et al. |
| 7,061,429 B2 * | 6/2006 | Fager .................... G01S 5/0018 |
| | | 342/463 |
| 7,063,256 B2 | 6/2006 | Anderson et al. |
| 7,088,440 B2 | 8/2006 | Buermann et al. |
| 7,102,616 B1 | 9/2006 | Sleator |
| 7,110,100 B2 | 9/2006 | Buermann et al. |
| 7,120,875 B2 | 10/2006 | Daily et al. |
| 7,139,983 B2 | 11/2006 | Kelts |
| 7,158,118 B2 | 1/2007 | Liberty |
| 7,203,384 B2 | 4/2007 | Carl |
| 7,215,322 B2 | 5/2007 | Genc et al. |
| 7,236,156 B2 | 6/2007 | Liberty et al. |
| 7,268,774 B2 | 9/2007 | Pittel et al. |
| 7,279,646 B2 | 10/2007 | Xu |
| 7,379,841 B2 | 5/2008 | Ohta |
| 7,414,611 B2 | 8/2008 | Liberty |
| 7,424,388 B2 | 9/2008 | Sato |
| 7,445,550 B2 | 11/2008 | Barney et al. |
| 7,474,809 B2 * | 1/2009 | Carl ...................... G06F 3/0325 |
| | | 382/188 |
| 7,477,780 B2 | 1/2009 | Boncyk et al. |
| 7,500,917 B2 | 3/2009 | Barney et al. |
| 7,566,858 B2 * | 7/2009 | Hotelling ............... G08C 23/04 |
| | | 250/208.2 |
| 7,567,701 B2 | 7/2009 | Fontius |
| 7,596,466 B2 | 9/2009 | Ohta |
| 7,596,767 B2 | 9/2009 | Wilson |
| 7,629,974 B2 | 12/2009 | Ohta |
| 7,655,937 B2 | 2/2010 | Hotelling et al. |
| 7,690,994 B2 | 4/2010 | Dohta |
| 7,714,895 B2 | 5/2010 | Pretlove et al. |
| 7,716,008 B2 | 5/2010 | Ohta |
| 7,729,515 B2 | 6/2010 | Mandella et al. |
| 7,760,194 B2 | 7/2010 | Sakurai |
| 7,768,498 B2 | 8/2010 | Wey |
| 7,775,439 B2 | 8/2010 | Kimber et al. |
| 7,778,444 B2 | 8/2010 | Lee et al. |
| 7,831,064 B2 | 11/2010 | Ohta |
| 7,833,100 B2 | 11/2010 | Dohta |
| 7,834,848 B2 | 11/2010 | Ohta |
| 7,872,638 B2 | 1/2011 | Sato |
| 7,880,726 B2 | 2/2011 | Nakadaira et al. |
| 7,896,733 B2 | 3/2011 | Tanabe |
| 7,927,216 B2 | 4/2011 | Ikeda et al. |
| 7,931,535 B2 | 4/2011 | Ikeda et al. |
| 7,942,745 B2 | 5/2011 | Ikeda et al. |
| 7,961,909 B2 | 6/2011 | Mandella et al. |
| 7,999,812 B2 | 8/2011 | Bassett et al. |
| 8,041,536 B2 | 10/2011 | Ohta |
| 8,102,365 B2 | 1/2012 | Alten |
| 8,106,884 B2 | 1/2012 | Nam et al. |
| 8,384,665 B1 | 2/2013 | Powers, III et al. |
| 8,542,219 B2 | 9/2013 | Carl et al. |
| 9,235,934 B2 | 1/2016 | Mandella et al. |
| 2001/0020936 A1 | 9/2001 | Tsuji |
| 2001/0043737 A1 | 11/2001 | Rogina et al. |
| 2002/0001029 A1 | 1/2002 | Abe |
| 2002/0028017 A1 | 3/2002 | Munich et al. |
| 2002/0048404 A1 | 4/2002 | Fahraeus et al. |
| 2002/0049530 A1 | 4/2002 | Poropat |
| 2002/0105484 A1 | 8/2002 | Navab et al. |
| 2002/0118181 A1 | 8/2002 | Sekendur |
| 2002/0145587 A1 | 10/2002 | Watanabe |
| 2002/0148655 A1 | 10/2002 | Cho et al. |
| 2002/0158848 A1 | 10/2002 | Sekendur |
| 2002/0161290 A1 * | 10/2002 | Chance ............... A61B 5/14551 |
| | | 600/323 |
| 2002/0163511 A1 | 11/2002 | Sekendur |
| 2002/0180714 A1 | 12/2002 | Duret |
| 2003/0006973 A1 | 1/2003 | Omura et al. |

(56) References Cited

U.S. PATENT DOCUMENTS

| | | |
|---|---|---|
| 2003/0006975 A1 | 1/2003 | Moriya et al. |
| 2003/0014212 A1 | 1/2003 | Ralston et al. |
| 2003/0025713 A1 | 2/2003 | Wang et al. |
| 2003/0025951 A1 | 2/2003 | Pollard et al. |
| 2003/0029919 A1 | 2/2003 | Lynggaard et al. |
| 2003/0034961 A1 | 2/2003 | Kao |
| 2003/0038790 A1 | 2/2003 | Koyama et al. |
| 2003/0061188 A1 | 3/2003 | Wiebe et al. |
| 2003/0106985 A1 | 6/2003 | Fagin et al. |
| 2003/0107558 A1 | 6/2003 | Bryborn et al. |
| 2003/0146906 A1 | 8/2003 | Lin |
| 2003/0156145 A1 | 8/2003 | Hullender et al. |
| 2003/0163525 A1 | 8/2003 | Hendriks et al. |
| 2003/0195820 A1 | 10/2003 | Silverbrook et al. |
| 2003/0210228 A1 | 11/2003 | Ebersole et al. |
| 2004/0001647 A1 | 1/2004 | Lake et al. |
| 2004/0032970 A1 | 2/2004 | Kiraly |
| 2004/0104935 A1 | 6/2004 | Williamson et al. |
| 2004/0189675 A1 | 9/2004 | Pretlove et al. |
| 2004/0207597 A1 | 10/2004 | Marks |
| 2004/0258306 A1 | 12/2004 | Hashimoto |
| 2005/0059488 A1 | 3/2005 | Larsen et al. |
| 2005/0073508 A1* | 4/2005 | Pittel ............... G06F 1/3203 345/175 |
| 2005/0107979 A1 | 5/2005 | Buermann et al. |
| 2005/0123171 A1 | 6/2005 | Kobayashi et al. |
| 2005/0168437 A1 | 8/2005 | Carl et al. |
| 2005/0195387 A1 | 9/2005 | Zhang et al. |
| 2005/0280804 A1 | 12/2005 | Buermann et al. |
| 2006/0028457 A1 | 2/2006 | Burns |
| 2006/0082546 A1 | 4/2006 | Wey |
| 2006/0109245 A1 | 5/2006 | Wilson et al. |
| 2006/0152487 A1 | 7/2006 | Grunnet-Jepsen et al. |
| 2006/0152489 A1 | 7/2006 | Sweetser et al. |
| 2006/0173268 A1 | 8/2006 | Mullick et al. |
| 2006/0176287 A1 | 8/2006 | Pittel et al. |
| 2006/0176288 A1 | 8/2006 | Pittel et al. |
| 2006/0267940 A1 | 11/2006 | Groom et al. |
| 2007/0049374 A1 | 3/2007 | Ikeda et al. |
| 2007/0050597 A1 | 3/2007 | Ikeda |
| 2007/0060228 A1 | 3/2007 | Akasaka et al. |
| 2007/0060383 A1 | 3/2007 | Dohta |
| 2007/0060384 A1 | 3/2007 | Dohta |
| 2007/0060385 A1 | 3/2007 | Dohta |
| 2007/0072674 A1 | 3/2007 | Ohta et al. |
| 2007/0081695 A1 | 4/2007 | Foxlin et al. |
| 2007/0189737 A1 | 8/2007 | Chaudhri et al. |
| 2007/0211027 A1 | 9/2007 | Ohta |
| 2007/0213109 A1 | 9/2007 | Sato et al. |
| 2007/0222750 A1 | 9/2007 | Ohta |
| 2007/0256546 A1 | 11/2007 | Hikino et al. |
| 2007/0259717 A1 | 11/2007 | Mattice et al. |
| 2008/0096654 A1 | 4/2008 | Mondesir et al. |
| 2008/0100825 A1 | 5/2008 | Zalewski |
| 2008/0106517 A1* | 5/2008 | Kerr ............... G06F 3/0304 345/158 |
| 2008/0167818 A1 | 7/2008 | Kimber et al. |
| 2008/0192007 A1 | 8/2008 | Wilson |
| 2008/0192070 A1 | 8/2008 | Wilson |
| 2008/0204411 A1 | 8/2008 | Wilson |
| 2008/0272272 A1* | 11/2008 | Hotelilng ............... G08C 23/04 250/201.1 |
| 2008/0309511 A1 | 12/2008 | Kerr et al. |
| 2009/0066647 A1 | 3/2009 | Kerr et al. |
| 2009/0066648 A1 | 3/2009 | Kerr et al. |
| 2009/0122146 A1 | 5/2009 | Zalewski et al. |
| 2009/0153389 A1 | 6/2009 | Kerr et al. |
| 2009/0153475 A1 | 6/2009 | Kerr et al. |
| 2009/0153478 A1 | 6/2009 | Kerr et al. |
| 2009/0158203 A1 | 6/2009 | Kerr et al. |
| 2009/0158222 A1 | 6/2009 | Kerr et al. |
| 2009/0164952 A1 | 6/2009 | Wilson |
| 2009/0203445 A1 | 8/2009 | Dohta et al. |
| 2009/0326850 A1 | 12/2009 | Ohta |
| 2010/0208057 A1 | 8/2010 | Meier et al. |
| 2010/0277412 A1 | 11/2010 | Pryor |
| 2011/0222075 A1* | 9/2011 | Takahashi ............... G01S 17/46 356/623 |
| 2013/0201492 A1* | 8/2013 | Takahashi ............... G01S 14/46 356/623 |
| 2016/0252965 A1 | 9/2016 | Mandella et al. |

FOREIGN PATENT DOCUMENTS

| | | |
|---|---|---|
| EP | 1573498 B1 | 12/2011 |
| GB | 2351817 A | 1/2001 |
| JP | 2000-293303 A | 10/2000 |
| JP | 2001-100908 A | 4/2001 |
| JP | 2005-165776 A | 6/2005 |
| JP | 2003-420573 A | 7/2005 |
| WO | 1991-003792 A1 | 3/1991 |
| WO | 1996-014633 A1 | 5/1996 |
| WO | 1996-32697 A1 | 10/1996 |
| WO | 1997-005542 A | 2/1997 |
| WO | 1999-57900 A1 | 11/1999 |
| WO | 2000-30337 A2 | 5/2000 |
| WO | 2001-088679 A2 | 5/2001 |
| WO | 2002-017222 A2 | 2/2002 |
| WO | 2002-058029 A2 | 7/2002 |
| WO | 2002-064380 A1 | 8/2002 |
| WO | 2002-069247 A1 | 9/2002 |
| WO | 2002-084634 A1 | 10/2002 |

OTHER PUBLICATIONS

Kang, Sing Bing, "Hands-free navigation in VR environments by tracking the head", Cambridge Research Laboratory, Technical Report Series, CRL 97/1, Mar. 1997, 28 pgs.

Kato, Hirokazu et al., "A Mixed Reality 3D Conferencing Application", Human Interface Technology Laboratory, University of Washington, Seattle, USA, 1999, 9 pgs. (pp. 199-207).

Kato, Hirokazu et al., "Marker Tracking and HMD Calibration for a Video-based Augmented Reality Conferencing System", Proceedings of the 2nd IEEE on ACM International Workshop on Augmented Reality '99, San Francisco, USA, Oct. 20-21, 1999 (10 pgs.).

Kessler, Drew G. et al., "The Simple Virtual Environment Library: An Extensible Framework for Building VE Applications", MIT Press, Presence: Teleoperators and Virtual Environments 2000, vol. 9, No. 2, pp. 187-208.

Kotake, Daisuke et al., "A Hybrid and Linear Registration Method Utilizing Inclination Constraint", Fourth IEEE and ACM, ISMAR 2005, pp. 140-149.

Kragic, Danica et al., "Issues and Strategies for Robotic Object Manipulation in Domestic Settings", Computer Vision and Active Perception Lab, Centre for Autonomous Systems, Workshop on Advances, Royal Institute of Technology, Sweden, Sep. 2004, 13 pgs.

Laberge, Dominic, "Visual Tracking for Human Computer Interaction", Master of Computer Science Thesis, School of Information Technology and Engineering, University of Ottawa, Aug. 22, 2003, 111 pgs.

Larsson, Ulrica et al., "Development and evaluation of a 6DOF Interface to be used in medical application", Thesis, Linkpings University, Sweden, Jun. 5, 2002.

LaViola, Joseph J. "Bringing VR and Spatial 3D Interaction . . . ", IEEE Computer Graphics and Applications, #0272-1716/08, Sep.-Oct. 2008, pp. 10.

Lovell-Smith, Crispin D. "A Prototype Optical Tracking System: Investigation and Development", Master's Thesis, University of Canterbury Dept of EE, Jun. 2009, Christchurch, New Zealand.

Mak, Lin Chi et al., "A 6 DoF Visual Tracking System for a Miniature Helicopter", 2nd Int'l Conference on Sensing Tech, Palmerston North, New Zealand, Nov. 26-28, 2007, pp. 32-37.

Mathieu, Nerve, "The Cyclopes: A 6 DOF Optical Tracker Based on a Single Camera", 2nd Intuition Int. Workshop on VR/VE Industry: Challenges and Opportunities, May 3, 2005.

(56) References Cited

OTHER PUBLICATIONS

Mehling, Michael, "Implementation of a Low Cost Marker Based Infrared Optical Tracking System", PhD Thesis Fachhochschule Stuttgart OHochschule der Medien, Vienna, Austria, Feb. 26, 2006.
Mohring, Mathias et al., "Video See-Through AR on Consumer Cell-Phones", IEEE—Computer Science, Weimar, Germany, Nov. 2, 2004 (2 pgs.).
Neumann, Ulrich et al., "Augmented Reality Tracking in Natural Environments", Computer Science Department, University of Southern California, 1999, 24 pgs.
Neumann, Ulrich et al., "Natural Feature Tracking for Augmented Reality", IEEE Transactions on Multimedia, USC Dept. of Computer Science, Mar. 1, 1999 (35 pgs.).
Newman, Joseph et al., "Ubiquitous Tracking for Augmented Reality", ISMAR, Technical University of Vienna, Austria, Nov. 2, 2004, (10 pgs.).
Papagiannakis, George et al., "A survey of mobile and wireless technologies for augmented reality systems", MIRALab, Geneva, Switzerland and Center for the Study of Mobile Devices and Communication, Naval Postgraduate School, Monterey, CA, USA, Feb. 1, 2008, pp. 1-30.
Pears, Nick et al., "Smart Phone Interaction with Registered Displays", IEEE CS, Pervasive Computing, Apr. 1, 2009, pp. 2-9.
Pollefeys, Marc et al., "Video to 3D", Center for Processing of Speech and Images, K.U. Leuven, Dept. of Computer Science, University of North Carolina Chapel Hill, Working Group III/V, 2002, 6 pgs.
Poyner, Rick, "Wintab Interface Specification: 16-bit and 32-bit API Reference", LCS/Telegraphics, Revised May 9, 1996.
Prince, Simon J. D., et al., "Augmented Reality Camera Tracking with Homographies", IEEE Computer Graphics and Applications, Nov.-Dec. 2002, pp. 39-45.
Rekimoto, Jun et al., "CyberCode: Designing Aumented Reality Environments with Visual Tags", Interaction Laboratory, Sony Computer Science Laboratories, Inc., Tokyo, Japan, Apr. 1, 2000, 10 pgs.
Rekimoto, Jun, "Matrix: A Realtime Object Identification and Registration Method for Augmented Reality", Sony Computer Science Laboratory, Inc., Tokyo, Japan, 1998, 6 pgs.
Rekimoto, Jun, "Transvision: A Hand-Held Augmented Reality System for Collaborative Design" Sony Computer Science Laboratory, Inc., Tokyo, Japan, 1996, 6 pgs.
Remi, Paucher, "Location-based augmented reality on cellphones", UCSB—Internship Work, May 4, 2009 through Oct. 30, 2009, pp. 1-29.
Ribo, Miguel et al., "Hybrid Tracking for Outdoor Augmented Reality Applications", IEEE Xplore CGA, Nov./Dec. 2002, pp. 54-63.
Roetenberg, Daniel, "Inertial and Magnetic Sensing of Human Motion", Daniel Roetenberg, 2006 (ISBN-10: 90-9020620-5/ ISBN-13: 978-90-9020620-2).
Rolland, Jannick R et al., "A Survey of Tracking Technology for Virtual Environments", Center for Research & Education in Optics & Lasers (CREOL), 2001, pp. 1-48, Univ. of Florida, Orlando FL, USA.
Satoh, Kiyohide et al., "A Head Tracking Method Using Bird's-Eye View Camera and Gyroscope", Third IEEE and ACM International Symposium, ISMAR, 2004, pp. 202-211.
Schmalstieg, Dieter et al., "Experiences with Handheld Augmented Reality", ISMAR, Graz University of Technology, Austria, Nov. 13, 2007 (13 pgs.).
Schroering, Mark A. et al., "A New Input Device for 3D Sketching", Scanning, 2003, pp. 311-318 Washington University in St. Louis, USA.
Siegl, H. et al., "An AR Human Computer Interface for Object Localization in a Cognitive Vision Framework", Proceedings of the ECCV Workshop on HCI, Prague, May 16, 2004, pp. 178-186.
Simon, Gilles et al., "Pose Estimation for Planar Structures", IEEE Computer Graphics and Applications, Dec. 10, 2002, pp. 46-53.
Simon, Gilles et al., "Reconstructing while registering: a novel approach for markerless augmented reality", LORIA—UHP Nancy I-Inria Lorraine, France, Sep. 30, 2002, pp. 1-10.
Ude, Ales, "Nonlinear Least Squares Optimisation of Unit Quaternion Functions for Pose Estimation from Corresponding Features", Int. Proc 14th Int. Conf.: Pattern Recognition, Aug. 1998, pp. 425-427, Brisbane, Australia.
Universal Serial Bus (USB), "Device Class Definition for Human Interface Devices (HID)", Firmware Specification, USB Implementer's Forum, Jun. 27, 2001.
Van Liere, Robert et al., "Optical Tracking Using Projective Invariant Marker Pattern Properties", Center for Mathematics and Computer Science, Amsterdam, the Netherlands, IEEE Virtual Reality 2003 Proceedings 2003, pp. 191-198.
Wagner, Daniel et al., "ARToolKit on the PocketPC Platform", Vienna University of Technology, Vienna, Austria, 2003 (2 pgs.).
Wagner, Daniel et al., "First Steps Towards Handheld Augmented Reality", ISWC03, Vienna University of Technology, Vienna, Austria, Oct. 21, 2003 (9 pgs.).
Wagner, Daniel et al., "Handheld Augmented Reality Displays", Virtual Reality Conference, Graz University of Technology, Austria, Mar. 25, 2003 (2 pgs.).
Wagner, Daniel et al., "Making Augmented Reality Practical on Mobile Phones, Part 1", IEEE Computer Graphics and Applications, Projects in VR, May 5, 2009, pp. 12-15.
Wagner, Daniel et al., "Pose Tracking from Natural Features on Mobile Phones", ISMAR, Sep. 15, 2008 (10 pgs.).
Wagner, Daniel et al., "Towards Massively Multi-User Augmented Reality on Handheld Devices", PervasiveComputing, vol. 3468, Aug. 13, 2005 (12 pgs.).
Wang, Jih-Fang, "A Real-time Optical 6D Tracker for Head-mounted Display Systems", Symposium on 3D Graphics, TR90-011, The University of North Carolina at Chapel Hill, Dept. of Computer Science, USA, Mar. 1, 1990 (99 pgs.).
Welch, Greg et al., "Motion Tracking: No Silver Bullet, but a Respectable Arsenal", IEEE Computer Graphics and Application, Motion Tracking Survey, Nov.-Dec. 2002, pp. 24-38.
Zhai, Shumin, "User Performance in Relation to 3D Input Device Design", IBM Almaden Research Center, Computer Graphics, Nov. 1998, pp. 50-55.
Zhang, Zhongfei et al., "Obstacle detection based on qualitative and quantitative 3D reconstruction", IEEE Transactions on Pattern Analysis and Machine Intelligence, vol. 19, No. 1, Jan.-Feb. 1997, pp. 15-26.
Zhou, Feng et al., "Trends in Augmented Reality Tracking, Interaction and Display: A Review of Ten Years of ISMAR", IEEE ISMAR 2008, Sep. 15, 2008, pp. 1-10.
Henrysson, Anders et al., "Face to Face Collaborative AR on Mobile Phones", ISMAR 2005, Oct. 5, 2005, pp. 1-11.
Heo, Sejong et al, "Motion and Structure Estimation Using Fusion of Inertial and Vision Data for Helmet Tracker", International Journal of Aeronautical&Space Sciences, Mar. 1, 2010, vol. 11, No. 1, pp. 31-40.
Hinckley, Ken et al., "The Video Mouse: A Camera-Based Multi-Degree-of-Freedom Input Device", Microsoft Research, CHI Letters, vol. 1, 1, UIST '99 Asheville NC, pp. 103-112.
Hoff, William A., et al., "Computer vision-based registration techniques for augmented reality", Proceedings of Intelligent Robots and Computer Vision XV, SPIE vol. 2904, Nov. 18-22, 1996, Boston MA, pp. 538-548.
Hoff, William A., "Fusion of Data from Head-Mounted and Fixed Sensors", First International Workshop on Augmented Reality, Nov. 1, 1998, San Francisco, California, 20 pgs.
Hollerer, Tobias H. et al., "Mobile Augmented Reality", Telegeoinformatics: Location-Based Computing and Services, Chapter 9, H. Karimi and A. Hammad eds., Taylor & Francis Books Ltd., Jan. 1, 2004.
Hollerer, Tobias Hans, "User Interfaces for Mobile Augmented Systems", PhD Thesis, Columbia University, 2004, 238 pgs.
Holloway, Richard et al., "Virtual Environments: A Survey of the Technology", University of North Carolina at Chapel Hill, Sep. 1993 (TR93-033).

(56) References Cited

OTHER PUBLICATIONS

Hua, Hong et al., "Calibration of a Head-Mounted Projective Display for Augmented Reality Systems", Proceedings of be International Symposium on Mixed and Augmented Reality (ISMAR), IEEE Computer Society, Oct. 1, 2002, 10 pgs.

Joguet, Cedric et al., "Pen-Like' Natural Graphic Gesture Capture Disposal, Based on Micro-System", Department of Systems for Information and Health, CEA-Leti Grenoble, France, 2003, pp. 1-4.

Johansson, Bjorn et al., "A System for Automatic Pose-Estimation from a Single Image in a City Scene", Centre for Mathematical Sciences, Lund University, Sweden, 2002, 6 pgs.

Ait-Aider, Omar et al., "Adaption of Lowe's Camera Pose Recovery Algorithm to Mobile Robot Self-Localisation", Robotica, Feb. 2002, pp. 1-15.

Alkeryd, Martin, "Evaluation of Position Sensing Techniques for an Unmanned Aerial Vehicle", Dissertation at the Dept. of EE, Linkoping University 2006, Chapters 4-8.

Ansar, Adnan et al., "Linear Pose Estimation from Points or Lines". ECCV 2002, LNCS 2353, pp. 282-296, Springer-Verlag Berlin Heidelberg 2002.

Azuma, Ronald T., "A Survey of Augmented Reality", Presence: Operators and Virtual Environments, vol. 6, No. 4, Aug. 1, 1997, pp. 355-385.

Barakonyi, Istvan, "Ubiquitous Animated Agents for Augmented Reality", PhD Dissertation, Vienna University of Technology, Oct. 22, 2006.

Batista, Jorge et al., "Pose View Stability Analysis for Camera Look Angles Computation", Institute of Systems and Robotics, Department of Electrical Engineering, University of Coimbra, Portugal, Nov. 15, 1995, pp. 1-32.

Bergmann, Kristian, "User Interfaces based on hand-held projection screen", PhD Thesis, Technical University of Berlin, Computer Graphics Department, Dec. 1, 2008.

Bhatnagar, Devesh K., "Position Trackers for Head Mounted Display Systems: A Survey", University of North Carolina, Chapel Hill, USA, 1993, pp. 1-22.

Billinghurst, Mark et al., "The Magic Book—Moving seamlessly between reality and virtuality", IEEE Computer Graphics and Applications, May-Jun. 2001, pp. 6-8.

Bowman, Doug A. et al., "3D User Interfaces: New Directions and Perspectives", IEEE Society, #0272-1716/08, Nov./Dec. 2008, pp. 20-36.

Cantzler, H. et al., "A novel form of a pointing device", Intelligent Systems Lab, Vision Video and Graphics, 2003, pp. 1-6.

Carceroni, Rodrigo L., et al., "Numerical Methods for Model-Based Pose Recovery", The University of Rochester Department of Computer Science, Technical Report 659, Aug. 1997, 90 pgs.

Caudell, Thomas P. et al., "Augmented Reality: An Application of Heads-Up Display Technology to Manual Manufacturing Process", System Sciences, Boeing Computer Services, Seattle, WA, USA, Jul. 10, 1992, pp. 659-669.

Chai, Lin et al., "3-D Motion and Structure Estimation Using Inertial Sensors and Computer Vision for Augmented Reality", Teleoperators and Vritual Environments, Nov. 2000, pp. 1-40.

Cheng, Shun-Wen et al., "An Application of Augmented Reality Head-Up Display", Automotive Research & Testing Center, No. 6, Lukang, Changhua County, Taiwan, 2012, pp. 1-9.

Cho, Sung-Jung et al., "Magic Wand: A Hand-Drawn Gesture Input Device in 3-D Space with Inertial Sensors", IEEE Computer Society, Kokubunji Tokyo, Oct. 29, 2004, pp. 106-111.

Chow, Yang-Wai, "Low-Cost Multiple Degrees-of-Freedom Optical Tracking for 3D Interaction in Head-Mounted Display Virtual Reality", International Journal of Recent Trends in Engineering, Issue 1, vol. 1, May 2009, pp. 55-56.

Chung, James C., et al., "Exploring Virtual Worlds with Head-Mounted Displays", The University of North Carolina at Chapel Hill, Dept. of Computer Science, TR89-009, Feb. 1989, 12 pgs.

Collins, Robert et al., "A System for Automated Sight Model Acquisition and Extension—RADIUS", University of Massachusetts, Department of Computer Science, TEC-0062, Jun. 1995, 55 pgs.

Comport, Andrew I. et al., Real-Time Markerless Tracking for Augmented Reality: The Virtual Visual Servoing Framework:, IEEE Transactions on Visualization and Computer Graphics, vol. 12, No. 4, Jul./Aug. 2006, pp. 615-628.

Corradini, Andrea et al., "A Map-Based System Using Speech and 3D Gestures for Pervasive Computing", Center for Human-Computer Communication, Oregon Health & Science University, Portland, USA, 2003, pp. 1-6.

Dorfmuller-Ulhaas, Klaus, "Optical Tracking from User Motion to 3D Interaction", Dissertation, Vienna University of Technology, Vienna, Austria, Oct. 2002.

Feiner, Steven et al., "A Touring Machine: Prototyping 3D Mobile Augmented Reality Systems for Exploring the Urban Environment", Proceedings of International Symposium on Wearable Computing (ISWC), Cambridge MA, USA, Oct. 13, 1997, pp. 74-81.

Fish, Alexander et al., "An Adaptive Center of Mass Detection System Employing a 2-D Dynamic Element Matching Algorithm for Object Tracking", 0-7803-7762 IEEE, Jan. 3, 2003, pp. 778-781.

Foxlin, Eric et al., "Miniature 6-DOF Inertial System for Tracking HMDs", SPIE, vol. 3362, AeroSense 98, Orlando, FL, Apr. 13-14, 1998, pp. 1-15.

Foxlin, Eric, "Chapter 7. Motion Tracking Requirements and Technologies", InterSense Inc., Extended draft version of Chapter 8, Handbook of Virtual Environment Technology, Ed., Lawrence Erlbaum Associates, 2002, 54 pgs.

Foxlin, Eric et al., "VIS-Tracker: A Wearable Vision-Inertial Self Tracker", IEEE VR 2003, Mar. 22-26, 2003, Los Angeles, CA, U.S.

Frey, William et al., "Off-the-Shelf, Real-Time, Human Body Motion Capture for Synthetic Environments", Environments, Computer Science Department Naval Postgraduate School, Monterey, California, USA, 1996, pp. 1-26.

Geiger, Christian et al., "Mobile AR4ALL", Proceedings of IEEE and ACM International Symposium on Augmented Reality, Paderborn, Germany, Oct. 29, 2001, pp. 1-2.

Goldstein, Herbert et al., Classical Mechanics, 3rd Edition, Addison Wesley, 2002, Chapter 4 and Appendices A&B.

Gordon, Gary et al., "Silicon Optical Navigation", Agilent Technical Bulletin, 2004, pp. 1-7.

Gortler, Steven J., et al., "The Lumigraph", Microsoft Research, Aug. 4, 1996, 10 pgs.

Greff-Buaes, Alexandre, "A Low Cost One-Camera Optical Tracking System for Indoor Wide-Area Augmented and Virtual Reality Environments", Dissertation, Federal University of Rio Grande do Sul, Dept. of EE, Porto Alegre, Brasil, Feb. 2006.

Hager, Gregory D. et al., "Fast and Globally Convergent Pose Estimation from Video Images", IEEE Transactions on Pattern Analysis and Machine Intelligence, vol. 22, No. 6, Jun. 2000, pp. 610-622.

Hamamatsu, PSD Position Sensitive Detector S9037-S9038 Series, Selection Guide of Hamamatsu, Solid State Division, Oct. 2002.

Hand, Chris, "A Survey of 3D Interaction Techniques", Department of Computer Science, De Montfort University, The Gateway, Leicester, UK, vol. 016, No. 005, 1997, pp. 269-281.

Haralick, Robert M., et al., "Computer and Robot Vision v.2", Addison-Wesley Publishing Company, 1993, pp. 66-68.

Allen, B. Danette et al., "Tracking Beyond 15 Minutes of Thought", Slides for Course 11, SIGGRAPH 2001, Los Angeles, CA, Aug. 12-17, Copyright 2001 ACM Inc., 103 pgs.

Allen, B. Danette et al., "Tracking Beyond 15 Minutes of Thought", Course Notes—Course 11, SIGGRAPH 2001, Los Angeles, CA, Aug. 12-17, Copyright 2001 ACM Inc., 195 pgs.

Azuma, Ronald et al., "Improving Static and Dynamic Registration in an Optical See-through HMD", Department of Computer Science at UNC at Chapel Hill, Siggraph Conference 1994, 17 pgs.

Azuma, Ronald et al., "Recent Advances in Augmented Reality", Naval Research Lab—Survey, IEEE Computer Graphics and Applications, Nov.-Dec. 2001, pp. 34-47.

(56) References Cited

OTHER PUBLICATIONS

Bishop, Gary, "Self-Tracker: A Smart Optical Sensor on Silicon", PhD Dissertation, Department of Computer Science, University of North Carolina at Chapel Hill, 1984, 65 pgs.

Kalkusch, Michael et al., "Structured Visual Markers for Indoor Pathfinding", Vienna University of Technology, IEEE 1st International Workshop, Augmented Reality Toolkit, Sep. 29-29, 2002, Austria.

Lee, Jong Weon et al., "Tracking with Omni-directional Vision for Outdoor AR Systems", Proceedings of the International Symposium on Mixed and Augmented Reality (ISMAR'-02), IEEE Computer Society, 2002, 10 pgs.

Nitzsche, Norbert et al., "Motion Compression for Telepresent Walking in Large-Scale Remote Environments", Technical University of Munich, Helmet- and Head-Mounted Displays VIII: Technologies and Applications, Proceedings of SPIE, vol. 5079, 2003, pp. 265-276.

Reitmayr, Gerhard et al., "Location based Applications for Mobile Augmented Reality", Vienna University of Technology, Australian Computer Society, Inc., 2003, 9 pgs.

Sorensen, Brett R., et al., "The Minnesota Scanner: A Prototype Sensor for Three-Dimensional Tracking of Moving Body Segments", IEEE Transactions on Robotics and Automation, vol. 5, No. 4, Aug. 1989, pp. 499-509.

Welch, Greg et al., "High-Performance Wide-Area Optical Tracking: The HiBall Tracking System", Presence—Teleoperators and Virtual Environments, MIT Press, vol. 10, No. 1, Feb. 2001, pp. 1-21.

Welch, Gregory F. "Hybrid Self-Tracker: An Inertial/Optical Hybrid Three-Dimensional Tracking System", Dissertation Proposal, TR 95-048, Dept. of Computer Science, University of North Carolina at Chapel Hill, 1995, 21 pgs.

Welch, Greg et al., "SCAAT: Incremental Tracking with Incomplete Information", Proceedings of the 25th annual conference on Computer Graphics and Interactive Techniques, ACM, Aug. 3-8, 1997, 12 pgs.

Welch, Gregory F., "SCAAT: Incremental Tracking with Incomplete Information", PhD Dissertation, TR96-051, University of North Carolina at Chapel Hill, Department of Computer Science, Oct. 1996, 208 pgs.

Welch, Greg et al., "The HiBall Tracker: High-Performance Wide-Area Tracking for Virtual and Augmented Environments", Symposium on Virtual Reality Software and Technology, University College London, Dec. 20-22, 1999, 11 pgs.

Birchfield, Stan, "An Introduction to Projective Geometry (for computer vision)", Stanford University CS Department, Mar. 12, 1998, pp. 1-22.

Burdea, Grigore C. and Coiffet Philippe, "Virtual Reality Technology", Chapter 2: Input Devices: Trackers, Navigation, and Gesture Interfaces, ISBN 0-471-36089-9, IEEE Press, Wiley Interscience, Mar. 2003, pp. 16-56.

Burdea, Grigore C. and Coiffet Philippe, "Virtual Reality Technology", Chapter 4: Computing Architectures for VR, ISBN 0-471-36089-9, IEEE Press, Wiley Interscience, Mar. 2003, pp. 116-156.

Hartley, Richard and Zisserman, Andrew, "Multiple View Geometry in computer vision", Second Edition, Cambridge University Press, New York, 2003.

Huttenlocher, Daniel P. et al., "Recognizing Solid Objects by Alignment with an Image", Cornell University CS Dept. & MIT Dept. of Brain and Cognitive Science and Artificial Intelligence Laboratory, International Journal of Computer Vision, 5:2, 1990, pp. 195-212.

Lee, Jiann-Der, "A Fast Geometrical Approach to Camera Extrinsic Parameters", Dept. of Electrical Engineering, Computers Math. Applications, vol. 32, No. 12, Elsevier Science Ltd, 1996, pp. 93-100.

Maeda, Masaki et al., "A Wearable AR Navigation System using Vision Based Tracking with Infrared", Technical Report of the Institute of Electronics, Information and Communication Engineers (IEICE), vol. 103, Issue 584, Jan. 22, 2004, 2 pgs., Japan.

Maeda, Makaki et al., "Proposal of a Three-dimensional User Position and Orientation Detection Technique Using Infrared Identifiers for a Wearable System", The 65th National Convention of the Information Processing Society of Japan (IPSJ), 3T4B-4, Mar. 25, 2003, 4 pgs., Japan.

Maeda, Masaki et al., "Tracking of User Position and Orientation by Stereo Measurement of Infrared Markers and Orientation Sensing", Proceedings: The 8th International Symposium on Wearable Computers (ISWC), IEEE Computer Society, Oct. 31-Nov. 3, 2004, 8 pgs.

Oberkampf, Denis et al., "Iterative Pose Estimation Using Coplanar Feature Points", Computer Vision Laboratory & Center for Automation Research, University of Maryland, Computer Vision and Image Understanding, vol. 63, No. 3, Academic Press, Inc., May 1996, pp. 495-511.

Rosenfeld, Azriel, "Vision Based Navigation and Recognition", DARPA sponsored research, University of Maryland, Aug. 1998, 31 pgs.

Torr, P. H. S., and Zisserman, A., "Feature Based Methods for Structure and Motion Estimation", Microsoft Research Ltd & Dept. of Engineering Science at University of Oxford, 1999, 19 pgs.

* cited by examiner

COMPUTER INTERFACE FOR MANIPULATED OBJECTS WITH AN ABSOLUTE POSE DETECTION COMPONENT

RELATED APPLICATIONS

Continuation of application Ser. No. 14/992,748 filed on Jan. 11, 2016, now allowed, which is a Continuation of application Ser. No. 14/551,367 filed Nov. 24, 2014, now U.S. Pat. No. 9,235,934 on Jan. 12, 2016; which is a Continuation of application Ser. No. 13/889,748 filed May 8, 2013, now U.S. Pat. No. 8,897,494; which is a Divisional of application Ser. No. 13/134,006 filed May 25, 2011, now U.S. Pat. No. 8,553,935; which is a Divisional of application Ser. No. 12/586,226 filed Sep. 18, 2009, now U.S. Pat. No. 7,961,909; which is a Continuation-In-Part of application Ser. No. 12/584,402 filed Sep. 3, 2009, now U.S. Pat. No. 7,826,641; which is a Continuation-In-Part of application Ser. No. 11/591,403 filed Oct. 31, 2006, now U.S. Pat. No. 7,729,515; which claims priority to Provisional Appl. 60/780,937 filed on Mar. 8, 2006; and further application Ser. No. 12/584,402 claims priority of application Ser. No. 10/769,484 filed on Jan. 30, 2004 now U.S. Pat. No. 8,542,219; all of these being incorporated herein in their entirety.

FIELD OF THE INVENTION

The present invention relates generally to determining an absolute pose of a manipulated object in a real three-dimensional environment with invariant features, and it applies in particular to manipulated objects used by human users to interface with the digital world.

BACKGROUND OF THE INVENTION

An object's pose in a real three-dimensional environment can be expressed with respect to stationary references such as ground planes, reference surfaces, lines, solids, fixed points and other invariant features disposed in the real three-dimensional environment. It is convenient to parameterize the environment by a set of world coordinates with a chosen reference point. The reference point may be the origin of the world coordinates, the center of a particularly prominent invariant feature or the center of a distribution of two or more of these features. Once the locations and orientations of the invariant features distributed in the environment are known, then knowledge of the spatial relationship between the object and these invariant features enables one to compute the object's pose.

An object's pose information combines the three linear displacement coordinates (x,y,z) of any reference point on the object, as well as the three inclination angles, also called the Euler angles ($\phi,\theta,\psi$) that describe the pitch, yaw and roll of the object. Conveniently, all parameters (x,y,z,$\phi,\theta,\psi$) are expressed in world coordinates to yield an absolute pose. In some cases, alternative expressions for the inclination angles such as rotations defined by the four Caylyle-Klein angles or quaternions are more appropriate.

Determination of a sequence of an object's absolute poses at different times allows one to compute and track the motion of the object in the real three-dimensional environment. Over time, many useful coordinate systems and method have been developed to track the pose of objects and to parametrize their equations of motion. For a theoretical background the reader is referred to textbooks on classical mechanics such as Goldstein et al., Classical Mechanics, $3^{rd}$ Edition, Addison Wesley 2002.

Optical navigation is a particularly simple and precise way to track moving objects. The approach is also intuitive since our own human vision system computes locations and motion trajectories of objects in real three-dimensional environments. The precision of optical navigation is due to the very short wavelength of electromagnetic radiation in comparison with typical object dimensions, negligible latency in short distance measurements due to the extremely large speed of light as well as relative immunity to interference. Thus, it is well known that the problem of determining an absolute pose or a motion trajectory of an object in almost any real three-dimensional environment may be effectively addressed by the application of optical apparatus and methods.

A particularly acute need for efficient, accurate and low-cost determination of the absolute pose of an object in a real three-dimensional environment is found in the field of hand-held objects used for interfacing with the digital world. This field encompasses myriads of manipulated objects such as pointers, wands, remote controls, gaming objects, jotting implements, surgical implements, three-dimensional digitizers and various types of human utensils whose motion in real space is to be processed to derive a digital input for an application. In some realms, such application involves interactions that would greatly benefit from a rapid, low-cost method and apparatus for one-to-one motion mapping between real space and cyberspace.

Specific examples of cyberspace games played in three-dimensions (3-D) and requiring high-precision control object tracking involve scenarios where the manipulated control object is transported into or even mimicked in cyberspace. Exemplary gaming objects of this variety include a golfing club, a racket, a guitar, a gun, a ball, a steering wheel, a flying control or any other accoutrement that the player wishes to transport into and utilize in a cyberspace application. A very thorough summary of such 3-D interfacing needs for graphics are found in U.S. Pat. No. 6,811,489 to Shimizu, et al.

A major problem encountered by state of the art manipulated objects such as control wands and gaming implements is that they do not possess a sufficiently robust and rapid absolute pose determination system. In fact, many do not even provide for absolute pose determination. Rather, they function much like quasi three-dimensional mice. These solutions use motion detection components that rely on optical flow sensors, inertial sensing devices or other relative motion capture systems to derive the signals for interfacing with cyberspace. In particular, many of such interface devices try to solve just a subset of the motion changes, e.g., inclination. An example of an inclination calculation apparatus is found in U.S. Pat. No. 7,379,841 to Ohta while a broader attempt at determining relative motion is taught in U.S. Pat. No. 7,424,388 to Sato and U.S. Application 2007/0049374 to Ikeda, et al.

Unfortunately, one-to-one motion mapping between space and cyberspace is not possible without the ability to digitize the absolute pose of the manipulated object with respect to a well-defined reference location in real space. All prior art devices that do not solve the full motion problem, i.e., do not capture successive poses of the manipulated object with a method that accounts for all six degrees of freedom (namely, the very parameters (x,y,z,$\phi,\theta,\psi$) inherent in three-dimensional space) encounter limitations. Among many others, these include information loss, appearance of an offset, position aliasing, gradual drift and accumulating position error.

In general, the prior art has recognized the need for tracking all six degrees of freedom of objects moving in three-dimensions. Thus, optical navigation typically employs several cameras to determine the position or trajectory of an object in an environment by studying images of the object in the environment. Such optical capturing or tracking systems are commonly referred to as optical motion capture (MC) systems. In general, motion capture tends to be computationally expensive because of significant image pre- and post-processing requirements, as well as additional computation associated with segmentation and implementation of algorithms. One particular system taught by McSheery et al. in U.S. Pat. No. 6,324,296 discloses a distributed-processing motion capture system that employs a number of light point devices as markers, e.g., infrared LEDs, attached to the object whose motion is to be determined. The markers use unique sequences of light pulses to represent their unique identities and thus enable filtering out of information not belonging to the markers (i.e., background noise) by the imaging cameras located in the environment. Since McSheery's system permits a great deal of irrelevant information from the imaging sensors (e.g., CCDs) to be discarded before image processing, the system is less computationally expensive than more traditional motion capture systems.

Another three-dimensional position and orientation sensing system that employs markers on the object is taught by Kosaka et al. in U.S. Pat. No. 6,724,930. In this case the markers are uniquely identified based on color or a geometric characteristic of the markers in the extracted regions. The system uses an image acquisition unit or camera positioned in the environment and relies on image processing functions to remove texture and noise. Segmentation algorithms are used to extract markers from images and to determine the three-dimensional position and orientation of the object with respect to the image acquisition apparatus.

Still another way of employing markers in position and orientation detection is taught in U.S. Pat. No. 6,587,809 by Majoe. The object is tracked by providing it with markers that are activated one at a time and sensed by a number of individual sensors positioned in the environment. The position of the energized or active marker is determined by a control unit based on energy levels received by the individual sensors from that marker.

The above approaches using markers on objects and cameras in the environment to recover object position, orientation or trajectory are still too resource-intensive for low-cost and low-bandwidth applications. This is due to the large bandwidth needed to transmit image data captured by cameras, the computational cost to the host computer associated with processing image data, and the data network complexity due to the spatially complicated distribution of equipment (i.e., placement and coordination of several cameras in the environment with the central processing unit and overall system synchronization).

Despite the above-mentioned limitations of general motion tracking systems, some aspects of these systems have been adapted in the field of manipulated objects used for interfacing with computers. Such objects are moved by users in three-dimensions to produce input for computer applications. Hence, they need to be tracked in all six degrees of freedom. Therefore, recent three-dimensional wands and controls do teach solving for all six degrees of freedom.

For example, U.S. Patent Application 2008/0167818 to Kimber et al. has a passive wand with no on-board devices or LEDs. The wand is viewed from multiple cameras finding the full 6 degrees of freedom to provide for more precise estimation of wand pose is expressly taught. Similarly, U.S. Pat. No. 6,982,697 to Wilson et al. teaches the use of external calibrated cameras to decode the orientation of the pointer used for control actions. U.S. Patent Application 2006/0109245 to Wilson, et al. further teaches how intelligent computing environments can take advantage of a device that provides orientation data in relative motion mode and absolute mode. Further teachings on systems that use external or not-on-board cameras to determine the pose and motion of a wand or control and use it as input into various types of applications can be found in U.S. Patent Applications: 2008/0192007, 2008/0192070, 2008/0204411, 2009/0164952 all by Wilson.

Still other notable teachings show as few as a single off-board camera for detecting three-dimensional motion of a controller employed for game control purposes. Such cameras may be depth sensing. Examples of corresponding teachings are found in U.S. Patent Application 2008/0096654 by Mondesir, et al., as well as U.S. Patent Applications 2008/0100825, 2009/0122146 both by Zalewski, et al.

Unfortunately, approaches in which multiple cameras are set up at different locations in the three-dimensional environment to enable stereo vision defy low-cost implementation. These solutions also require extensive calibration and synchronization of the cameras. Meanwhile, the use of expensive single cameras with depth sensing does not provide for robust systems. The resolution of such systems tends to be lower than desired, especially when the user is executing rapid and intricate movements with the manipulated object in a confined or close-range environment.

Another approach involves determining the position or attitude of a three-dimensional object in the absolute sense and using it for a graphical user interface. One example of this approach is taught in U.S. Pat. No. 6,727,885 to Ishino, et al. Here the sensor is on-board the manipulated object. A projected image viewed by the sensor and generated by a separate mechanism, i.e., a projection apparatus that imbues the projected image with characteristic image points is employed to perform the computation. Additional information about such apparatus and its application for games is found in U.S. Pat. No. 6,852,032 to Ishino and U.S. Pat. No. 6,993,206 to Ishino, et al.

The solution proposed by Ishino et al. is more versatile than the prior art solutions relying on hard-to-calibrate and synchronize multi-camera systems or expensive cameras with depth sensing capabilities. Unfortunately, the complexity of additional hardware for projecting images with characteristic image points is nontrivial. The same is true of consequent calibration and interaction problems, including knowledge of the exact location of the image in three-dimensional space. This solution is not applicable to close-range and/or confined environments, and especially environments with typical obstructions that interfere with line-of-sight conditions.

There are still other teachings attempting to improve on both the apparatus and method aspects of generating computer input with manipulated objects such as wands, pointers, remote controls (e.g., TV controls). A very illuminating overall review of state of the art technologies that can be used for interacting with virtual environments and their limitations are discussed by Richard Halloway in "Virtual Environments: A Survey of the Technology", University of North Carolina at Chapel Hill, September 1993 (TR93-033). Still more recent teachings focusing on how absolute pose data can be used in specific contexts and for remote control applications is discussed in the following U.S. Patent Applications: 2007/0189737; 2008/0106517; 2008/0121782; 2008/0272272; 2008/0309511; 2009/0066647; 2009/0066648; 2009/0153389; 2009/0153475; 2009/0153478; 2009/0158203 and 2009/0158222.

In sum, despite considerable amount of work in the field, a clear and pressing need for low-cost, robust and accurate apparatus for absolute motion capture remains. Specifically, what is needed is an apparatus that permits one to obtain absolute pose data from manipulated object for purposes of interacting with the digital world. Such apparatus should not only be low-cost, robust and accurate, but it should also be convenient and easy to use at high frame rates in close-range and confined three-dimensional environments.

OBJECTS AND ADVANTAGES

It is the object of the present invention to introduce a particularly effective optical navigation apparatus and methods for optically inferring or measuring the absolute pose of objects manipulated in real three-dimensional environments. More particularly, it is an objective of the present invention to address manipulated objects such as hand-held devices moved directly by a human user in close-range, real three-dimensional environments including constrained environments, living quarters and work-spaces. The numerous objects and advantages of the apparatus and method of invention will become apparent upon reading the ensuing description in conjunction with the appended drawing figures.

SUMMARY

The objects and advantages of the present invention are accomplished by a system that has a remote control equipped with a relative motion sensor. The relative motion sensor outputs data that is indicative of a change in position of the remote control. The system has at least one light source and a photodetector that detects light from the at least one light source and outputs data indicative of the detected light. Further, the system has at least one controller configured to determine an absolute position of the remote control based on the data output by the relative motion sensor and the photodetector. The absolute position is determined with respect to a reference location.

In a preferred embodiment, the system has or is coupled to a display that shows an image that is defined by a first and second orthogonal axes, which can be two Cartesian coordinate axes belonging to three axes defining world coordinates $(X_o, Y_o, Z_o)$. The at least one controller is configured to generate signals for rendering the display. These signals are a function of the absolute position of the remote control in or along a third axis, e.g., the third Cartesian coordinate axis of world coordinates $(X_o, Y_o, Z_o)$. The third axis is orthogonal to the first and second axes.

In the system coupled to the display defined with the aid of two orthogonal axes, the at least one controller can be configured to generate signals for zooming in on or zooming out of at least a portion of the image shown on the display. Similarly, the at least one controller can be configured to determine an absolute position of the remote control in or along the third axis and to determine a change in a position of the remote control in or along the third axis. The at least one controller then combines the initial absolute position of the remote control with the change in the position of the remote control to derive further useful input for the system.

The invention further extends to a method for use with a system that has a remote control. The steps of the method call for accepting light data indicative of light detected by a photodetector and accepting relative motion data from a relative motion sensor indicative of a change in a position of the remote control. The method also calls for determining an absolute position of the remote control based on the light data and the relative motion data. The absolute position is determined with respect to a reference location.

Preferably, the system is coupled to a display that shows an image. The image is parametrized or defined by a first and second orthogonal axes. The determination of absolute position of the remote control involves determining an absolute position of the remote control in a third axis that is orthogonal to the first and second axes. Once again, a choice of Cartesian world coordinates $(X_o, Y_o, Z_o)$, in which $X_o, Y_o$ are the first and second axes, and $Z_o$ is the third axis is a convenient choice. The method can be advantageously employed to generate signals for rendering the display based on the absolute position of the remote control in or along the third axis. For example, the rendering of the display can include, among other, signals to zoom in on or zoom out of at least a portion of the image that is shown on the display.

In accordance with another system of the invention, a first group of light sources are disposed in an asymmetric and generally linear pattern. A photodetector of the system is configured to detect the light sources and generate photodetector data representative of the detected light sources. The system has a controller that is configured to identify a derivative pattern of light sources from the photodetector data. The derivative pattern is indicative of the asymmetric and generally linear pattern. Specifically, as the absolute pose of photodetector changes, the asymmetric and generally linear pattern undergoes a well-understood transformation (i.e., perspective distortion plus any optical aberrations introduced by imaging lenses and/or other optics elements cooperating with the photodetector). Knowledge of this transformation enables one to correlate the asymmetric and generally linear pattern to the derivative pattern and obtain information about the pose of the photodetector. The light sources may generate light or they may simply reflect light.

The first group of light sources can be disposed proximate any edge of a display, at another location, or else on, near, or even beneath the display. In fact, even certain pixels of the display, especially in the case of an OLED display, can serve as light sources. In a preferred embodiment, the system is coupled to a display that has a first and second edges and the system has a second group of light sources. In this preferred embodiment, the first group of light sources are disposed proximate the first edge of the display and the second group of light sources are disposed proximate the second edge of the display. The light sources can be identified or processed in triads or larger tuples, depending on the specific tracking or navigation algorithms that are employed to determine the absolute position. It should be noted that for determination of the complete absolute pose it is preferable to consider at least four light sources.

In still another embodiment, a system according to the invention has a first light source configured to emit light at a first signature wavelength and a second light source configured to emit light at a second signature wavelength. The first and second signature wavelengths are different. The remote control is equipped with a photodetector module that is configured to detect the first and second signature wavelengths of light. Preferably, the photodetector module has a two-dimensional position-sensitive diode to detect the light. Suitable diodes of this variety, also referred to as position-sensing detectors or PSDs are well known in the art.

Another method of the invention is adapted for entering text in a media system that has an electronic device and a wand. The method calls for displaying a number of selectable characters, such as alphanumerics, and navigating a cursor to a particular selectable character based on the output of a motion detection component of the wand. Then, the method calls for receiving a selection of the particular selectable character, e.g., the particular selectable character on which the cursor comes to rest. The motion detection component can have an accelerometer, a gyroscope or both. In addition, or instead, the motion detection component can be an optical component that determines the absolute pose of the wand with the aid of invariant features. Invariant features can high optical contrast features, such as light sources and infrared diodes in particular.

The method of invention is useful in controlling the operation of an image application provided by a media system that has a screen and a wand. The image is displayed on the screen and the rotation of the wand is detected. Then, the selected image is rotated in response to the detecting step. The method can be further extended to receiving a selection of the image that is to be operated on, whether by a rotation operation or a zooming operation. In practice, the detecting step is broken down into receiving a transmission from the wand that communicates the output of the at least one motion detection component that is incorporated in the wand and detecting that the wand was rotated based on the received transmission.

The specifics of the invention and enabling details are described below with reference to the appended drawing figures.

DESCRIPTION OF THE DRAWING FIGURES

FIG. 1 is a three-dimensional view of an apparatus of the invention illustrating the motion of a manipulated object.

FIG. 2A-C are diagrams illustrating the Euler rotation convention as used herein.

DETAILED DESCRIPTION

Figure 1:
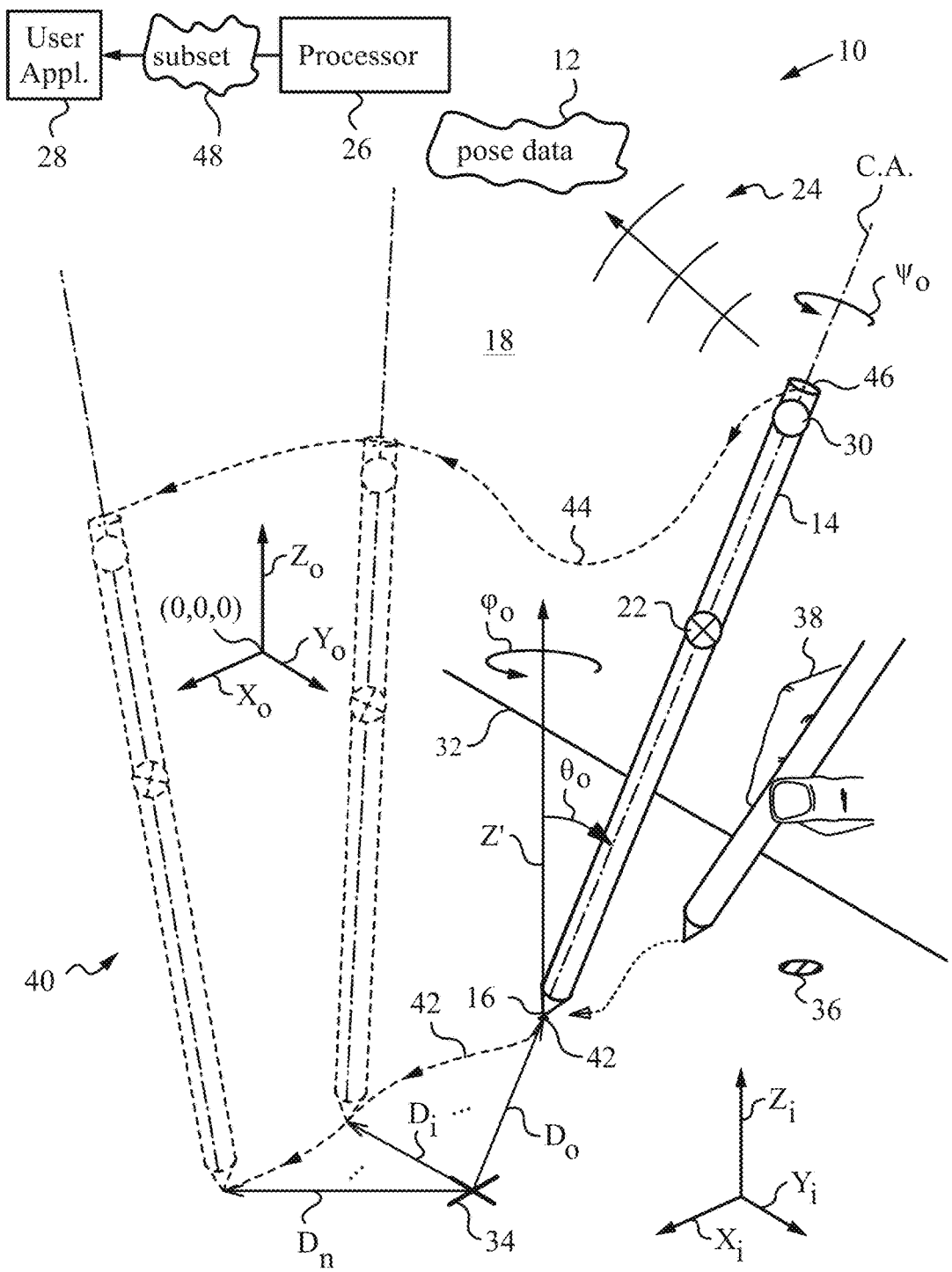

To appreciate the basic aspects of the present invention, we initially turn to a simple version of an apparatus 10 in accordance with the invention, as shown in FIG. 1. Apparatus 10 has a manipulated object 14 whose motion 40 in a real three-dimensional environment 18 is expressed by absolute pose data 12. Apparatus 10 processes absolute pose data 12 that describe the absolute pose of manipulated object 14 at a number of measurement times $t_i$. Thus, successive pose data 12 collected at the chosen measurement times describe the motion that manipulated object 14 executes or is made to execute by a user 38.

Manipulated object 14 is any object that is moved either directly or indirectly by a user 38 and whose pose when object 14 is stationary or in motion yields useful absolute pose data 12. For example, manipulated object 14 is a pointer, a wand, a remote control, a three-dimensional mouse, a game control, a gaming object, a jotting implement, a surgical implement, a three-dimensional digitizer, a digitizing stylus a hand-held tool or any utensil. In fact, a person skilled in the art will realize that a manipulated object 14 can be even be an entire device such as a cell phone or a smart object that is handled by user 38 to produce meaningful motion 40.

In the present case, manipulated object 14 is a pointer that executes motion 40 as a result of a movement performed by the hand of a user 38. Pointer 14 has a tip 16 that will be used as a reference point for describing its absolute pose in real three-dimensional environment 18. In general, however, any point on object 14 can be selected as reference point 16, as appropriate or convenient.

Pointer 14 has an on-board optical measuring arrangement 22 for optically inferring its absolute pose with the aid of one or more invariant features 32, 34, 36 disposed at different locations in real three-dimensional environment 18. Invariant features 32, 34, 36 are high optical contrast features such as edges of objects, special markings, or light sources. In the present embodiment, invariant feature 32 is an edge of an object such as a table (object not shown), invariant feature 34 is a special marking, namely a cross, and feature 36 is a light source. It is possible to use features 32, 34, 36 that are all located in a plane (coplanar) or else at arbitrary locations (non-coplanar) within real three-dimensional environment 18 as conveniently defined by global or world coordinates $(X_o, Y_o, Z_o)$. The limitation is that, depending on the type of features 32, 34, 36 a sufficient number of them have to be visible to on-board optical measuring arrangement 22 at measurement times $t_i$, as described in more detail below.

In the present embodiment the world coordinates $(X_o, Y_o, Z_o)$ chosen to parameterize real three-dimensional environment 18 are Cartesian. A person skilled in the art will recognize that other choices including polar, cylindrical or still different coordinate systems can be employed. In addition, it will be appreciated that features 32, 34, 36 can be temporarily or permanently affixed at their spatial locations as required for measuring the pose of pointer 14. Indeed, the spatial locations of features 32, 34, 36 can be changed in an arbitrary manner, as long as on-board optical measuring arrangement 22 is appraised of their instantaneous spatial locations at times $t_i$.

The spatial locations of features 32, 34, 36, whether temporary or permanent, are conveniently expressed in world coordinates $(X_o, Y_o, Z_o)$. Furthermore, if possible, the spatial locations of features 32, 34 and 36 are preferably such that at least a subset of them is visible to on-board optical measuring arrangement 22 in all absolute poses that pointer 14 is expected to assume while undergoing motion 40. Invariant features 32, 34, 36 are used in deriving a relative or absolute position of tip 16 of pointer 14 in real three-dimensional environment 18. Features 32, 34, 36 are also used for optically inferring the remaining portion of the absolute pose, i.e., the orientation of pointer 14.

A number of optical measurement methods using optical measuring arrangement 22 to infer the relative or absolute pose of pointer 14 can be employed. In any of these methods, arrangement 22 uses one or more on-board components to obtain pose data 12 in accordance with any well-known absolute pose recovery technique including geometric invariance, triangulation, ranging, path integration and motion analysis. In some embodiments arrangement 22 has a light-measuring component with a lens and an optical sensor that form an imaging system. In other embodiments arrangement 22 has an active illumination component that projects structured light or a scanning component that projects a scanning light beam into environment 18 and receives a scattered portion of the scanning light beam from features 32, 34. Specific examples of the various possible components will be explained in detail below.

Apparatus 10 has a processor 26 for preparing absolute pose data corresponding to absolute pose of pointer 14 and for identifying a subset 48 of absolute pose data 12 required by an application 28. Specifically, application 28 uses subset 48 which may contain all or less than all of absolute pose data 12. Note that processor 26 can be located on pointer 14 or it can be remote, e.g., located in a remote host device, as is the case in this embodiment.

A communication link 24 is provided for sending absolute pose data 12 to application 28. Preferably, communication link 24 is a wireless communication link established with the aid of a wireless transmitter 30 mounted on pointer 14. In embodiments where processor 26 and application 28 are resident on pointer 14, communication link 24 can be a direct electrical connection. In still other embodiments, communication link 24 can be a wired remote link.

During operation user 38 holds pointer 14 in hand and executes a movement such that pointer 14 executes motion 40 with respect to invariant features 32, 34, 36 in world coordinates $(X_o, Y_o, Z_o)$ that parametrize real three-dimensional environment 18. For better visualization, motion 40 is indicated in dashed lines 42, 44 that mark the positions assumed by tip 16 and end 46 of pointer 14 during motion 40. For the purposes of this invention, line 42 is referred to as the trace of tip 16. In some specific applications of the present invention, trace 42 of tip 16 may be confined to a surface embedded in real three-dimensional environment 18. Such surface can be plane, e.g., a planar jotting surface, or it can be curved.

Motion 40 may produce no movement of end 46 or tip 16, i.e., no trace 42. In fact, motion 40 is not limited by any parameter other than those of standard mechanics of rigid body motion known form classical mechanics. Accordingly, changes in orientation of pointer 14 are considered to be motion 40. Likewise, changes in position of tip 16 (or any other reference point) in (x,y,z) coordinates conveniently expressed in world coordinates $(X_o, Y_o, Z_o)$ are also considered to be motion 40. In the present case, orientation of pointer 14 is described by inclination angle $\theta$, rotation angle $\varphi$ and roll angle $\psi$ referenced with respect to a center axis C.A. of pointer 14. A change in at least one of these angles constitutes motion 40.

In the present case, tip 16 moves along line 42 as pointer 14 is inclined with respect to a normal Z' at inclination angle θ equal to $\theta_o$. For simplicity, normal Z' is selected to be parallel to the $Z_o$ axis of world coordinates $(X_o,Y_o,Z_o)$. Furthermore, rotation and roll angles φ, ψ are equal to $\varphi_o$, $\psi_o$ respectively. For convenience, in this embodiment angles θ, φ and ψ are Euler angles. Of course, other angles can be used to describe the orientation of pointer 14. In fact, a person skilled in the art will appreciate that any convention for describing the rotations of pointer 16 can be adapted for this description. For example, the four Carlyle-Klein angles, the direction cosines, quaternions or still other descriptors of tilt, yaw and roll can be employed in such alternative conventions.

Figure 2A:
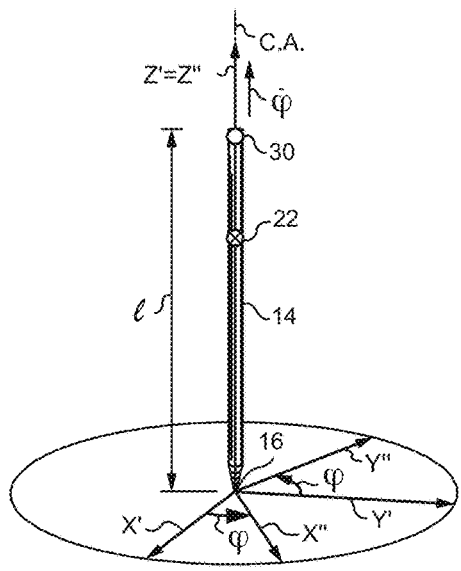
Figure 2B:
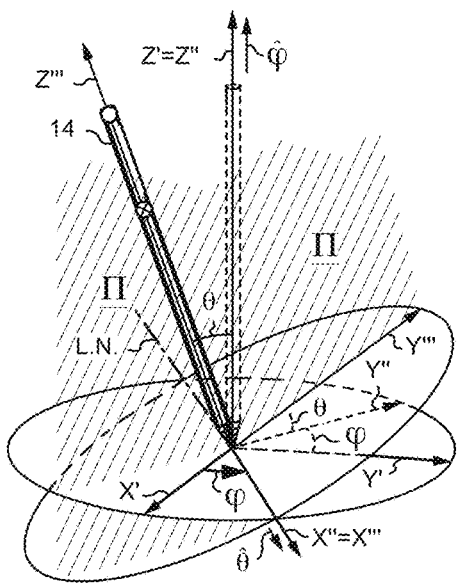
Figure 2C:
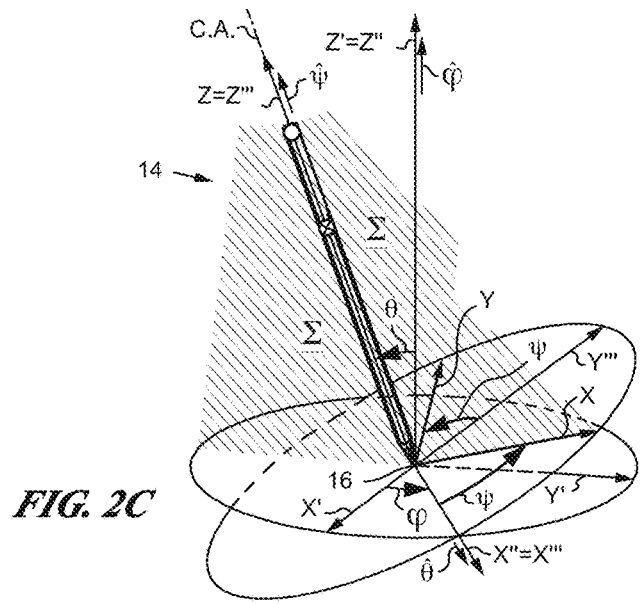

FIGS. 2A-C illustrate a convention for describing the orientation of pointer 14 using Euler angles θ, φ, ψ. Pointer 14 has a length 1 measured from tip 16 at the origin of non-rotated object coordinates (X',Y',Z') as shown in FIG. 2A. Center axis C.A. is collinear with the Z' axis, and it passes through tip 16 and the origin of non-rotated object coordinates (X',Y',Z'). In the passive rotation convention used herein, object coordinates will be attached to pointer 14 while pointer 14 is rotated from its initial upright position in which Z' is parallel to $Z_o$ of world coordinates $(X_o,Y_o,Z_o)$.

Now, FIG. 2A illustrates a first counterclockwise rotation by first Euler angle φ of object coordinates (X',Y',Z') about the Z' axis. This rotation of the object coordinates does not affect the Z' axis so once rotated Z" axis is collinear with non-rotated Z' axis (Z"=Z'). On the other hand, axes X' and Y' are rotated by first Euler angle φ to yield once rotated axes X" and Y".

FIG. 2B illustrates a second counterclockwise rotation by second Euler angle θ applied to once rotated object coordinates (X",Y",Z"). This second rotation is performed about the once rotated X" axis and therefore it does not affect the X" axis (X'''=X"). On the other hand axes Y" and Z" are rotated by second Euler angle θ to yield twice rotated axes Y''' and Z'''. This second rotation is performed in a plane Π containing once rotated axes Y", Z" and twice rotated axes Y''', Z'''. Note that axis C.A. of pointer 14 is rotated counterclockwise by second Euler angle θ in plane Π and remains collinear with twice rotated axis Z'''.

A third counterclockwise rotation by third Euler angle ψ is applied to twice rotated object coordinates (X''', Y''', Z''') as shown in FIG. 1C. Rotation by ψ is performed about twice rotated axis Z''' that is already collinear with object axis Z rotated by all three Euler angles. Meanwhile, twice rotated axes X''',Y''' are rotated by ψ to yield object axes X,Y rotated by all three Euler angles. Object axes X,Y,Z rotated by all three Euler angles φ, θ and ψ define Euler rotated object coordinates (X,Y,Z). Note that tip 16 of pointer 14 remains at the origin of all object coordinates during the Euler rotations.

Now, referring back to FIG. 1, the absolute pose of pointer 14 includes its orientation, i.e., Euler angles (φ, θ, ψ), and position of tip 16, i.e., the coordinates (x,y,z) of tip 16 that was chosen as the reference point. The orientation of pointer 14 and position of tip 16 are expressed in world coordinates $(X_o,Y_o,Z_o)$. World coordinates $(X_o,Y_o,Z_o)$ have a reference location, in this case the world origin (0,0,0) that can be used to describe an absolute position of tip 16. In fact, world coordinates $(X_o,Y_o,Z_o)$ can be used for an absolute measure of any parameter(s) of the pose of pointer 14. Alternatively, any parameter(s) of the pose of pointer 14 can be described in a relative manner, e.g., with reference to non-stationary or relative coordinates $(X_i,Y_i,Z_i)$ or simply with respect to the previous pose.

For the purposes of the present invention, it is important to be able to optically infer, at least from time to time, the absolute pose of pointer 14. To do this, one relates Euler rotated object coordinates describing the orientation of pointer 14 to world coordinates $(X_o,Y_o,Z_o)$. Note that the orientation of object axis Z' in world coordinates $(X_o,Y_o,Z_o)$ prior to the three Euler rotations is normal to plane $(X_o,Y_o)$. Second Euler angle θ defines the only counterclockwise rotation of object coordinates that is not about an object Z axis (this second rotation is about the X"=X''' axis rather than axis Z', Z" or Z'''). Thus, Euler angle θ is an inclination angle θ between the completely Euler rotated object axis Z or axis C.A. and original object axis Z', which is normal to plane $(X_o,Y_o)$.

Optical measuring arrangement 22 infers the absolute pose of pointer 14 during motion 40 at measurement times $t_i$ and processor 26 prepares the corresponding absolute pose data 12. Note that absolute pose data 12 consist of inferred values of parameters (φ,θ,ψ,x,y,z) at measurement times $t_i$. Invariant features 32, 34, 36 are located at positions that are defined in world coordinates $(X_o,Y_o,Z_o)$. These positions stay fixed at least during measurement and usually permanently. Knowledge of the absolute positions of features 32, 34, 36 in world coordinates $(X_o,Y_o,Z_o)$ allows the optical measuring arrangement 22 to describe the absolute pose of pointer 14 with absolute pose data 12 expressed in parameters (φ,θ,ψ,x,y,z) at measurement times $t_i$ in Euler rotated object coordinates within world coordinates $(X_o,Y_o,Z_o)$. The expression of absolute pose data is preferably with respect to a reference location such as world origin (0,0,0) of world coordinates $(X_o,Y_o,Z_o)$.

Of course, alternative locations within world coordinates can also be chosen as reference locations with respect to which the absolute pose of pointer 14 is expressed. For example, the center of invariant feature 34 may be chosen as the reference location and the locations of reference point 16 on pointer 14 at n measurement times $t_i$ can be denoted by corresponding n vectors $D_i$, as shown in the drawing.

The frequency with which the absolute pose is inferred, i.e., the times $t_i$, depends on the use of absolute pose data 12 corresponding to that absolute pose and the desired performance, e.g., temporal resolution. It should be noted that periodic optical inference of absolute pose is not limited to any predetermined times $t_i$ or frequency schedule. In other words, the times between any two successive optical inferences or measurements of the absolute pose can be arbitrary. Preferably, however, arrangement 22 infers the absolute pose at a frequency that is high enough to obtain absolute pose data 12 that describe motion 40 at the temporal resolution required by application 28.

Wireless transmitter 30 of communication link 24 sends absolute pose data 12 here defined by parameters (φ,θ,ψ,x,y,z) collected at measurement times $t_i$ to processor 26. Absolute pose data 12 can be transmitted continuously, in bursts, in parts, at arbitrary or preset times or as otherwise desired. Processor 26 prepares a subset 48 of absolute pose data 12, for example the absolute position (x,y,z) of tip 16 and sends it to application 28. Application 28 uses absolute position (x,y,z) of tip 16 at measurement times $t_i$ to chart trace 42 of tip 16 as pointer 14 executes motion 40. In other words, unit 28 recovers trace 42 corresponding to the movement of tip 16. Note that the resolution of trace 42 in absolute space can be improved by increasing the sample of measurements of absolute trace points traversed in environment 18 by increasing the frequency of measurement times $t_i$.

It should also be noted that pose data 12 should be formatted for appropriate communications between transmitter 30, processor 26 and application 28. Any suitable communication and formatting standards, e.g., IEEE interface standards, can be adapted for these purposes. For specific examples of formatting standards the reader is referred to Rick Poyner, LGC/Telegraphics, "Wintab™ Interface Specification: 16-bit and 32-bit API Reference", revision of May 9, 1996; Universal Serial Bus (USB), "Device Class Definition for Human Interface Devices (HID)", Firmware Specification, USB Implementers' Forum, Jun. 27, 2001 and six-degree of freedom interface by Ulrica Larsson and Johanna Pettersson, "Development and evaluation of a 6DOF interface to be used in a medical application", Thesis, Linkopings University, Department of Science and Technology, Sweden, Jun. 5, 2002.

The orientation portion of absolute pose data 12, i.e., Euler angles $(\varphi,\theta,\psi)$ can also be used in the present embodiment. Specifically, processor 26 can prepare additional subsets or send all of the orientation parameters $(\varphi,\theta,\psi)$ of absolute pose data as a single subset to application 28 or to a different application or device serving a different function. Any mix of orientation $(\varphi,\theta,\psi)$ and position (x,y,z) data derived from absolute pose data 12 can be used in subset 48. In fact, in some embodiments processor 26 keeps all absolute pose data 12 in subset 48 such that all of its parameters $(\varphi,\theta,\psi,x,y,z)$ can be used by application 28. This is done when application 28 has to reconstruct the entire motion 40 of pointer 14 and not just trace 42 of tip 16. For example, this is done when application 28 includes a motion-capture application. Once again, the temporal resolution of motion 40 can be improved by increasing the frequency of measurement times $t_i$. Note that in this case parameters of pose data 12 that vary slowly are oversampled.

Figure 3:
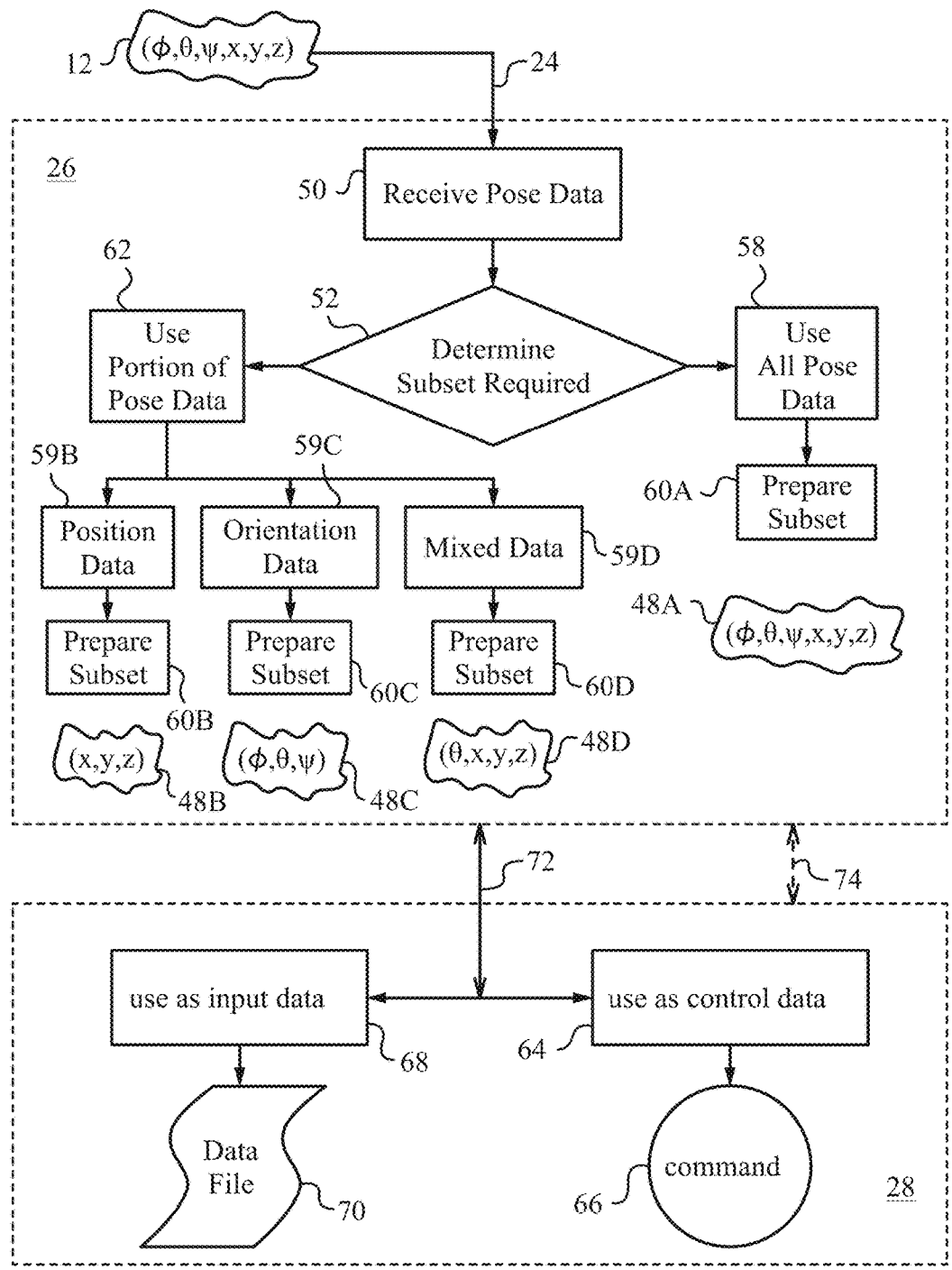
FIG. 3 is a block diagram illustrating the formatting or preparation of the absolute pose data into subsets.

In FIG. 3 a block diagram illustrates the processing of absolute pose data 12 by processor 26 and its use by application 28 in more detail. In a first step 50, absolute pose data 12 is received by processor 26 via communication link 24. In a second step 52, processor 26 determines which portion or subset 48 of absolute pose data 12 is required. This selection can be made based on application 28. For example, when application 28 is a trace-capture application that charts trace 42, then only position data of tip 16, i.e., (x,y,z) of this reference point 16 need to be contained in subset 48. On the other hand, when application 28 is a motion-capture application, then all absolute pose data 12 are contained in subset 48.

In step 58 all absolute pose data 12 are selected and passed to a subset formatting or preparing step 60A. In step 60A data 12 is prepared in the form of subset 48A as required by application 28. For example, data 12 is arranged in a particular order and provided with appropriate footer, header and redundancy bits (not shown), or as otherwise indicated by data porting standards such as those of Rick Poyner, LGC/Telegraphics (op. cit.).

In step 62, only a portion of data 12 is selected. Three exemplary cases of partial selection are shown. In the first case, only position data is required by application 28. Hence, in a step 59B only position data (x,y,z) are selected and the remaining data 12 is discarded. In a subsequent step 60B, position data (x,y,z) are prepared in the form of subset 48B as required by application 28 and/or as dictated by the porting standards.

In a second case, in a step 59C, only orientation data $(\phi,\theta,\psi)$ are selected and the rest of data 12 are discarded. Then, in a step 60C, orientation data $(\phi,\theta,\psi)$ are prepared in the form of a subset 48C for use by application 28.

In the third case, in a step 59D, a mix of data 12, including some position data and some orientation data are selected and processed correspondingly in a step 60D to prepare a subset 48D.

A person skilled in the art will appreciate that the functions described can be shared between processor 26 and application 28, e.g., as required by the system architecture and data porting standards. For example, some preparation of subset 48 can be performed by application 28 upon receipt. It should also be noted that in some embodiments data 12 can be pre-processed by transmitter 30 or post-processed at any point before or after preparation of the corresponding subset 48 in accordance with any suitable algorithm. For example, a statistical algorithm, such as a least squares fit can be applied to data 12 derived at different times $t_i$ or to successive subsets 48. Furthermore, quantities such as time derivatives of any or all parameters, i.e., $$\left(\frac{dx}{dt}, \frac{dy}{dt}, \frac{dz}{dt}, \frac{d\phi}{dt}, \frac{d\theta}{dt}, \frac{d\psi}{dt}\right),$$

can be computed. Also, various sampling techniques, e.g., oversampling can be used.

Subset 48 is transmitted to application 28 via a communication channel 72. Application 28 receives subset 48 as an input that is treated or routed according to its use. For example, in a step 64, subset 48 is used as control data. Thus, subset 48 is interpreted as an executable command 66 or as a part of an executable command. On the other hand, in a step 68, subset 48 is used as input data and saved to a data file 70.

In one embodiment, application 28 passes information to processor 26 to change the selection criteria for subset 48. Such information can be passed via communication channel 72 or over an alternative link, e.g., a feedback link 74. For example, application 28 requests subset 48A to be transmitted and uses subset 48A as input data for data file 70. At other times, application 28 requests subset 48C to be transmitted and uses subset 48C as command data for executable command 66. Alternatively, processor 26 can indicate a priori whether any subset 48 should be treated as input data or control data. In still another alternative, user 38 can indicate with the aid of a separate apparatus, e.g., a switch mounted on pointer 14 (not shown), whether subset 48 is intended as control data or input data. A person skilled in the art will recognize that there exist a large number of active and passive methods for determining the interpretation and handling of data being transmitted in subset 48 by both processor 26 and application 28.

In a specific application 28, subset 48 contains only position data (x,y,z) of reference point or tip 16 of pointer 14 collected at a number of measurement times $t_i$. This subset corresponds to individual points along trace 42 and is an absolute trace expressed by points referenced with respect to origin (0,0,0) of world coordinates $(X_o,Y_o,Z_o)$. For example, in a particular applications 28 trace 42 may be treated as a digital ink trace that is designed to be handled as input data or command data. Alternatively, the absolute points forming trace 42 can be expressed in world coordinates $(X_o,Y_o,Z_o)$ with respect to a reference location other than world origin (0,0,0). FIG. 1 shows that one such alternative reference location can be the center of feature 34, whose absolute position in world coordinates $(X_o,Y_o,Z_o)$ is known. In this case, vectors $D_o, \ldots D_i, \ldots D_n$ describe the absolute position of the points of trace 42 collected at successive measurement times $t_o, \ldots t_i, \ldots t_n$.

In practice, efficient inference of the absolute pose of pointer in terms of absolute pose data expressed in parameters $(\varphi,\theta,\psi,x,y,z)$ representing Euler rotated object coordinates expressed in world coordinates $(X_o,Y_o,Z_o)$ with respect to a reference location, such as world origin (0,0,0) imposes a number of important requirements. Since pointer 14 may be moving in a close-range environment 18 the field of view of on-board optical measuring arrangement 22 must be large. This is particularly crucial in situations where arrangement 22 has to tolerate frequent occlusions of one or more of invariant features 32, 34, 36. Such conditions arise when user 38 operates pointer 14 in a close-range home, gaming or work environment 18, i.e., in a room, a cubicle or other confined real space. Also, if full motion capture is desired, then the rate or frequency of measurement times $t_i$ has to be high in comparison to the rate of movement of the hand of user 38.

Figure 4:
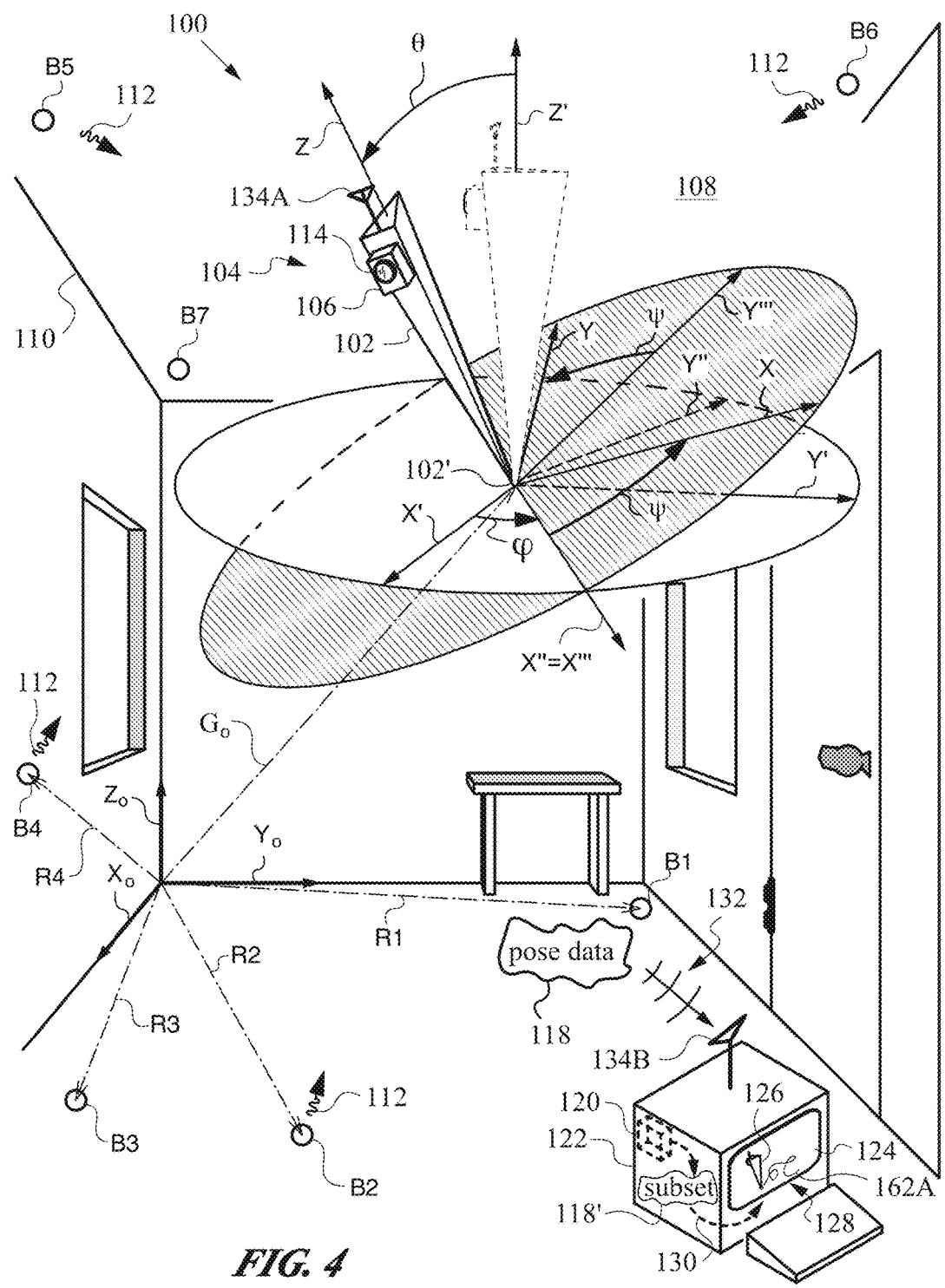
FIG. 4 is a three-dimensional view of another apparatus according to the invention.

To learn how to address these and other practical considerations, we turn to another embodiment of an apparatus 100 according to the invention as shown in FIG. 4. Apparatus 100 has a manipulated object 102 equipped with an on-board optical measuring arrangement 104 having a light-measuring component 106. Apparatus 100 is deployed within a real three-dimensional environment 108. In the case at hand, environment 108 is defined within a room 110 and it is parametrized by global or world coordinates $(X_o,Y_o,Z_o)$ whose world origin (0,0,0) is posited in the lower left rear corner of room 110.

As in the previous embodiment, world origin (0,0,0) is selected as the reference location for expressing the measured values of parameters $(\varphi,\theta,\psi,x,y,z)$ that represent absolute pose data of manipulated object 102 in Euler rotated object coordinates (X,Y,Z). The three successive rotations by Euler angles $(\varphi,\theta,\psi)$ to obtain Euler rotated object coordinates (X,Y,Z) are also indicated in FIG. 4. Also, the original (X',Y',Z'), the once rotated (X'',Y'',Z''), and the twice rotated (X''',Y''',Z''') object coordinates are drawn along the fully Euler rotated (three times rotated) object coordinates (X,Y,Z). Just like in the previous embodiment, a tip 102' of manipulated object 102 is chosen as the reference point. Conveniently, a vector $G_o$ describes the position of reference point 102' in world coordinates $(X_o, Y_o, Z_o)$.

A number of invariant features B1-B7 are placed at known locations in real three-dimensional environment 108 delimited by room 110. Vectors R1-R7 define the locations of corresponding invariant features B1-B7. Following standard convention, vectors R1-R7 extend from world origin (0,0,0) to the centers of the corresponding invariant features B1-B7. All seven invariant features B1-B7 are high optical contrast features. More precisely, invariant features B1-B7 are light sources such as light-emitting diodes that emit electromagnetic radiation or light 112. Preferably, light 112 is in the infrared wavelength range of the electromagnetic spectrum. Light-emitting diodes in that range are typically referred to as infrared emitting diodes or just IR LEDs. For clarity, only four of the seven IR LEDs B1-B7 are shown simultaneously emitting light 112 in FIG. 4.

Optical measuring arrangement 104 with light-measuring component 106 is mounted on-board, and more precisely on one of the sides of manipulated object 102. Component 106 is an absolute motion detection component equipped with a lens 114 and an optical sensor 116 shown in detail in the cut-away view of manipulated object 102 depicted in FIG. 5. Lens 114 faces environment 108 and it has a wide field of view. For example, lens 114 is a fisheye lens whose field of view (F.O.V.) is large enough to view all or nearly all IR LEDs B1-B7 in environment 108 from all absolute poses that it is anticipated to assume while being manipulated by a user (not shown in this drawing).

It should be noted, however, that the handling of manipulated object 102 does not need to be carried out directly by a user. In fact, object 102 can be a remotely controlled object or even an object that is cast or thrown by the user. Whether object 102 is manipulated directly or remotely and whatever its spatial trajectory in environment 108, it is crucial that light-measuring component 106 be optimally placed on object 102 to have a direct line-of-sight to most or all IR LEDs B1-B7 while object 102 is undergoing its intended motion. That is because component 106 needs to capture light 112 emitted by IR LEDs B1-B7 so that it can use these invariant features for optically inferring the values of parameters $(\varphi,\theta,\psi,x,y,z)$. Taken together, parameters $(\varphi,\theta,\psi,x,y,z)$ represent absolute pose data 118 that describes the absolute pose of manipulated object 102.

An appropriate choice of lens 114 will aid in addressing the above optics challenges. Obviously, lens 114 has to be small, robust and low-cost (e.g., moldable in acrylic or other plastic). Lens 114 should not require active focusing and it should have a low F-number (e.g., F#≈1.6 or less) to ensure high light gathering efficiency. At the same time, lens 114 should exhibit low levels of aberration and have a single viewpoint. In other words, lens 114 should exhibit quasi-pinhole optical characteristics. This last attribute is especially important when manipulated object 102 is expected to sometimes pass within a short distance of IR LEDs B1-B7. Under such conditions, the limited depth of field inherent in a normal refractive lens, especially one without active focal length adjustment, would cause a loss of optical information; a familiar problem in machine vision. U.S. Pat. Nos. 7,038,846 and 7,268,956, both to Mandella, teach a suitable design of a catadioptric lens that satisfies these stringent demands.

Apparatus 100 has a processor 120 for preparing pose data 118. In this exemplary embodiment, processor 120 is not on-board manipulated object 102 but is instead integrated in a computing device 122. For example, processor 120 may be a central processing unit (CPU), a graphics processing unit (GPU) or some other unit or combination of units resident on computing device 122. Computing device 122 is shown as a stationary device, but it is understood that it could be a portable device or an ultra-mobile device including a tablet, a PDA or a cell phone.

Besides preparing absolute pose data 118, processor 120 is entrusted with identifying a subset 118' of data 118. As in the prior embodiment, the preparation of data 118 may include just collecting the inferred values of parameters $(\varphi,\theta,\psi,x,y,z)$ corresponding to the absolute pose of object 102. In more involved cases, the preparation of data 118 can include pre- and/or post-processing as well as computation of functions derived from measured values of one or more of parameters $(\varphi,\theta,\psi,x,y,z)$ (including the application of statistical algorithms to one or more these parameters). Meanwhile, identification of subset 118 has to do with the intended use of data 118 and the nature of its application.

Computing device 122 not only hosts processor 120, but also has a display 124 for displaying an output 126 to the user. Output 126 is generated by an application 128 that is running on computing device 122. Application 128 and its output 126 dictate what subset 118' needs to be identified and supplied by processor 120. A simple case arises when application 128 is configured to produce as output 126 a visual element such as a token or even an image of object 102 and compute as well as show its absolute trajectory within room 110 in world coordinates $(X_o,Y_o,Zd$ with respect to reference location (0,0,0). A person skilled in the art will easily discern, that under these constraints application 128 will require that all parameters $(\varphi,\theta,\psi,x,y,z)$ be included in subset 118'. This way, as time progresses, application 128 will be able to alter output 126 in response to the absolute pose of object 102 at different times $t_i$ and, if desired, display a replica of its full trajectory within room 110. Application 128 can display this information as output 126 on display 124 to the user as shown in FIG. 4 or forward the information to still another application.

Computing device 122 employs its own internal communication link 130, e.g., a data bus, to transmit subset 118' to application 128. Meanwhile, a wireless communication link 132 is provided for transmitting data 118 from manipulated object 102 to computing device 122. Wireless link 132 employs a transmitting unit 134A on object 102 and a receiving unit 134B on device 122.

When manipulated object 102 moves within room 110 on-board optical measuring arrangement 104 deploys absolute motion detection component 106. Here, component 106 is a light-measuring component that gathers light 112 emitted from IR LEDs B1-B7. Preferably, all IR LEDs B1-B7 are on at measurement times $t_i$ when the values of parameters $(\varphi,\theta,\psi,x,y,z)$ describing the absolute pose of object 102 are being measured.

Figure 5:
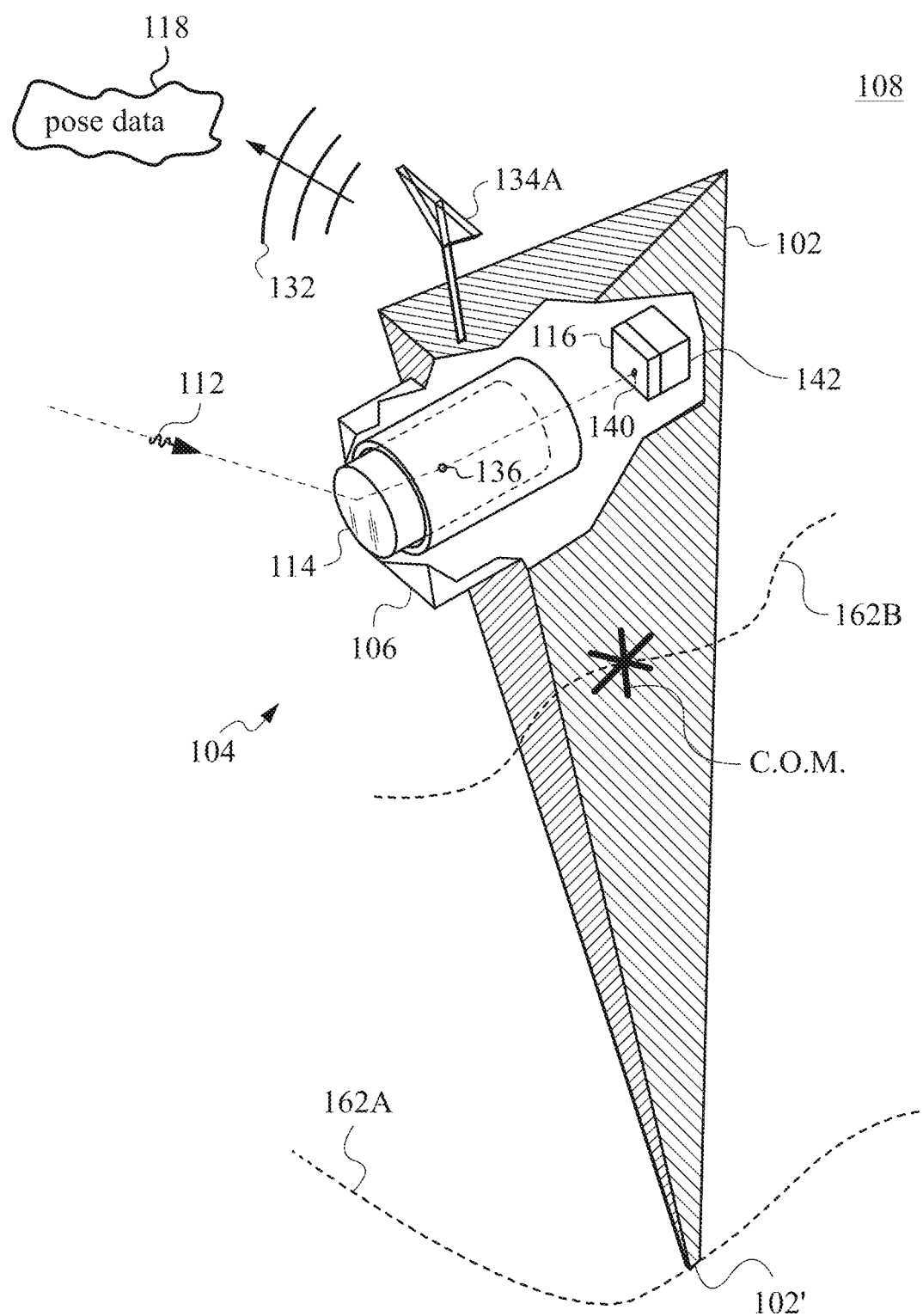
FIG. 5 is a partial cut-away view showing the manipulated object of the apparatus of FIG. 4.

As shown in more detail in FIG. 5, light-measuring component 106 collects light 112 within the field of view of lens 114. Preferably, lens 114 has a single viewpoint 136 and is configured to image room 110 onto optical sensor 116. Thus, lens 114 images light 112 from IR LEDs B1-B7 onto its optical sensor. For reasons of clarity, light 112 from just one IR LED is shown as it is being collected and imaged to an image point 140 on optical sensor 116 by lens 114. Sensor 116 can be any type of suitable light-sensitive sensor, such as a CCD or CMOS sensor coupled with appropriate image processing electronics 142.

Electronics 142 can either fully process signals from sensor 116, or only pre-process them to obtain raw image data. The choice depends on whether fully processed or raw absolute pose data 118 is to be transmitted via wireless link 132 to computing device 122. When sufficient on-board power is available, performing most or all image processing functions on-board object 102 is desirable. In this case electronics 142 include all suitable image processing modules to obtain measured values of parameters $(\varphi,\theta,\psi,x,y,z)$ in their final numeric form. Data 118 being transmitted via link 132 to computing device 122 under these conditions is very compact. On the other hand, when on-board power is limited while the bandwidth of wireless communication link 132 is adequate, then electronics 142 include only the image processing modules that extract raw image data from sensor 116. In this case, raw absolute pose data 118 is transmitted to computing device 122 for further image processing to obtain the inferred or measured values of parameters $(\varphi,\theta,\psi,x,y,z)$ in their final numeric form.

Figure 6:
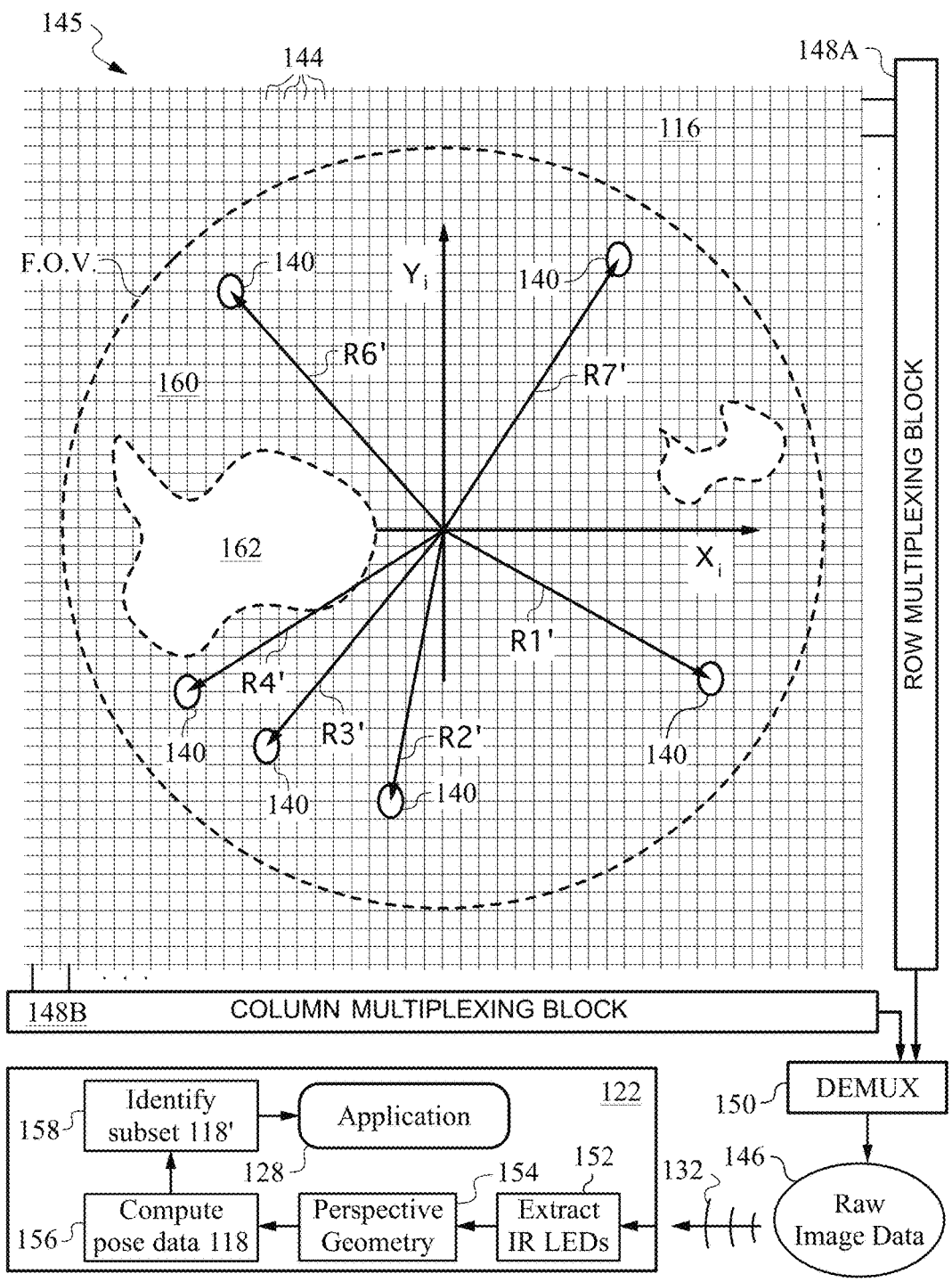
FIG. 6 is a diagram showing the processing of image data captured by the absolute motion detection module on-board the manipulated object of FIG. 5.

In the present embodiment, sensor 116 is a CMOS sensor with a number of light-sensing pixels 144 arranged in an array 145, as shown in FIG. 6. The field of view of lens 112 is designated by F.O.V. and it is indicated on the surface of sensor 116 with a dashed line. Image processing electronics 142 are basic and designed to just capture raw image data 146 from pixels 144 of sensor 116. In particular, electronics 142 have a row multiplexing block 148A, a column multiplexing block 1483 and a demultiplexer 150.

The additional image processing modules depicted in FIG. 6 and required to obtain data 118 in its final numeric form and to identify subset 118' for application 128 all reside on computing device 122. These modules include: extraction of IR LEDs (module 152) from raw image data 146, image undistortion and application of the rules of perspective geometry (module 154), computation of pose data 118 or extraction of inferred or measured values of parameters $(\varphi,\theta,\psi,x,y,z)$ (module 156) and identification of subset 118' (module 158). Note that different image processing modules may be required if invariant features are geometrically more complex than IR LEDs B1-B7, which are mere point sources.

For example, extraction of invariant features such as edges, corners and markings will require the application of suitable image segmentation modules, contrast thresholds, line detection algorithms (e.g., Hough transformations) and many others. For more information on edge detection in images and edge detection algorithms the reader is referred to U.S. Pat. Nos. 6,023,291 and 6,408,109 and to Simon Baker and Shree K. Nayar, "Global Measures of Coherence for Edge Detector Evaluation", Conference on Computer Vision and Pattern Recognition, June 1999, Vol. 2, pp. 373-379 and J. Canny, "A Computational Approach to Edge Detection", IEEE Transactions on Pattern Analysis and Machine Intelligence, Vol. 8, No. 6, November 1986 for basic edge detection all of which are herein incorporated by reference. Additional useful teachings can be found in U.S. Pat. No. 7,203,384 to Carl and U.S. Pat. No. 7,023,536 to Zhang et al. A person skilled in the art will find all the required modules in standard image processing libraries such as OpenCV (Open Source Computer Vision), a library of programming functions for real time computer vision. For more information on OpenCV the reader is referred to G. R. Bradski and A. Kaehler, "Learning OpenCV: Computer Vision with the OpenCV Library", O'Reilly, 2008.

In the present embodiment, the absolute pose of object 102 including the physical location (x,y,z) of reference point 102' (described by vector $G_o$) and the Euler angles $(\varphi,\theta,\psi)$ are inferred with respect to world origin (0,0,0) with the aid of vectors R1-R7. To actually compute these parameters from on-board object 102 it is necessary to recover vectors R1-R7 from images 140 of IR LEDs B1-B7 contained in an image 160 of room 110 as shown on the surface of sensor 116 in FIG. 6. This process is simplified by describing image 160 in image coordinates $(X_i,Y_i)$. Note that due to an occlusion 162, only images 140 of IR LEDs B1-B4, B6, B7 associated with image vectors R1'-R4', R6', R7' are properly imaged by lens 114 onto sensor 116.

In practical situations, occlusion 162 as well as any other occlusions can be due to the user's body or other real entities or beings present in environment 108 obstructing the line-of-sight between lens 114 and IR LED B5. Also note, that if too few of IR LEDs B1-B7 are imaged, then inference of the absolute pose of object 102 may be impossible due to insufficient data. This problem becomes particularly acute if IR LEDs B1-B7 are not distinguishable from each other. Therefore, in a practical application it is important to always provide a sufficiently large number of IR LEDs that are suitably distributed within environment 108. Alternatively or in addition to these precautions, IR LEDs B1-B7 can be made distinguishable by setting them to emit light 112 at different wavelengths.

Referring again to FIG. 6, in a first image processing step electronics 142 demultiplex raw image data 146 from row and column blocks 148A, 148B of array 145 with the aid of demultiplexer 150. Next, wireless communication link 132 transmits raw image data 146 from on-board object 102 to computing device 122. There, raw image data 146 is processed by module 152 to extract images 140 of IR LEDs B1-B7 from raw image data 146. Then, module 154 undistorts the image and applies the rules of perspective geometry to determine the mapping of images 140 of IR LEDs B1-B7 to their actual locations in real three-dimensional environment 108 of room 110. In other words, module 154 recovers vectors R1-R7 from image vectors R1'-R7'.

To properly perform its function, module 154 needs to calibrate the location of the center of image coordinates $(X_i, Y_i)$ with respect to reference point 102'. This calibration is preferably done prior to manipulating object 102, e.g., during first initialization and testing or whenever re-calibration of origin location becomes necessary due to mechanical reasons. The initialization can be performed with the aid of any suitable algorithm for fixing the center of an imaging system. For further information the reader is referred to Carlo Tomasi and John Zhang, "How to Rotate a Camera", Computer Science Department Publication, Stanford University and Berthold K. P. Horn, "Tsai's Camera Calibration Method Revisited", which are herein incorporated by reference.

Armed with the mapping provided by module 154, module 156 obtains the inferred values of parameters $(\varphi,\theta,\psi,x,y,z)$, which represent absolute pose data 118. Data 118 now properly represents the final numerical result that describes the inferred absolute pose of object 102. This description is made in terms of inferred values of parameters $(\varphi,\theta,\psi,x,y,z)$, which are the Euler rotated object coordinates expressed in world coordinates $(X_o, Y_o, Z_o)$ with respect to world origin (0,0,0). In the last step, module 158 identifies a subset 118' of parameters $(\varphi,\theta,\psi,x,y,z)$ to be sent to application 128.

In practice, due to certain optical effects including aberration associated with lens 114, the non-occluded portion of image 160 will exhibit a certain amount of rounding. This rounding can be compensated optically by additional lenses (not shown) and/or electronically during undistortion performed by module 154. Preferably, the rounding is accounted for by applying a transformation to the non-occluded and detected portion of image 160 by module 154. For example, module 154 has an image deformation transformer based on a plane projection to produce a perspective view. Alternatively, module 154 has an image deformation transformer based on a spherical projection to produce a spherical projection. Advantageously, such spherical projection can be transformed to a plane projection with the aid of well-known methods, e.g., as described by Christopher Geyer and Kostas Daniilidis, "A Unifying Theory for Central Panoramic Systems and Practical Implications", www.cis.upenn.edu, Omid Shakernia, et al., "Infinitesimal Motion Estimation from Multiple Central Panoramic Views", Department of EECS, University of California, Berkeley, and Adnan Ansar and Kostas Daniilidis, "Linear Pose Estimation from Points or Lines", Jet Propulsion Laboratory, California Institute of Technology and GRASP Laboratory, University of Pennsylvania which are herein incorporated by reference.

It should also be remarked, that once image 160 is recognized and transformed, a part of the orientation, namely Euler angles $(\varphi,\theta)$ of object 102 can be inferred in several ways. For example, when working with the spherical projection, i.e., with the spherical projection of unobstructed portions of image 160, a direct three-dimensional rotation estimation can be applied to recover inclination angle $\theta$ and polar angle $\varphi$. For this purpose a normal view of room 110 with IR LEDs B1-B7 is stored in a memory (not shown) such that it is available to module 154 for reference purposes. The transformation then yields the Euler angles $(\varphi,\theta)$ of object 102 with respect to IR LEDs B1-B7 and any other high optical contrast invariant features in room 110 by applying the generalized shift theorem. This theorem is related to the Euler theorem stating that any motion in three-dimensional space with one point fixed (in this case the reference point 102' may be considered fixed for the duration of one measurement time $t_i$) can be described by a rotation about some axis. For more information about the shift theorem the reader is referred to Ameesh Makadia and Kostas Daniilidis, "Direct 3D-Rotation Estimation from Spherical Images via a Generalized Shift Theorem", Department of Computer and Information Science, University of Pennsylvania, which is herein incorporated by reference.

Alternatively, when working with a plane projection producing a perspective view of unobstructed portions of image 160 one can use standard rules of geometry to determine inclination angle $\theta$ and polar angle $\varphi$. Several well-known geometrical methods taking advantage of the rules of perspective views can be employed in this case.

Referring back to FIGS. 4 and 5, in the present embodiment, output 126 includes a visual element, namely an image of object 102. Since subset 118' contains all parameters $(\varphi,\theta,\psi,x,y,z)$ and is gathered at many successive measurement times $t_i$, visual element representing object 102 can be shown undergoing its absolute motion in world coordinates $(X_o, Y_o, Z_o)$. For example, in the present case a trajectory 162A of reference point or tip 102' is shown on display 124. In addition, a trajectory 162B of the center of mass designated by C.O.M. could also be displayed on display 124. Depending on application 128, the absolute motion of object 102 could be replayed in parts or in its entirety at normal speed or at an altered rate (slowed down or sped up).

A person skilled in the art will realize that the embodiment of apparatus 100 shown in FIGS. 4-6 is very general. It admits of many variants, both in terms of hardware and software. Practical implementations of the apparatus and method of invention will have to be dictated by the usual limiting factors such as weight, size, power consumption, computational load, overall complexity, cost, desired absolute pose accuracy and so on. Among other, these factors will dictate which type of senor and lens to deploy, and whether most of the image processing should take place on-board object 102 or in computing device 122.

Figure 7:
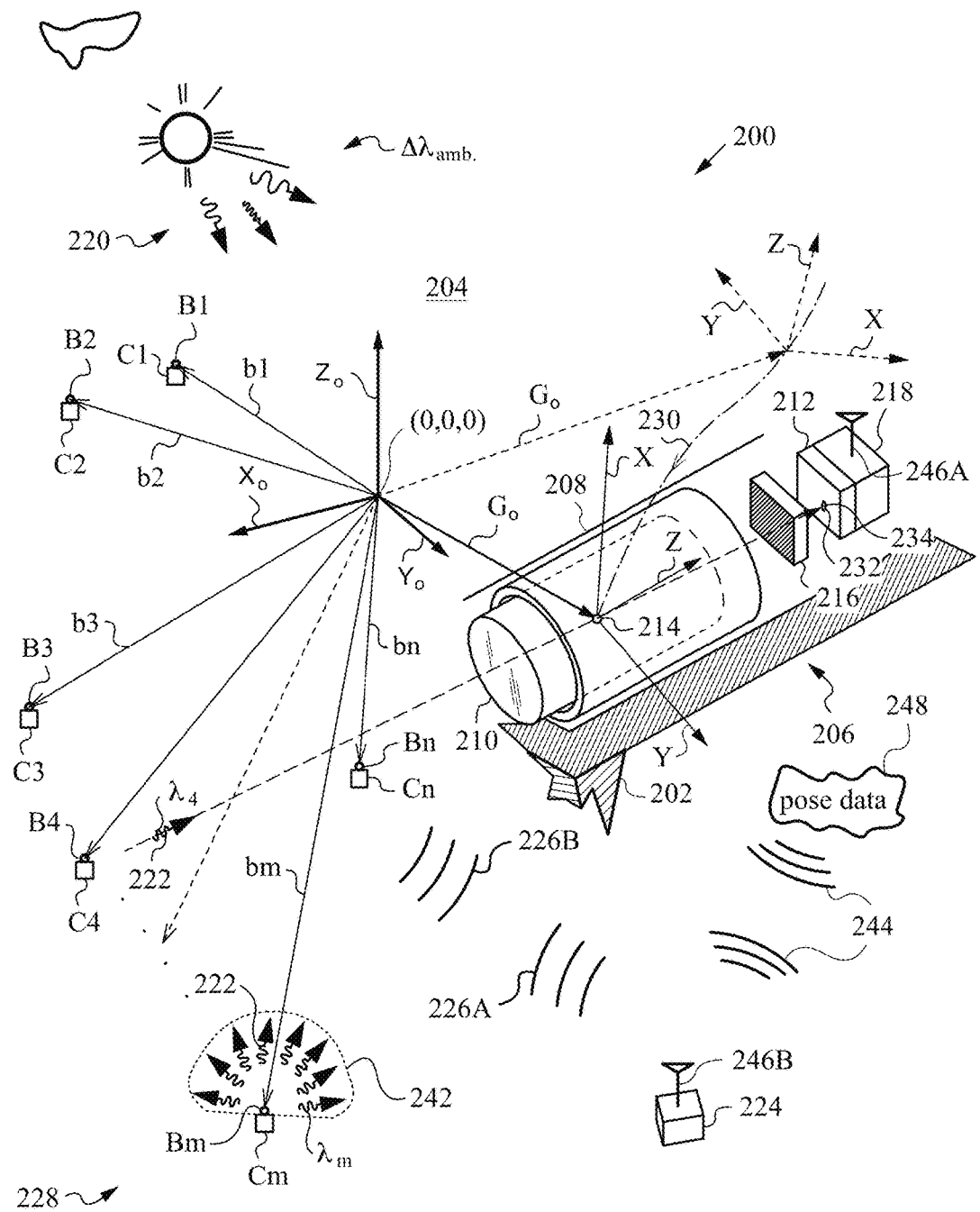
FIG. 7 is a three-dimensional diagram illustrating a preferred optical apparatus for tracking a manipulated object according to the invention.

Another embodiment of an apparatus 200 in accordance with the invention is shown in the three-dimensional diagrammatical view of FIG. 7. Apparatus 200 represents a preferred embodiment of the invention and addresses several of the above-mentioned limiting factors. In particular, apparatus 200 introduces practical simplifications that can be used under numerous circumstances to obtain absolute pose of a manipulated object 202 (only partially shown here for reasons of clarity) that moves in a real three-dimensional environment 204. Environment 204 is described by global or world coordinates $(X_o, Y_o, Z_o)$. Their origin (0,0,0) is chosen as the reference location for apparatus 200 with respect to which the absolute pose or series of absolute poses at different measurement times $t_i$ are expressed.

Environment 204 is an outdoor environment with ambient light 220 provided by the sun over the usual solar spectral range $\Delta\lambda_{amb.}$. A certain number n of invariant features B1-Bn are affixed at known locations in environment 204. Vectors b1-bn are employed to describe the locations of corresponding invariant features B1-Bn in world coordinates $(X_o,Y_o,Z_o)$. All invariant features B1-Bn are high optical contrast features, and, more specifically, they are IR LEDs for emitting electromagnetic radiation or light 222 in the infrared range of the electromagnetic spectrum.

When invariant features are embodied by light sources that are controlled they will be referred to as beacons. Beacons are preferably one-dimensional or point-like and they are implemented by light emitting diodes (LEDs), laser diodes, IR LEDs, optical fibers and the like. Of course, beacons can also be extended sources such as lamps, screens, displays and other light sources as well as any objects providing sufficiently highly levels of electromagnetic radiation that can be controlled. These include projected points and objects, as well as points and objects concentrating and reflecting radiation originating in environment 204 or active illumination from on-board manipulated object 202. The advantage of beacons over simple and uncontrolled light sources is that they are distinguishable.

It is the emission pattern of beacons B1-Bn that is controlled in the present embodiment. Hence, they are distinguishable and play the role of beacons. The emission pattern of beacons B1-Bn is dictated by locations b1-bn at which they are affixed in environment 204 and their on/off timing. In other words, the emission pattern is spatially set by placing beacons B1-Bn at certain locations and it is temporally varied by turning the beacons on and off at certain times.

Beacons B1, B2, ..., Bn are controlled by corresponding controls C1, C2, ..., Cn and a central unit 224 that communicates with the controls. The communications between unit 224 and controls C1, C2, ..., Cn are carried by wireless up-link and down-link signals 226A, 226B. Of course, any method of communication, including wired or optical, can be implemented between central unit 224 and controls C1, C2, ..., Cn. Different communication equipment will typically require different supporting circuitry, as will be appreciated by those skilled in the art. Taken together, controls C1, C2, ..., Cn and unit 224 form an adjustment mechanism 228 for setting or adjusting a sequenced emission pattern of IR LEDs B1, B2, ..., Bn. In other words, adjustment mechanism 228 is capable of modulating all IR LEDs B1-Bn in accordance with a pattern.

Object 202 has an on-board optical measuring arrangement 206 consisting of an absolute motion detection component 208. Component 208 is a light-measuring component with a lens 210 and an optical sensor 212. Light-measuring component 208 has an optical filter 216 positioned before sensor 212, as well as image processing electronics 218 connected to sensor 212. As in the prior embodiment, lens 210 is preferably a wide field of view lens with a substantially single viewpoint 214. Viewpoint 214 is selected as the reference point on manipulated object 202 for expressing the location parameters (x,y,z) of its absolute pose and its orientation parameters $(\varphi,\theta,\psi)$. Hence, vector $G_o$ in this embodiment extends from world origin (0,0,0) to viewpoint 214.

Once again, the absolute pose of object 202 in this embodiment is expressed in the Euler rotated object coordinates (X,Y,Z), whose origin is now attached to viewpoint 214. The manner in which rotations by Euler angles $(\varphi,\theta,\psi)$ are applied to object 202 to express the Euler rotated object coordinates (X,Y,Z) are analogous to the convention explained above and will therefore not be repeated.

The choice of viewpoint 214 of lens 210 as the reference point is very convenient for tracking object 202 and it does not limit the choice of object coordinates, as will be appreciated by those skilled in the art. As before, the absolute pose of object 202 is completely described by six parameters, namely the three components (x,y,z) of displacement vector $G_o$ from the origin of global coordinates $(X_o,Y_o,Z_o)$ to the reference point, in this case viewpoint 214, and the three Euler angles $(\varphi,\theta,\psi)$. A trajectory 230 of object 202 is thus fully described by these six parameters and time t, i.e., $(x,y,z,\varphi,\theta,\psi,t)$.

Notice that lens 210, although shown as a single element in the previous and current embodiments can be compound. In other words, lens 210 can consist of several optical elements including various combinations of refractive and reflective elements. In any of these embodiments, the effective viewpoint 214 can be determined and chosen as reference point on object 202.

Optical sensor 212 of absolute motion detection component 208 is a photosensor designed for sensing light 222 from IR LEDs B1-Bn. In fact, rather than being a sensor with an array of pixels, photosensor 212 is a centroid sensing device or the so-called position-sensing device (PSD) that determines a centroid of the flux of light 222 impinging on it.

Lens 210 has a field of view sufficiently large to capture electromagnetic radiation or light 222 emitted by most or all beacons B1-Bn and image it onto on-board centroid sensing device or PSD 212. Mathematically, it is known that to infer the absolute pose of object 202, i.e., to infer or measure the values of all parameters $(x,y,z,\varphi,\theta,\psi)$ of object 202 in environment 204, at least four among distinguishable beacons B1-Bn need to be in the field of view of lens 210.

Figure 8A:
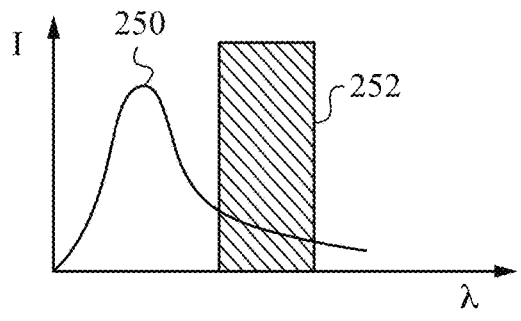
FIG. 8A is a graph illustrating the intensity of a typical ambient emission spectrum.

Optical filter 216 placed before PSD 212 reduces the level of ambient light 220 impinging on PSD 212. Concurrently, the wavelengths of electromagnetic radiation or light 222 provided by LEDs B1-Bn are selected such that they are passed by filter 216. In the present case, ambient radiation 220 is produced by the sun and spans an emission spectrum $\Delta\lambda_{amb.}$, whose intensity (I) peaks in the visible range and drops off in the infrared range as generally shown by graph 250 in FIG. 8A. Consequently, it is advantageous to select the wavelengths $\lambda_1, \lambda_2, \ldots, \lambda_n$ of electromagnetic radiation 222 emitted by LEDs B1-Bn to reside in an infrared range 252.

Figure 8B:
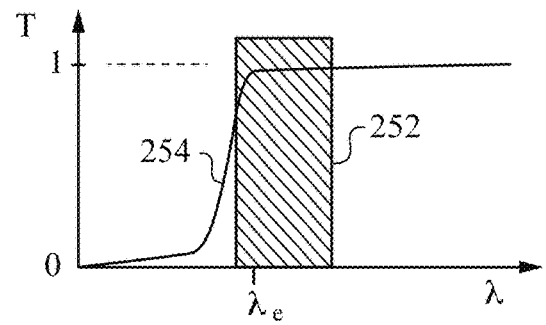
FIG. 8B is a graph illustrating a transmittance of an infrared filter employed in the embodiment of FIG. 7.

It is optional whether all wavelengths $\lambda_1, \lambda_2, \ldots, \lambda_n$ are different or equal. In some embodiments, different wavelengths can be used to further help differentiate between IR LEDs B1-Bn. In the present embodiment, however, all IR LEDs B1-Bn are emitting at the same emission wavelength $\lambda_e$ equal to 950 nm. A transmittance (T) of filter 216 is selected as shown by graph 254 in FIG. 8B, so that all wavelengths in infrared range 252, including $\lambda_e$ in particular pass through. Wavelengths in the far infrared range upwards of 1,000 nm where ambient radiation 220 is even weaker can also be used if a higher signal to background ratio is desired.

Returning to FIG. 7, we see how electromagnetic radiation 222 at the wavelength of 950 nm emitted by beacon B4 passes filter 216 and is imaged onto PSD 212. PSD 212 can be selected from a large group of candidates including, for example, devices such as semiconductor-type position sensitive detectors (PSDs), optical waveguide-based position sensitive detectors and organic material position sensitive detectors. In the present embodiment, device 212 is a semiconductor-type position sensitive detector (PSD) employing a reverse biased p-n junction.

Lens 210 produces an imaged distribution 232 of electromagnetic radiation 222 on PSD 212. PDS 212, in turn, generates electrical signals that represent the x-y position of a center-of-mass or centroid 234 of imaged distribution 232 in x-y plane of PSD 212. In the present case, IR LED B4 is a point-like source of electromagnetic radiation 222 and therefore lens 210 images it to a spot-type distribution 232. In general, it is desirable to keep spot 232 relatively small by appropriate design of lens 210, which is preferably a lens with good imaging properties including low aberration, single viewpoint imaging and high-performance modulation transfer function (MTF). In general, however, optic 210 can be refractive, reflective or catadioptric.

Figure 9:
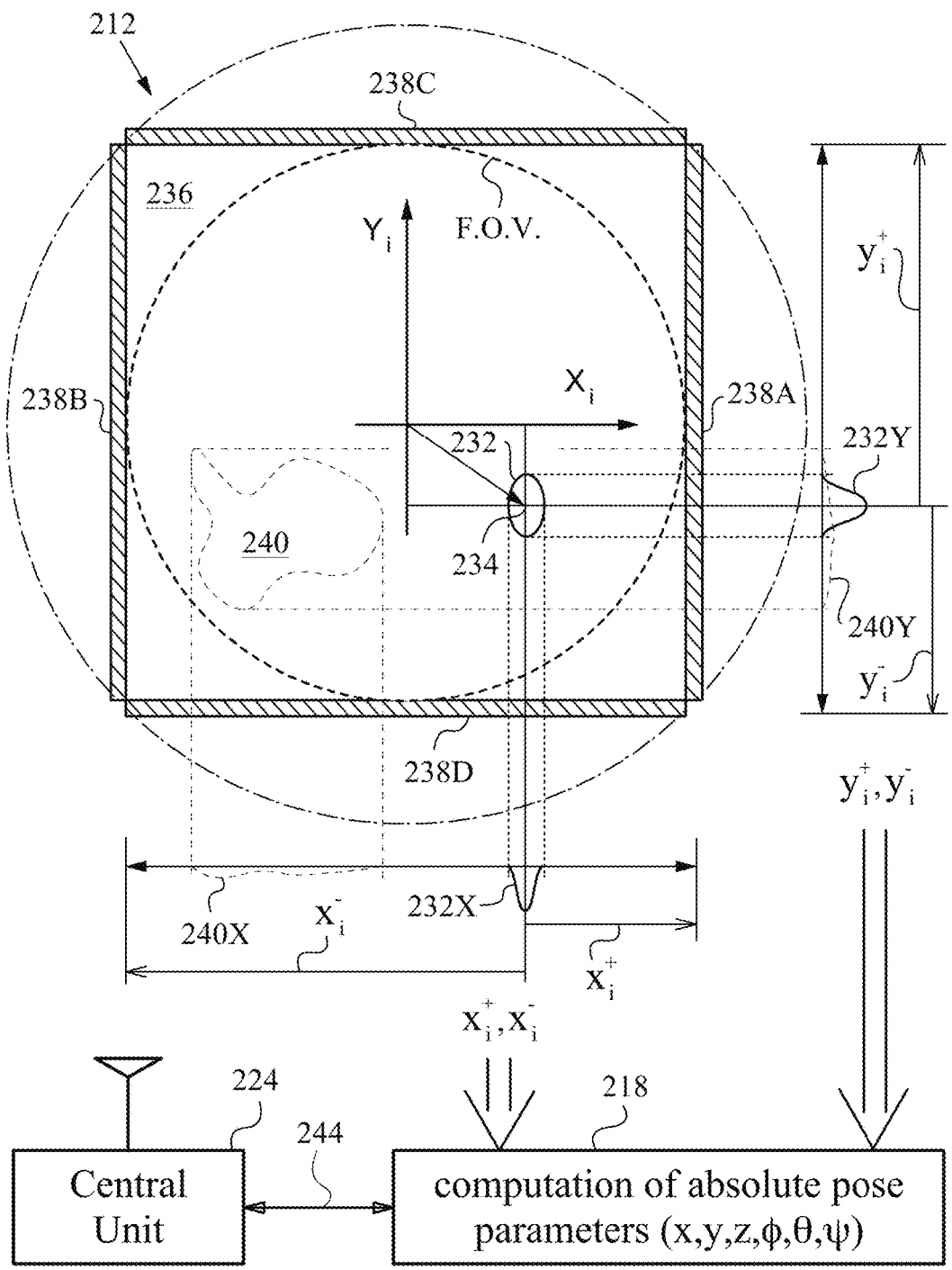
FIG. 9 is a diagram with a top plan view of the surface of a centroid sensing device in the form of a position sensitive detector (PSD).

For a better understanding of PSD 212 we turn to the plan view diagram of its top surface 236 shown in FIG. 9. To distinguish coordinates in the image plane that is coplanar with top surface 236 of PSD 212, the image coordinates are designated $(X_i, Y_i)$. Note that the field of view (F.O.V.) of lens 210 is designated in a dashed line and is inscribed within the rectangular surface 236 of PSD 212. This means that the entire F.O.V. of lens 210 is imaged onto PSD 212. In an alternative embodiment, the F.O.V. may circumscribe surface 236, as indicated in the dashed and dotted line. Under this condition, the image of some beacons may not fall on the surface of PSD 212. Thus, the information from these beacons will not be useful in optically inferring the absolute pose of object 202.

PSD 212 has two electrodes 238A, 238B for deriving signals corresponding to the x-position, namely $x_i^+$ and $x_i^-$, and two electrodes 238C, 238D for obtaining $y_i^+$ and $y_i^-$ signals corresponding to the y-position. The manner in which these signals are generated and processed to obtain the location $(x_i, y_i)$ of centroid 234 is well-known to those skilled in the art and will not be discussed herein. For more information on the subject the reader is referred to manufacturer-specific PSD literature, such as, e.g., "PSD (Position Sensitive Detector)" Selection Guide of Hamamatsu, Solid State Division, July 2003.

The intensities 232X, 232Y of imaged distribution 232, i.e., spot 232, along the $X_i$ and $Y_i$ axes are visualized along the sides. Another imaged distribution 240 due to ambient radiation 220 is also indicated with a dashed line. Corresponding intensities 240X, 240Y along the $X_i$ and $Y_i$ axes are also visualized along the sides. Because of the action of filter 216, intensities 240X, 240Y are low in comparison to 232X, 232Y and the corresponding centroid position thus includes a negligibly small shift error due to the background noise on the desired signal. Such background can be removed with any well-known electronic filtering technique, e.g., standard background subtraction. Corresponding electronics are known and will not be discussed herein.

PSD 212 is connected to image processing electronics 218 and delivers signals $x_i^+$, $x_i^-$, and $y_i^+$, $y_i^-$ to it. Electronics 218 are also in communication with central unit 224 by any suitable link so that it knows which beacon is active (here beacon B4) and thus responsible for centroid 234 at any given time. It is convenient to establish the link wirelessly with up-link and down-link signals 226A, 226B, as shown in FIG. 7.

During operation, optical apparatus 200 uses the knowledge of which beacon produces centroid 234 described by image coordinates $(x_i, y_i)$ and the beacon's location in environment 204 or world coordinates $(X_o, Y_o, Z_o)$ to infer the absolute pose of object 202 in terms of measured values of parameters $(x, y, z, \varphi, \theta, \psi)$. Note that beacons B1-Bn need not be attached or affixed at any permanent location in environment 204, as long as their location at the time of emission of radiation 222 is known to apparatus 200. Moreover, any sequenced pattern of beacons B1-Bn can be used, even a pattern calling for all beacons B1-Bn to be on simultaneously. In the latter case, a constellation of n spots is imaged on PSD 212 and centroid 234 is the center of mass (C.O.M.) of the entire constellation of n spots 232, i.e., it is not associated with a single spot. Of course, in that case the ability to distinguish the beacons is removed and the performance of apparatus 200 will be negatively affected.

For better clarity of explanation, we first consider a modulation or sequenced pattern with only one beacon on at a time. Following such pattern, beacon B4 is turned off and beacon Bm is turned on to emit radiation 222. Note that an intensity distribution 242 of radiation 222 has a wide cone angle such that lens 210 can image radiation 222 even at steep angles of incidence. Alternatively, given knowledge of all possible relative positions between object 202 and beacon Bm, a mechanism can be provided to optimize angular distribution 242 for capture by lens 210.

To commence motion capture, controls C1-Cn and unit 224, i.e., adjustment mechanism 228 implements an initial sequenced pattern of IR LEDs B1-Bn. The initial pattern can be provided by image processing electronics 218 to unit 224 of adjustment mechanism 228 via up-link signals 226A. The initial pattern can be based on any parameter of the last known or inferred absolute pose or any other tracking information. Alternatively, initial sequenced pattern is standard.

Figure 10:
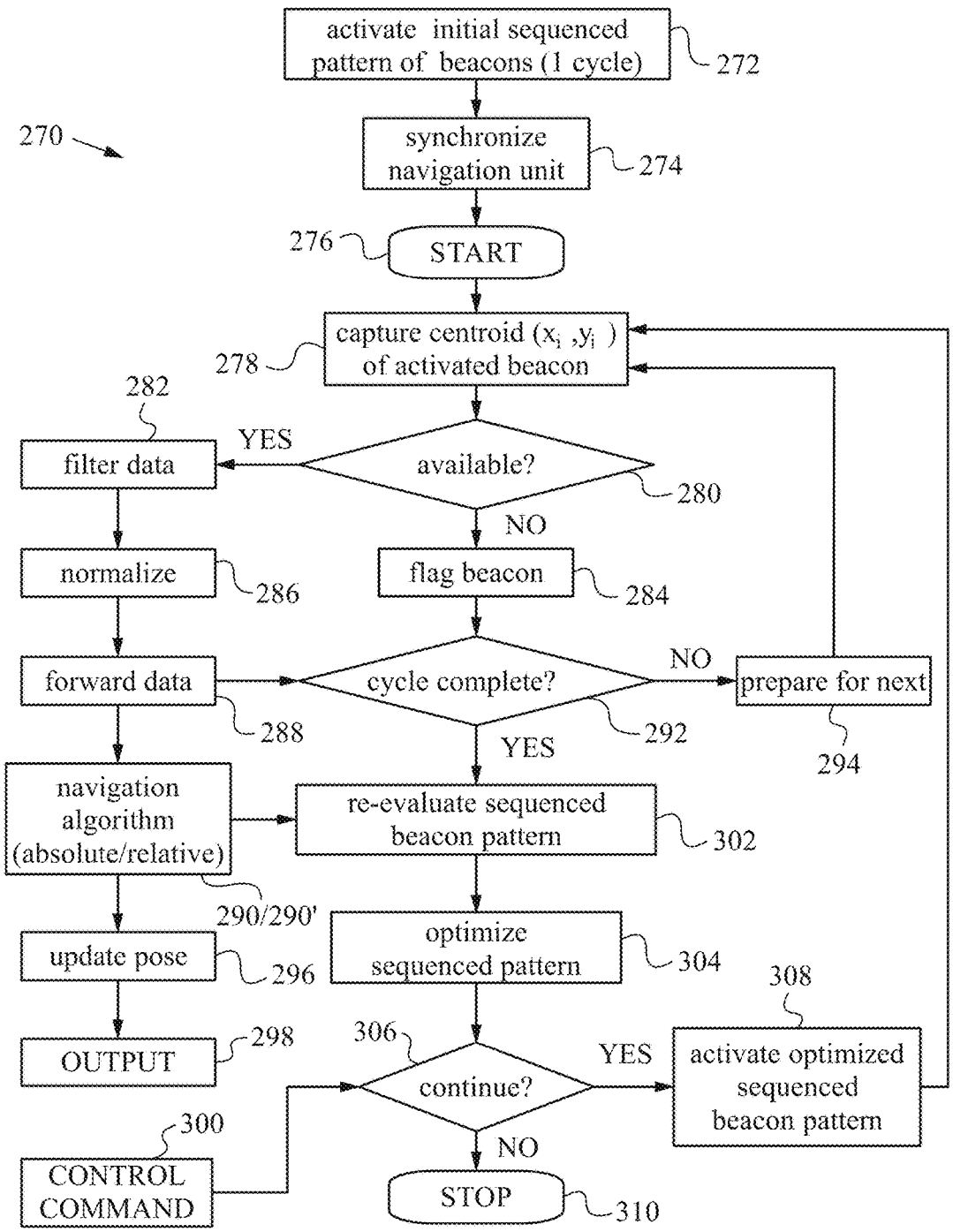
FIG. 10 is a flow diagram of an exemplary absolute pose and motion capture program implemented by the apparatus of FIG. 7.

A flow diagram in FIG. 10 illustrates the steps of an exemplary absolute pose and motion capture program 270 implemented by image processing electronics 218 and mechanism 228. Algorithm 270 commences with activation of initial modulation according to sequenced pattern 272 for one cycle and synchronization of electronics 218 with mechanism 228 in step 274. This is done by matching signals $x_i^+$, $x_i^-$, and $y_i^+$, $y_i^-$ delivered by PSD 212 to electronics 218 with each active beacon as individual beacons B1, B2, . . . , Bn are turned on and off by controls C1, C2, . . . , Cn in accordance with initial sequenced pattern. Drop out of any one beacon is tolerated, as long as synchronization with at least four beacons is confirmed for absolute pose capture or fewer than four but at least one for relative pose determination.

Motion capture starts in step 276. In step 278 signals $x_i^+$, $x_i^-$, and $y_i^+$, $y_i^-$ encoding centroid 234 of activated beacon are sent from PSD 212 to electronics 218 for processing. In step 280 signals are tested for presence (sufficient power level for further processing) and are then filtered in step 282 to obtain filtered data corresponding to centroid 234. Filtering includes background subtraction, signal gain control including lock-in amplification and/or other typical signal processing functions. Absence of signals $x_i^+$, $x_i^-$, and $y_i^+$, $y_i^-$ is used to flag the corresponding beacon in step 284.

After filtering, the data is normalized in step 286. This step involves time-stamping, removing effects of known optical aberrations due to lens 210 and preparing the data for processing by either absolute or relative tracking or navigation algorithms. Normalization also formats data points from each cycle and may include buffering the data, if necessary, while centroid 234 from the next beacon in the pattern is queued up or buffering until a sufficient number of centroids 234 have been captured to perform reliable normalization. In a preferred embodiment, beacons B1, B2, . . . , Bn are amplitude modulated with a series of pulses. In this embodiment, normalization further includes selection of the pulse with most suitable amplitude characteristics (e.g., full dynamic range but no saturation) and discarding signals from other pulses.

In step 288 normalized data of centroid 234 is sent to a tracking or navigation algorithm 290. Contemporaneously, or earlier depending on timing and buffering requirements, absolute pose and motion capture program 270 submits a query 292 whether the first cycle of initial sequenced pattern in complete. The answer is used by navigation algorithm 290 in determining at least one parameter of the pose of object 202 and to prepare for capturing the next centroid in step 294.

Navigation algorithm 290 preferably determines all parameters $(x,y,z,\varphi,\theta,\psi)$ at initialization time $t_{init.}$ in global coordinates $(X_o,Y_o,Z_o)$ based on known locations of beacons B1, B2, ..., Bn, i.e., known vectors b1, b2, ..., bn. Only centroids 234 that are available (i.e., no drop out of corresponding beacon or other failure) and yield reliable centroid data are used. At least four centroids 234 need to be captured from the initial sequenced pattern to measure the values of parameters $(x,y,z,\varphi,\theta,\psi)$ in world coordinates $(X_o,Y_o,Z_o)$. The pose is called absolute when all parameters are known in global coordinates $(X_o,Y_o,Z_o)$ at a given time, e.g., at $t_{init.}$. Navigation using absolute pose or at least one parameter of absolute pose is referred to as absolute tracking or absolute navigation.

In a particular embodiment, beacons B1, B2, ..., Bn are positioned on a plane in a rectangular grid pattern and parameters $(x,y,z,\varphi,\theta,\psi)$ are inferred or measured based on projective, i.e., perspective geometry. In this approach the rules of perspective geometry using the concept of vanishing points lying on a horizon line are applied to determine the location of point of view 214. Specifically, given the locations of at least four coplanar beacons lying on at least three straight intersecting lines framing a rectangular grid in the field of view F.O.V. of lens 210, absolute navigation algorithm 290 defines a horizon and finds conjugate vanishing points from which point of view 214 is determined. Once point of view 214 is known, parameters $(x,y,z,\varphi,\theta,\psi)$ of object 202 are inferred or measured. Initially, point of view 214 is the origin or reference point at $(x,y,z)$. As mentioned above, any other point on object 202 can be used as a reference point based on a coordinate transformation. The perspective geometry and vector algebra necessary to perform absolute navigation are known to skilled artisans of optical image processing and will not be discussed herein. For more details, the reader is referred to K. Kanatani, "Geometric Computation for Machine Vision", Oxford Science Publications; Clarendon Press, Oxford; 1993, Chapters 2-3 and to U.S. Pat. No. 7,203,384 to Carl.

In embodiments where a large number of beacons are used and are available (low drop out), the rules of perspective geometry can be employed to filter beacons that are non-conformant therewith. In other words, the perspective geometry constraint can be used as an additional filter for high-precision absolute tracking or navigation.

Absolute pose expressed with inferred or measured values of parameters $(x,y,z,\varphi,\theta,\psi)$ computed by image processing electronics 218 at initial time $t_{init.}$ in step 290 is used to update trajectory 230 during pose update step 296. Depending on the motion of object 202 and required resolution or accuracy for trajectory 230, the centroid capture rate and time between determinations of absolute pose should be adjusted. At high-speed capture rates absolute navigation algorithm 290 can keep updating parameters $(x,y,z,\varphi,\theta,\psi)$ in a continuous fashion based on at least four most recently captured centroids or even as each successive centroid is obtained. This can be accomplished by substituting the most recently captured centroid for the oldest centroid. Computed trajectory 230, expressed with absolute pose parameters and time $(x,y,z,\varphi,\theta,\psi,t)$, is output in step 298 to an application in the form of a subset. The subset may contain all or fewer than all of the parameters $(x,y,z,\varphi,\theta,\psi,t)$, depending on the requirements of the application.

The application requires knowledge of object's 202 movements for operation, feedback, input, control or other functions. The application has a control mechanism that initiates and terminates operation of motion capture program via control command 300. In several advantageous applications object 202 is a hand-held object that is manipulated directly by the user and trajectory 230 is used as input for the application, as will be addressed in more detail below.

Preferably, upon completion of one cycle of initial sequenced pattern a re-evaluation is performed in step 302. During re-evaluation beacons flagged during step 284 are removed from the data set or the optimized sequenced pattern to speed up operation. Beacons that fail in filtering or normalization steps 282, 286 may be adjusted or left out as well. Finally, any high quality beacons as determined by tracking or navigation algorithm 290 can be used for benchmarking or weighting. Of course, these decisions can be periodically re-checked to ensure that beacons yielding high quality data at a different pose are not turned off permanently. Additionally, intermittent background measurements are made with all beacons off at regular intervals or on an as-needed basis for background subtraction.

Alternatively, optimization and re-evaluation of the sequenced pattern is performed on-the-fly. In this case the initial cycle does not need to be completed and information from some beacons, e.g., the latter portion of the cycle may be disregarded altogether.

In a preferred embodiment of the method, the sequenced pattern of emission of radiation 222 by the beacons is controlled based on the one or more absolute pose parameters determined by tracking or navigation algorithm 290. The control can be a temporal control as in when the beacons are on, or spatial control of which beacons should be used and/or which beacons should be relocated and affixed at new locations in the environment. To this effect, in step 304 an optimized sequenced pattern is prepared based on the re-evaluation from step 302. If the application issues request 306 for further output from motion capture program 270, then the optimized sequenced pattern is activated in step 308 and the cycle of centroid capture re-starts at step 278. Otherwise, motion capture program is terminated in step 310.

In an alternative embodiment, motion capture program 270 employs an absolute navigation algorithm 290 that only determines a subset of absolute pose parameters $(x,y,z,\varphi,\theta,\psi)$. In one example, only $(x,y,z)$ parameters defining the position of point of view 214 (vector $G_o$) or some other reference point on object 202 are determined. These parameters can be used when orientation parameters $(\varphi,\theta,\psi)$ are not required by the application. An example of such application is a three-dimensional digitizer. In another example, only orientation parameters $(\varphi,\theta,\psi)$ of the pose of object 202 are determined. These can be used by an application that requires only orientation or angle information for its input or control functions, e.g., when object 202 is a remote pointer, joystick, three-dimensional controller, pointer, other hand-held object or indeed any object in need of angular tracking or navigation only.

In still another alternative embodiment, motion capture program 270 employs a relative navigation algorithm 290' that only determines changes in some or all parameters $(\Delta x,\Delta y,\Delta z,\Delta\varphi,\Delta\theta,\Delta\psi)$. For example, navigation algorithm 290' determines linear and/or angular velocities $$\left(\frac{dx}{dt}, \frac{dy}{dt}, \frac{dz}{dt}, \frac{d\varphi}{dt}, \frac{d\theta}{dt}, \frac{d\psi}{dt}\right),$$

accelerations or higher order rates of change, such as jerk, of any absolute pose parameter or combinations thereof. It should be noted that absolute pose may not be inferred or measured at all by relative navigation algorithm 290'. Thus, the rates of change may be the results of variations of unknown combinations of absolute pose parameters. Relative navigation algorithm 290' is advantageous for applications that do not require knowledge of trajectory 230 but just rates of change. Such applications include navigation of relative hand-held devices such as two-dimensional mice, three-dimensional mice, relative mouse-pens and other low-accuracy controls or relative input devices.

Apparatus 200 is inherently low-bandwidth, since PSD 212 reports just four values, namely $(x_i^+, x_i^-, y_i^+, y_i^-)$ corresponding to the location of centroid 234 produced by one or more known beacons. The intrinsically high signal-to-noise ratio (SNR) of centroid 234 due to low background noise allows apparatus 200 to operate at high capture rates, e.g., up to 10 kHz and higher, rendering it ideal for tracking fast moving objects. In fact, apparatus 200 is sufficiently robust to navigate even rapidly moving hand-held objects, including pointers, controllers, mice, high-precision gamer instruments, jotting implements and the like in close-range environments or constrained areas such as desks, hand-held notepads, point-of-sale environments and various game- and work-spaces.

Optical navigation apparatus 200 admits of many more specific embodiments. First and foremost, centroid sensing device 212 can use various physical principles to obtain the centroid of imaged distribution 232 of electromagnetic radiation 222 (and ambient radiation 220). A person skilled in the art will recognize that even a regular full field sensor, e.g., a digital CMOS sensor, can act as centroid sensing device 212. In general, however, the use of a standard full-frame capture CMOS sensor with a large number of individual pixels will not be very efficient. That is due to the large computational burden associated with processing large numbers of image pixels and lack of intrinsic facility in centroid sensing. In addition, fast motion capture and high frame rates required for navigating hand-held objects with on-board optical measuring arrangement are not compatible with the high-power and large bandwidth requirements of digital CMOS sensors.

Figure 11:
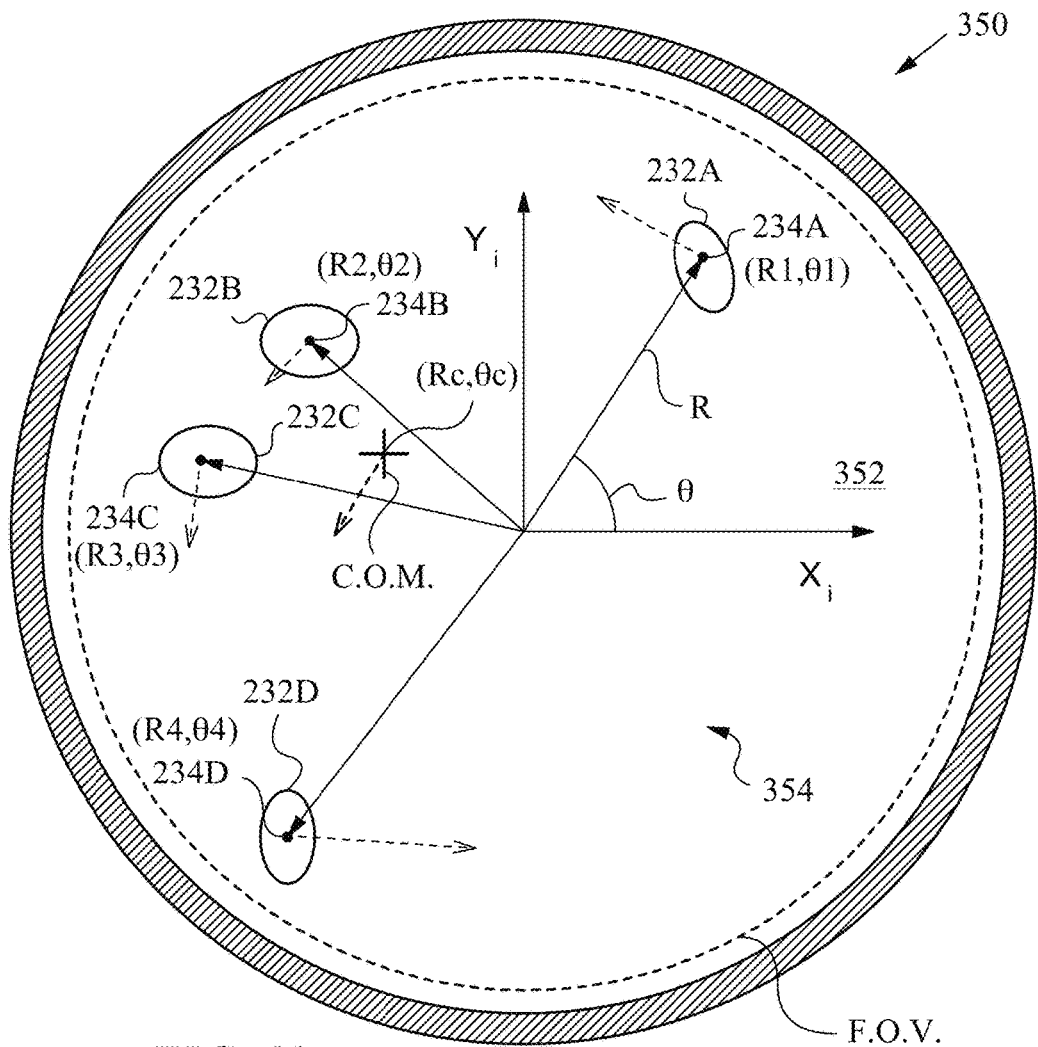
FIG. 11 is a top plan view of a position sensing device (PSD) with circular symmetry for use in optical apparatus in accordance with the present invention.

Optical apparatus 200 for processing pose data can employ many other types of centroid sensing devices as PSD 212. Some examples of such devices can be found in U.S. Patent Application 2007/0211239 to Mandella et al. A particularly convenient centroid sensing device has circular and planar geometry conformant to the naturally circular F.O.V. of lens 210. FIG. 11 shows such a circular PSD 350 of the semiconductor type in which the field of view F.O.V. is conformant with a sensing surface 352 of PSD 350. In this embodiment four of beacons B1-Bn are active at the same time and produce an imaged intensity distribution 354 that is a constellation of four spots 232A, 232B, 232C and 232D at four locations in the image plane of PSD 350. A center of mass (C.O.M.) of constellation 354 at the time of detection is designated with a cross and depends on the relative positions and intensities of spots 232A-D.

The circular geometry of PSD 250 enables operation in polar coordinates $(R,\theta)$. In this convention each of four spots 232A, 232B, 232C and 232D has a centroid 234A, 234B, 234C and 234D described by polar coordinates $(R1,\theta1)$, $(R2,\theta2)$, $(R3,\theta3)$ and $(R4,\theta4)$. However, due to its principles of operation PSD 350 reports to electronics 218 only polar coordinates $(Rc,\theta c)$, of the C.O.M.

A set of dashed arrows show the movement of centroids 234A, 234B, 234C and 234D and C.O.M. as a function of time. Note that applying optical flow without inferring or measuring the absolute pose of object 202 indicates an overall rotation and can be used as input for any relative motion device, e.g., an optical mouse. In such functional mode, absolute motion component 208 operates as an auxiliary motion component and more precisely an optical flow measuring unit that determines relative motion. Relative motion information obtained from optical flow can be very valuable and it can supplement absolute pose data in certain cases. For example, it can be used to interpolate motion of object 202 between times $t_i$ when absolute pose is inferred or measured.

In the last step, absolute pose data 248 consisting of all absolute pose parameters $(x,y,z,\varphi,\theta,\psi)$ are transmitted to an application running on control unit 224 via a wireless communication link 244 using a transceiver 246A on-board object 202 and a transceiver 246B on unit 224. In this embodiment unit 224 is running a monitoring application to supervise manipulated object 202 without displaying any output.

Note that in this embodiment, electronics 218 can pick the subset that is needed for the monitoring application running on unit 224. An uplink exists from unit 224 back to electronics 218 (as indicated) to communicate changes in the required subset or subsets for the application as they may arise. Thus, if manipulated object 202 is not experiencing any linear displacements, i.e., the coordinates (x,y,z) of its viewpoint 214 are static, then the subset of orientation parameters $(\varphi,\theta,\psi)$ is not relevant and does not need to be requested by unit 224.

Figure 12:
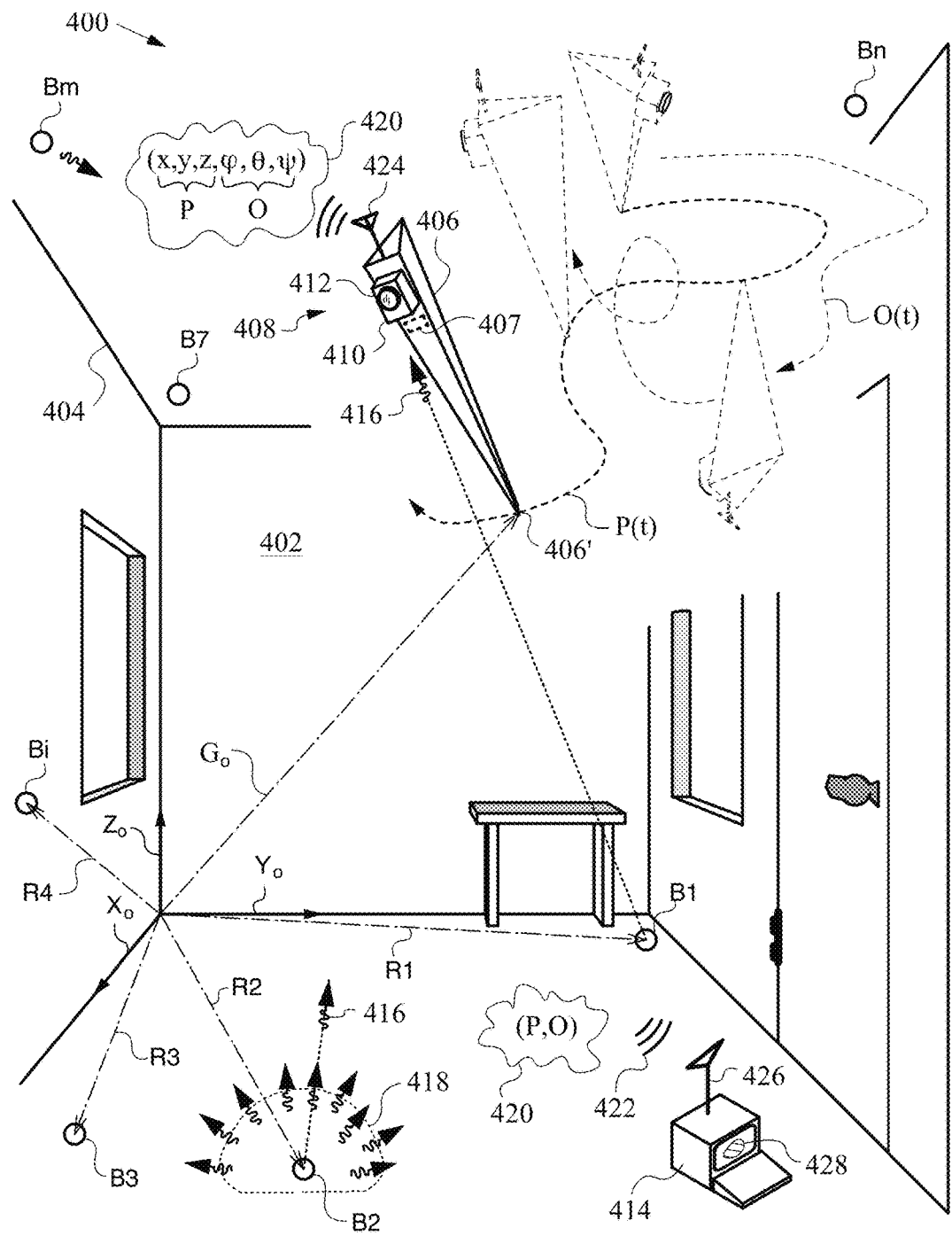
FIG. 12 is a three-dimensional diagram of another optical apparatus for tracking a manipulated object and employing a PSD and beacons.

FIG. 12 illustrates a more application-specific embodiment of an apparatus 400 according to the invention in a real three-dimensional environment 402 defined by a room 404. A manipulated object 406 having an on-board optical measuring arrangement 408 that has an absolute pose measuring component 410 is constrained to move within room 404. Component 410 has a lens 412 that is substantially single viewpoint and has a wide field of view. Component 410 employs a PSD as its sensor (not shown in present figure) in a manner analogous to component 208 of the previous embodiment.

A series of IR LEDs B1-Bn (not all shown) are located in environment 402 at known locations in world coordinates $(X_o,Y_o,Z_o)$. IR LEDs B1-Bn are distinguishable since they are modulated as beacons in a sequenced pattern that is remotely controlled by a computing device 414. Beacons B1-Bn emit light 416 at a fixed wavelength in the infrared range. Each beacon has a large cone angle 418, as exemplified by beacon B2.

In a manner similar to the previous embodiment, component 410 infers the absolute pose of manipulated object 406 it terms of measured values of parameters $(x,y,z,\varphi,\theta,\psi)$ from observing sequentially flashing beacons B1-Bn. The reference location is the world origin and the reference point on object 406 is its tip 406'.

Absolute pose of object 406 is determined at a rate of 100 Hz or more and is processed by an on-board processor 407. Processor 407 may be a part of absolute motion measuring component 410 or it can be a separate processor. Processor 407 separates absolute pose data 420 into two subsets P and O. Subset P contains only position parameters (x,y,z) of tip 406', or equivalently, the components of vector $G_o$. Subset O contains only orientation parameters $(\varphi,\theta,\psi)$ of object 406. A trajectory of tip 406' is designated by P(t), which is the collection of subsets P at measurement times $t_i$, or P(t)=(x, y,z,$t_i$). Meanwhile a history of orientations of object 406 is designated by O(t), which is the collection of subsets O at measurement times $t_i$, or O(t)=($\varphi,\theta,\psi,t_i$).

Both trajectory P(t) and a representation of orientations O(t) are indicated in dashed lines in FIG. 12. When measurement times $t_i$ are synchronized for both subsets, then subset P and subset O can be combined. Otherwise, they should be kept apart marked with their own corresponding measurement times $t_i$.

A wireless communication link 422 employing a transmitter 424 on object 406 and a receiver 426 on computing device 414 is used to transmit pose data 420 to computing device 414. In the present case absolute pose data 420 is broken up into time-synchronized subsets P and O. These subsets are transmitted via link 422 to an application 428 running on computing device 414. More specifically, subsets (P,O) captured at times $t_1, t_2, \ldots t_i$ are transmitted sequentially to application 428 at a rate of about 100 Hz or higher.

Figure 13:
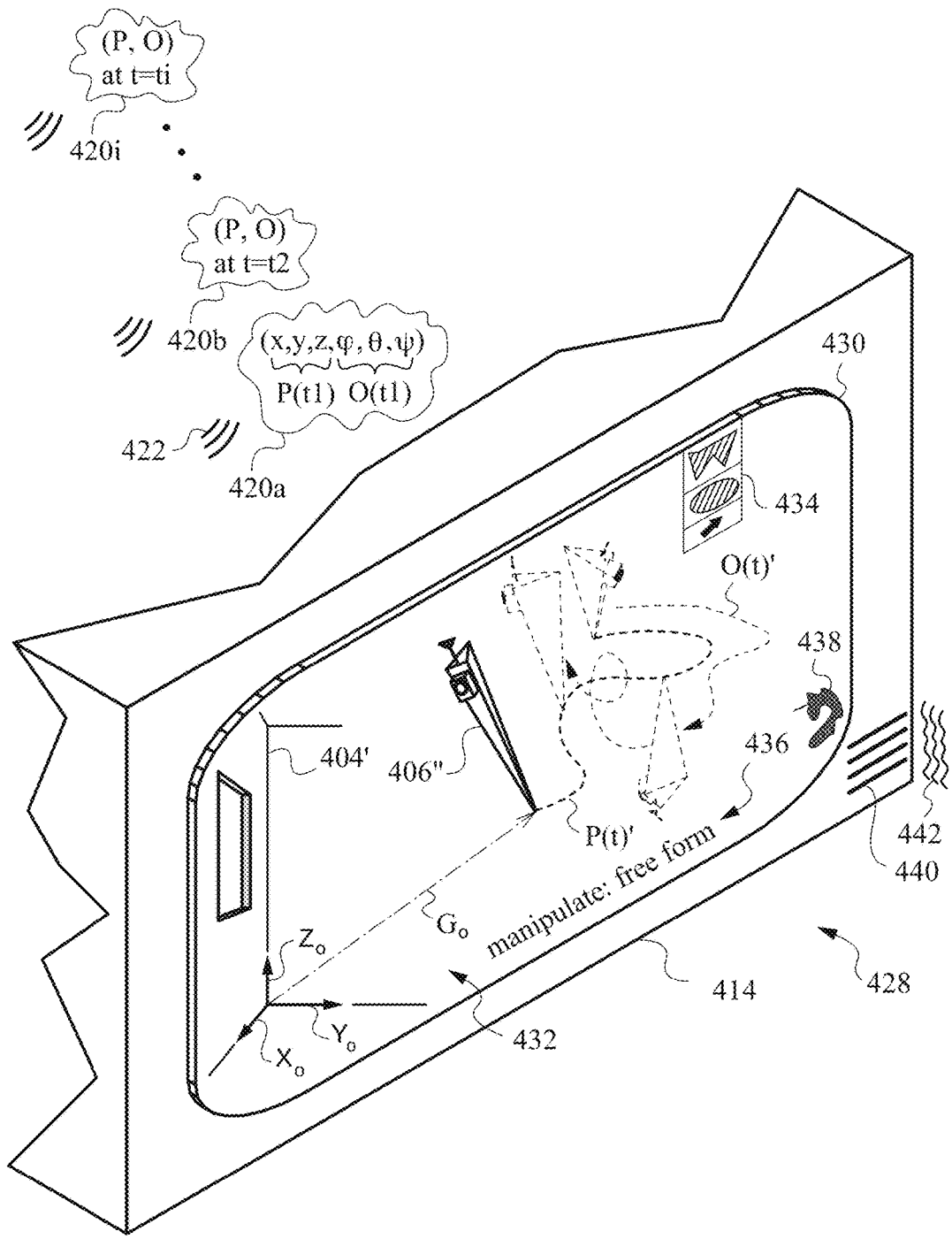
FIG. 13 is a three-dimensional diagram showing in more detail the display and output generated by the application of the optical apparatus of FIG. 12.

FIG. 13 illustrates the transmission of subsets 420 and computing device 414 receiving subsets 420 in more detail. Computing device 414 has a display screen 430 for displaying an output 432 of application 428 to a user (not shown). Note that the user to whom output 432 is displayed on screen 430 need not be the same user as the one remotely or directly manipulating object 406. Output 432 is broken down into a number of visual elements, including an image 404' of room 404 and an image 406" of manipulated object 406. Output 432 also includes a graphical palette of commands and options 434, instructions displayed as text 436 and an icon 438 to launch and terminate application 428.

Subsets 420a, 420b, . . . 420i arriving sequentially via communication link 422 provide the input for interacting with output 432 of application 428. Application 428 is programmed in such a manner that prior and newly arrived subsets O and P are represented graphically in the form of trajectories O(t)' and P(t)'. In addition, manipulating object 406 in real three-dimensional space 402 of room 404 such that image 406" lands on icon 438 turns application 428 on and off. Furthermore, placing image 406" over commands and options 434 selects them. Finally, trajectory P(t)' can be converted into a digital ink trace and converted into text using standard conversion algorithms analogous to those used in tablet PCs and known to those skilled in the art. The converted text can be displayed along text 436 already present on display screen 430. In this manner, subsets P and O are employed by application 428 as input for interacting with its output 432.

Computing device 414 also has a speaker 440 mounted to the side of display screen 430. Application 428 can thus also take advantage of audio elements 442 to supplement output 432 consisting of only visual elements. For example, audio elements 442 can be constituted by tones, e.g., warning tones when image 406" of object 406 is moving off screen. Another audio element 442 can be a tune, e.g., to announce the launch or termination of application 428. Still another audio element 442 may be a musical composition that is selected or adjusted in volume or other auditory parameter by data from subsets P and O. For example, the location of tip 406' as communicated by P(t) can control the volume. Finally, audio element 442 may simply be an alert signal when either subset P or O exhibit certain type of data. For example, when trajectory P(t) changes too rapidly and the user manipulating object 406 in real three-dimensional space 402 should slow down in moving object 406.

Figure 14:
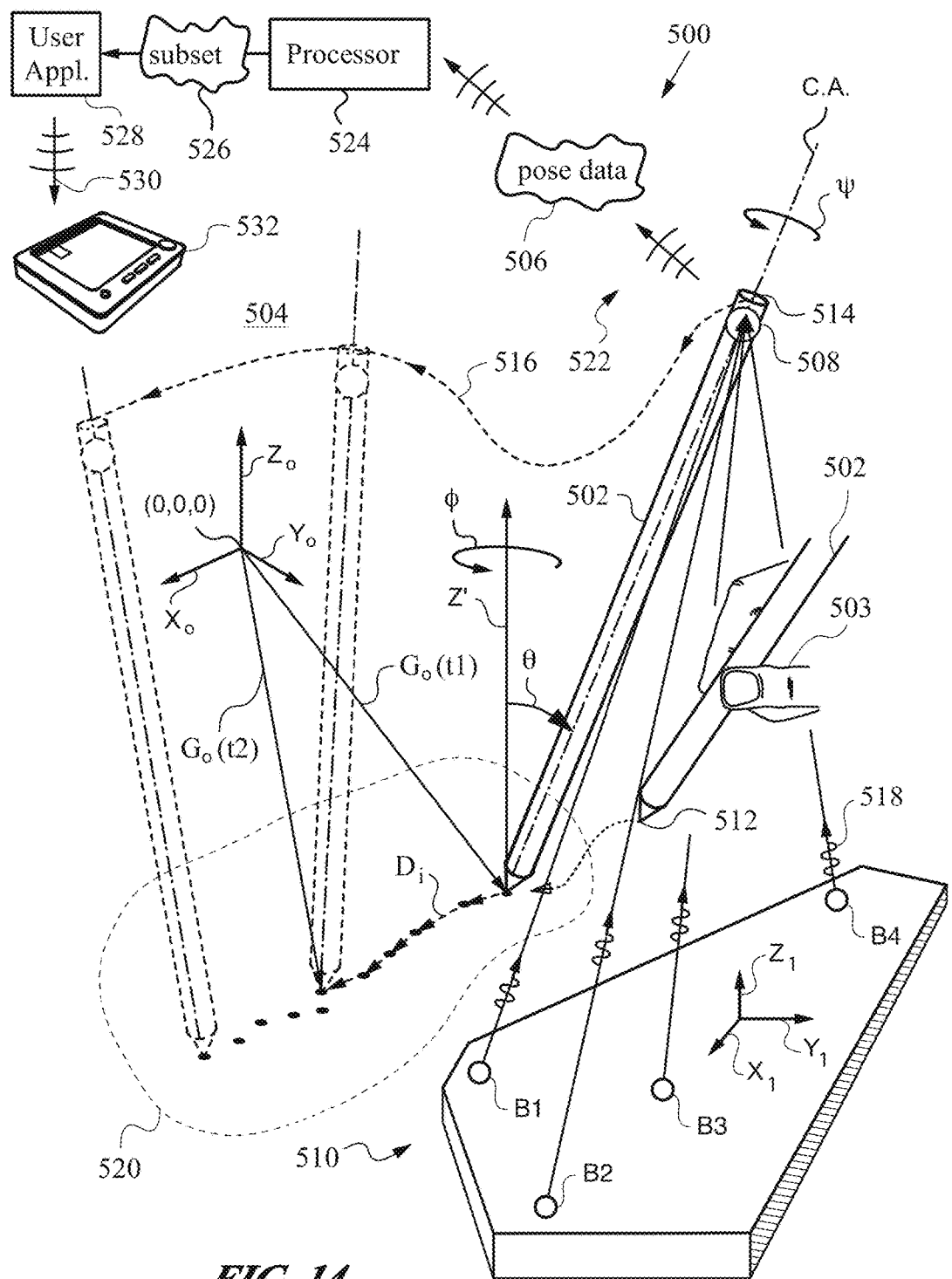
FIG. 14 is a three-dimensional diagram of another apparatus in which the manipulated object is a hand-held tool.

FIG. 14 illustrates yet another embodiment of an apparatus 500 for moving a manipulated object 502 by hand 503 in a real three-dimensional environment 504 while tracking the absolute pose of object 502. Environment 504 is parametrized by world coordinates ($X_o,Y_o,Z_o$). World origin (0,0,0) is used as the reference location for reporting absolute pose data 506.

On-board optical measuring arrangement 508 has a lens and a PSD in its absolute motion detection component. Their arrangement and operation is analogous to those described in the previous two embodiments. Meanwhile, beacons B1-B4 are IR LEDs mounted on a reference object 510 that is positioned at a known location and in a known spatial relationship to world origin (0,0,0). In other words, the pose of reference object 510, itself parametrized by coordinates ($X_1,Y_1,Z_1$), as embedded in world coordinates ($X_o,Y_o,Z_o$) is known.

The angular motion or change in orientation parameters of manipulated object 502 in environment 504 is expressed with the aid of Euler angles ($\varphi,\theta,\psi$). The reference point for describing the Euler rotated object coordinates is a tool tip 512 of object 502. Position of tool tip 512 is expressed in Cartesian coordinates (x,y,z). The successive positions of tool tip 512 are defined with the aid of vectors $G_o$ obtained at different times $t_i$; i.e., by vectors $G_o(t_i)$. The actual trajectory of tool tip 512 is expressed by vectors $D_i$ connecting the tips of successive vectors $G_o(t_i)$. The trajectory of a distal end 514 of object 502 is indicated by reference 516.

IR LEDs B1-B4 emit infrared light 518 according to a modulation scheme imposed by a suitable control mechanism (not shown) integrated into reference object 510. The modulation scheme renders IR LEDs B1-B4 distinguishable, as required of light sources serving as beacons. The number of IR LEDs should be increased from the minimum of 4 to at least 16 and preferably 32 or more if sub-millimeter accuracy on the absolute pose and absolute motion of object 502 is required. Furthermore, they should be spaced as far apart as possible given the dimensions of reference object 510. For example, a two- or three-dimensional grid pattern is a good spatial arrangement for IR LEDs. Additionally, it is advantageous if IR LEDs are placed in a grid structure that subtends a portion of environment 504 designated as work space 520 in which tool 502 will be operated. For planar arrangements of IR LEDs integrated into reference object 510, it is also advantageous to operate tool tip 512 as close as possible to the centroid of the smallest convex set containing the IR LEDs (i.e., the distribution's convex hull).

When the spatial arrangement and number of IR LEDs is sufficiently optimized to yield sub-millimeter accuracy on the location of tool tip 512, and sub-degree accuracy on orientation parameters ($\varphi,\theta,\psi$) within work space 520 then object 502 can be a precision tool. For example, in this embodiment manipulated object 502 can be a jotting implement, a surgical implement, a three-dimensional digitizer, a digitizing stylus, a hand-held tool such as a cutting implement or a utensil. More specifically, in the present embodiment tool 502 is a scalpel, work space 520 is an operating area (patient and incision not shown) and tool tip 512 is a blade tip.

The absolute motion tracking method of the invention with scalpel 502 is implemented by transmitting pose data 506 via a communication link 522 to processor 524 at times $t_i$. Processor 524 picks out as subset 526 orientation parameters ($\varphi,\theta,\psi$) and position parameters of tool tip 512 described by vectors $D_i$ at times $t_i$. In order to keep good track of the sequence of absolute poses, each subset 526 is appended with its corresponding measurement time $t_i$. Thus, subsets 526 are expressed as ($\varphi,\theta,\psi,D_i,t_i$). Note that vectors $D_i$ could alternatively be expressed in coordinates ($X_1,Y_1$, $Z_1$) of reference object 510, since the full spatial relationship between world coordinates ($X_o,Y_o,Z_o$) and reference object 510 is known.

After preparation of absolute pose data 506 and identification of subsets 526, processor 524 forwards them to an application 528. Application 528 is preferably implemented on a physician's computer (not shown). Application 528 can be a reality simulation that allows an intern to follow an actual surgery in real time or perform their own mock surgery with scalpel 502. Application 528 can also be a remote control application, in which a physician performs a surgery with a mock version of tool 502. Then, a communication link such as the world wide web 530 relays subsets 526 to another module of remote surgery application 528 that is implemented on a remote device 532 that duplicates the motion encoded in subsets 526 to perform an actual surgery on an actual patient at the remote location with an actual scalpel (not shown).

In an alternative embodiment, tool 502 is a hand-held utensil whose working tip 512 is used for performing some useful function, e.g., stamping or marking an object located in work space 520. In this case application 228 is a general motion-capture application and the frequency of measurement times $t_i$ is on the order of 75 Hz. In some motion-capture applications such as biometric applications requiring precise knowledge of the motion of utensil 502, e.g., to derive a biometric aspect of hand 503, more frequent measurement times $t_i$, e.g., in excess of 100 Hz or event in excess of 200 Hz can be used. In particular, such precise knowledge can be required when the biometric application is a user verification application.

Figure 15:
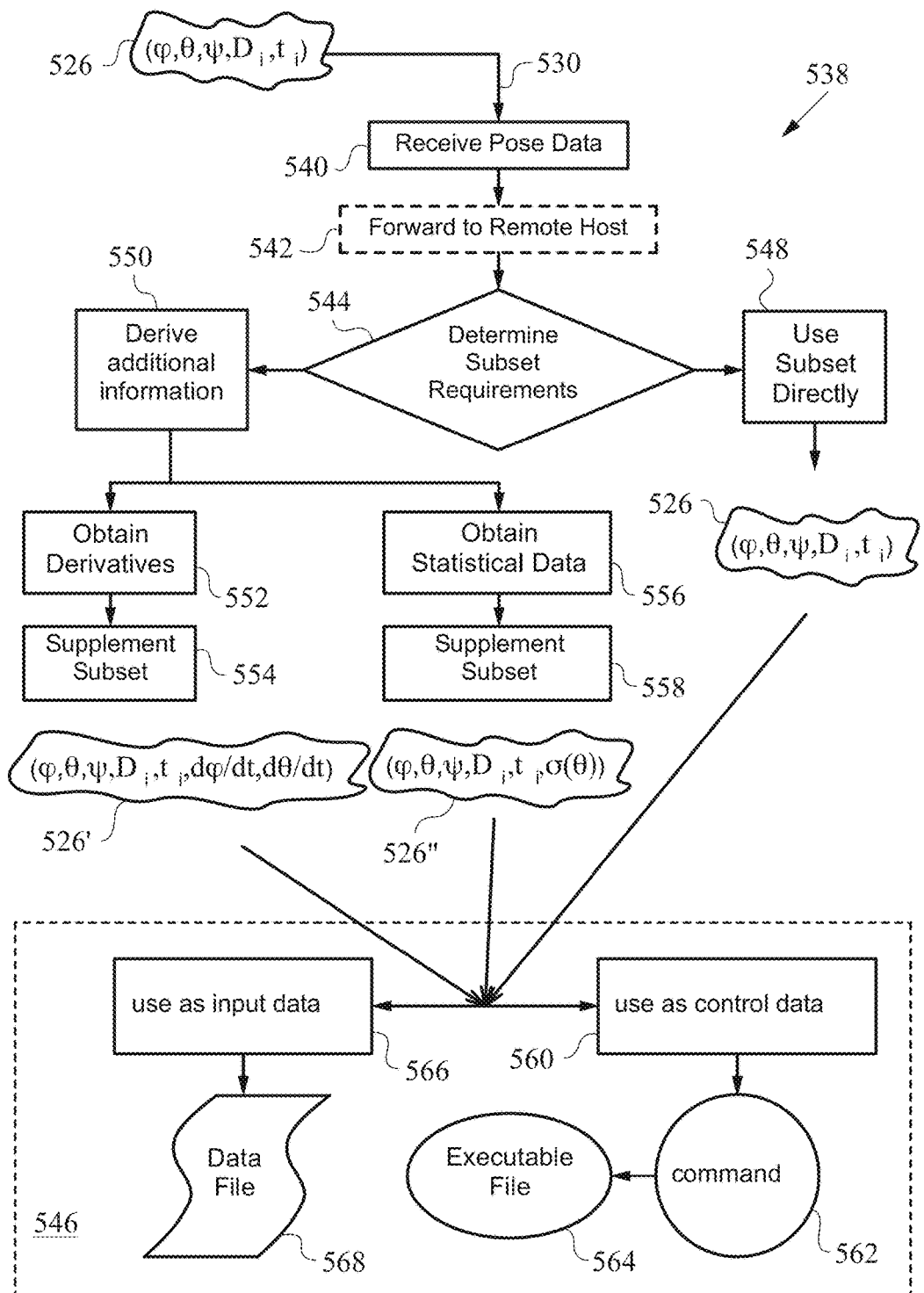
FIG. 15 is a block diagram illustrating a few exemplary uses of command and input data derived from a manipulated object in accordance with the invention.

FIG. 15 is a block diagram illustrating a few exemplary uses of input derived from a manipulated object that can be used with any of the previously embodiments, and especially with the embodiments employing beacons and PSD sensors. In fact, block diagram may represent a module 538 or a routine integrated with any application according to the invention. For the purposes of the present description, we will show how module 538 works with application 528 of the embodiment from FIG. 14.

In a first step 540, subset 526 is received by either a local host or a network via communication link 530. If subset 526 is intended for a remote host, then it is forwarded to the remote host in a step 542. In a second step 544, a processor in the intended host (local host or remote host, as the case may be) determines the requirements for subset 526. This selection can be made based on an intended final application 546. For example, when final application 546 only requires the parameters already contained in subset 526, then subset 526 is forwarded to step 548 for preparation and direct use. Alternatively, when application 546 requires additional parameters, subset 526 is forwarded to step 550 for derivation of these additional parameters.

For example, the additional parameters are derivatives of one or more of the parameters in subset 526. Thus, subset 526 is sent to a differentiation module 552 and then to a preparation module 554 for supplementing subset 526 with the derivatives. In the example shown, time derivatives of Euler angles $\varphi$ and $\theta$ are required and thus, supplemented and prepared subset 526' contains these time derivatives. Alternatively, statistical information about one or more of the parameters in subset 526 are required. Thus, subset 526 is sent to a statistics module 556 and then to a preparation module 558 for supplementing subset 526 with the statistical information. In the present example, the statistical information is a standard deviation of second Euler angle $\theta$. Thus, supplemented and prepared subset 526" contains the parameters of subset 526 and standard deviation $\sigma(\theta)$ of angle $\theta$.

A person skilled in the art will appreciate that the functions described can be shared between local and remote hosts as well as application 546, e.g., as required by the system architecture and data porting standards. For example, some preparation and supplementing of subset 526 can be performed by application 546 upon receipt.

Subset 526 is transmitted to application 546 for use as an input that is treated or routed according to its use. For example, in a step 560, subset 526' is used as control data. Thus, subset 526' is interpreted as an executable command 562 or as a part of an executable command and used in an executable file 564. On the other hand, in a step 566, subset 526" is used as input data and saved to a data file 568.

In general, application 546 has an output that is presented to one or more users. Meanwhile, the handling of tool 502 generates subsets 526 that are used as input; either in the form of control data or input data. There is a feedback loop between motion of tool 502 in real three-dimensional environment 504 and the output of application 546. Subsets 526 produced from motion of tool 502 by hand 503 in real space serve as input for interacting with the output of application 546 that runs on a computer, e.g., tablet PC 532. This relationship between input derived from motion of tool 502 in real space and output of computer-implemented application 528 renders the method of invention ideal for interfaces that require a more direct and kinesthetically intuitive interaction with applications in the digital world. This is particularly true of applications that include simulations of real world events or applications that try to render cyberspace more accessible to human users.

Figure 16:
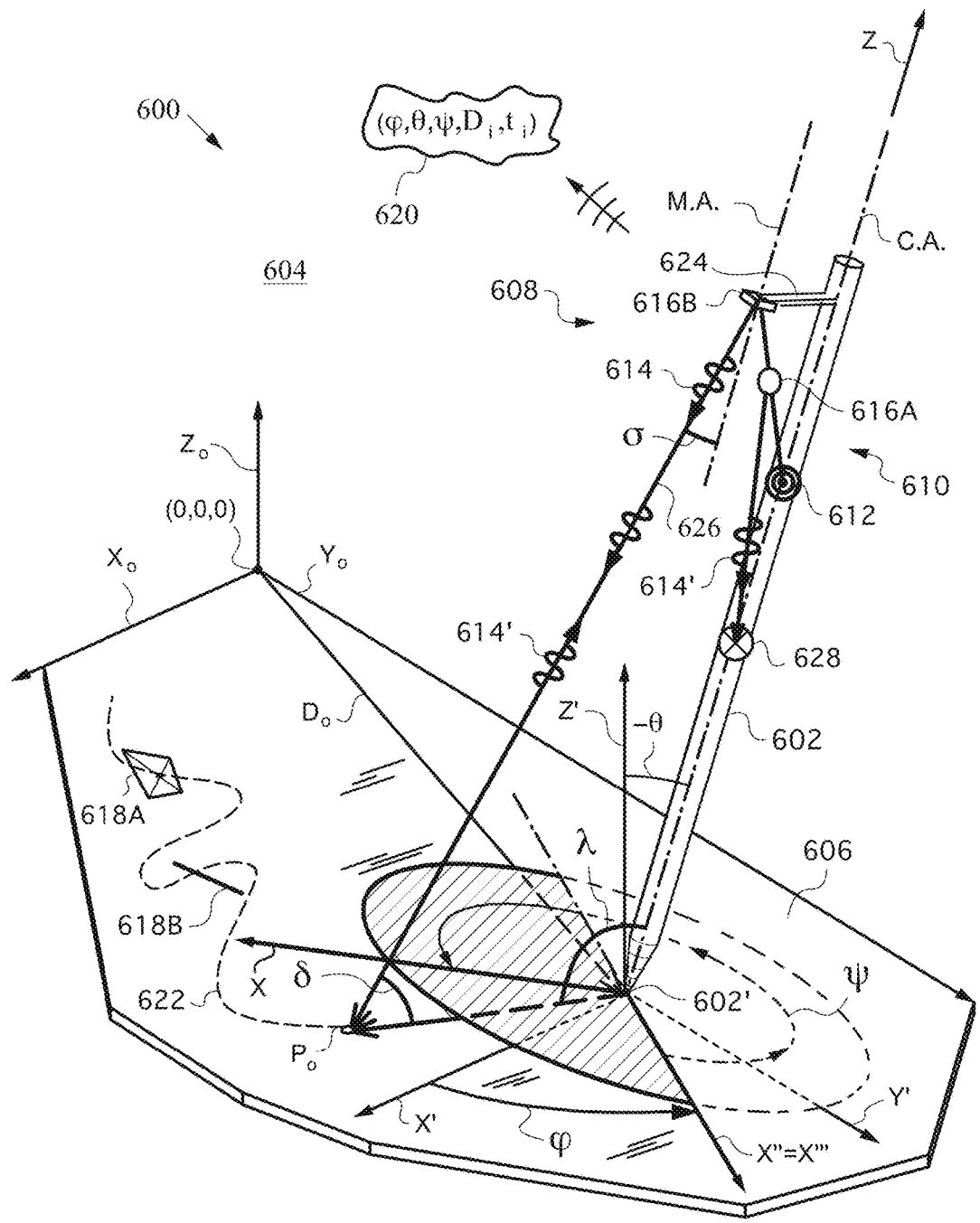
FIG. 16 is a three-dimensional diagram showing a manipulated object using an active illumination component with a tiltable scanning mirror.

FIG. 16 illustrates another alternative embodiment of an apparatus 600 according to the invention. In this embodiment manipulated object 602 is a control wand that is to be moved by hand through a real three-dimensional environment 604. Environment 604 includes a tablet 606 whose upper right corner is taken as world origin (0,0,0) of world coordinates ($X_o,Y_o,Z_o$). A tip 602' of control wand 602 is taken as the reference point for reporting Euler rotated object coordinates (X,Y,Z) with respect to world origin (0,0,0) in the same convention as described above. Similarly, vector $D_o$ from world origin (0,0,0) to tip 602' describes the instantaneous location of tip 602' in world coordinates ($X_o,Y_o,Z_o$).

Object 602 has an on-board optical measuring arrangement 608 for absolute pose tracking. Unlike in the prior embodiments, arrangement 608 does not rely only on ambient light. Instead, it has an active illumination component 610. Component 610 includes a source 612 for generating a light 614 and optics 616A, 616B for conditioning light 614 and projecting it into environment 604. Specifically, optic 616A is a beam splitter and optic 616B is a mirror. Additional optics, such as lenses may be included as well (not shown) for condition and projecting light 614.

Active illumination component 610 is simultaneously designed to receive a scattered portion 614' of light 614 coming from one or more invariant features 618A, 618B located in environment 604. In the present embodiment, features 618A, 618B are markings deposited on the surface of tablet 606. It is particularly advantageous in this embodiment, if markings 618A, 618B are high optical contrast features under projected light 614 by virtue of being highly reflective to light 614. In fact, preferably markings 618A, 618B are retro-reflectors or made of a retro-reflective material.

Arrangement 608 employs scattered portion 614' of light 614 for optically inferring or measuring the absolute pose of wand 602. The inferred absolute pose 620 is again reported with parameters $(\varphi,\theta,\psi,D_i,t_i)$, which include the values of vector $D_o$ at times $t_i$, herein again denoted as $D_i$. In order to provide the requisite information in its scattered portion 614', projected light 614 needs to carry spatial information. One way to imbue light 614 with such information is to provide it with structure. For example, light 614 can be a structured light projected in some pattern 622. Pattern 622 can be a time-invariant grid pattern or it can be a time-varying pattern. These options are well known to those skilled in the art of optical scanners with constant and time-varying scan patterns.

In the present embodiment, pattern 622 is a time-varying scanned pattern. To accomplish this, active illumination component 610 has a scanning unit 624. Unit 624 drives and controls mirror 616B, which is a scanning mirror in this case. When correctly driven, scanning mirror 616B executes an appropriate movement to trace out pattern 622.

In FIG. 16 absolute pose 620 of control wand 602 is indicated with the aid of vector $D_o$ and object coordinates (X,Y,Z) rotated three times by three Euler angles $(\varphi,\theta,\psi)$. Clearly, the manner in which pattern 622 imparted on structured light 614 is projected onto or how it intersects invariant features 618A, 618B on the surface of tablet 606 will change as a function of the wand's 602 absolute pose 620. It is this change in projection onto invariant features 618A, 618B that permits on-board optical measuring arrangement 608 to infer absolute pose 620 of wand 602. The generation, interpretation and inference of absolute pose 620 from appropriate scan patterns and their back-scattered light is a subject well known in the art and it will not be discussed herein. For additional teachings on scanning techniques and derivation of pose parameters the reader is referred to U.S. Pat. No. 7,023,536 to Zhang et al., U.S. Pat. Nos. 7,088,440; 7,161,664 both to Buermann et al., and the references cited therein.

Scanning mirror 616B may be a tiltable or rotatable mirror, depending on scan pattern 622 desired. In the event mirror 616B is tiltable, it can be uniaxial for executing a one-dimensional scan pattern 622, or biaxial for executing a two-dimensional scan pattern 622. A scan point $P_o$ of scan pattern 622 produced with projected light 614 intersecting tablet 606 and shown in FIG. 15 is associated with a scan angle σ of scanning mirror 616B.

In the present embodiment, scanning mirror 616B is a tiltable biaxial mirror that executes a two-dimensional scan pattern 622 parametrized by scan angle σ referenced to mirror axis M.A. Additionally, projected light 614 is collimated into a scanning light beam 626. Angle δ denotes the angle of incidence of scanning light beam 626 on tablet 606 at scan point $P_o$. Angle λ is the inclination angle of wand 602 with respect to the surface of tablet 606. Since invariant features 618A, 618B are retro-reflecting, angle δ is also the angle at which scattered portion 614' returns from them to arrangement 608. A photodetector 628 is provided on-board wand 602 for receiving scattered portion 614'. Mirror 616B and beam splitter 616A guide scattered portion 614' to photodetector 628 in this embodiment.

Preferably, the scan of an entire scan pattern 622 is executed rapidly, e.g., at kHz rates. Such rapid scanning is required to generate many scattered portions 614' of light 614 coming from retro-reflecting invariant features 618A, 618B during each second. This ensures that there is sufficient data for arrangement 608 to infer absolute pose 620. In addition, scan pattern 622 should cover enough real space to ensure that scanning light beam 626 intersects features 618A, 618B from any of the absolute poses that wand 602 is expected to assume during regular operation. This can be accomplished by choosing a dense scan pattern 622 and a large scan angle σ. One possible two-dimensional scan pattern that satisfies these constraints is a Lissajous figure projected over a scan angle σ extending from −35° to +35°.

The times during the scan pattern 622 when scattered portions 614' are detected by photodetector 628 indicate where, with respect to wand 602, invariant features 618A, 618B are located at those times. It should be noted that employing scan pattern 622 is also very useful in recognizing invariant features such as bar codes and other markings extensively used in commerce. Therefore, wand 602 with active illumination component 610 can be particularly useful in applications having to locate and simultaneously identify bar-code bearing objects that are present in environment 604 and may or may not be placed on tablet 606.

Figure 17:
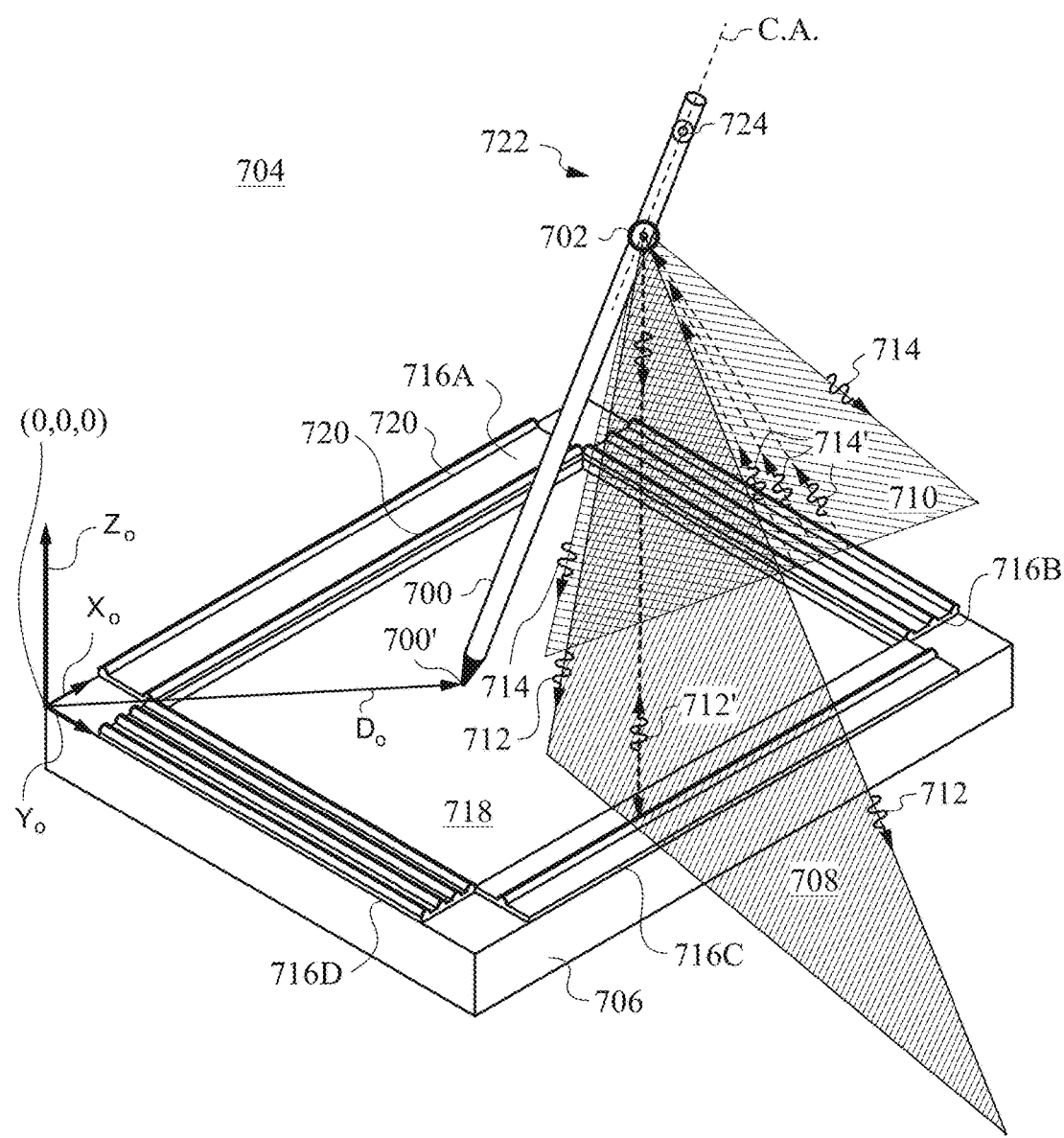
FIG. 17 is a three-dimensional diagram showing another manipulated object that employs another type of active illumination component with rotating scan mirrors.

FIG. 17 illustrates another embodiment of a manipulated object 700 equipped with an active illumination component 702. Object 700 is designed to operate in a real three-dimensional environment 704 as a stylus whose reference point is its tip 700'. World coordinates $(X_o,Y_o,Z_o)$ have their origin (0,0,0) in the lower left corner of a tablet PC 706 with which stylus 700 cooperates as one of its input devices. World origin (0,0,0) is the reference location with respect to which an absolute pose of stylus 700 is reported in Euler rotated object coordinates $(x,y,z,\varphi,\theta,\psi)$.

Active illumination component 702 has a light source, in this case consisting of two laser diodes that produce two laser beams. Component 702 has two rotating scanning mirrors that produce two planes 708, 710 of projected light 712, 714 respectively. Each of these projected planes of light 708, 710 is produced by a respective laser beam, which is scanned within its respective plane by a respective rotating scanning mirror. These types of rotating scanning mirrors are well known to those skilled in the art. Preferably, the laser diodes emit in the infrared so that light 712, 714 is not visible or disruptive to a human user of tablet computer 706. Planes 708, 710 are at right angles to each other and are perpendicular to a central axis C.A. of stylus 700. Four reflective elements 716A, 716B, 716C, 716D are mounted on the four sides of a display screen 718 belonging to tablet PC 706. Elements 716 have different numbers of retro-reflecting strips 720 that scatter light 712, 714 back along the direction from which it arrived. Specifically, element 716A has two retro-reflecting strips 720, element 716B has three, element 716C has one and element 716D has four.

Component 702 is one part of an on-board optical measuring arrangement 722 of stylus 700. Above component 702, arrangement 722 includes a lens 724 and a sensor (not shown) for receiving light portions 712' and 714' that are back-scattered towards component 702 from environment 704. A suitable beam splitter, as in the prior embodiment, can be provided in order to separate back-scattered portions 712', 714' of light 712, 714 that is being projected into environment 704 in the form of planes 708, 710. It is known how to position such a beam splitter such that it directs back-scattered portions 712', 714' to the sensor. Lens 724 has its field of view (F.O.V.) chosen such that it can receive back-scattered portions 712' and 714', after they have been directed by the beam splitter and thus image them onto the sensor.

Alternatively, lens 724 can be designed to have a wide-angle panoramic F.O.V. such that it can directly view back-scattered portions 712', 714' emanating from retro-reflecting strips 720. This alternative design eliminates the need for a beam splitter. In either case, back-scattered portions 712', 714' received at the sensor will comprise a time-sequence of four back-scattered optical signals as they arrive in the same order that the beams are scanned over each of retro-reflecting strips 720. The timing of these optical signals can be processed infer the absolute pose of manipulated object 700 in Euler rotated coordinates (x,y,z,φ,θ,ψ) relative to the reference location (0,0,0) of tablet PC 706.

During operation, as the two scanning mirrors rotated at a suitable angular velocity, light 712, 714 of planes 708, 710 generates either one, two, three or four back scattered portions 712', 714'. The number of these back scattered portions 712', 714' depends on which of the four reflective elements 716 is being intersected by planes 708, 710 respectively. At the instant shown in FIG. 17, plane 708 intersects reflective element 716C that has one retro-reflecting strip 720. Hence, one back scattered portion 712' is produced. Meanwhile, plane 710 intersects reflective element 716B with three retro-reflecting strips 720 and thus generates three back scattered portions 714'. Thus, there are produced a total of four back-scattered portions; one 712' and three 714'.

Back-scattered portions 712', 714' are rapidly collected by lens 724 and projected onto the optical sensor. The optical sensor then converts this rapid sequence of optical signals into electrical signals for further processing into absolute pose data (x,y,z,φ,θ,ψ). In other words, lens 724 images all scattered portions 712', 714' onto the sensor to generate raw image signals. From these signals and their angular distribution, arrangement 722 can infer the absolute pose of stylus 700 and prepare it in the form of a suitable subset to serve as input for tablet computer 706 in a manner analogous to that explained above.

A person skilled in the art will realize that a large variety of active illumination components can be implemented in the apparatus of invention. However, whether any given optical measuring arrangement has an absolute motion detection component with a lens and an optical sensor or with an active illumination component or even with both, it is often advantageous to supplement it with an auxiliary motion detection component. Preferably, such auxiliary motion detection component tracks a relative position or movement and is used for interpolation of absolute pose between measurement times $t_i$.

Figure 18:
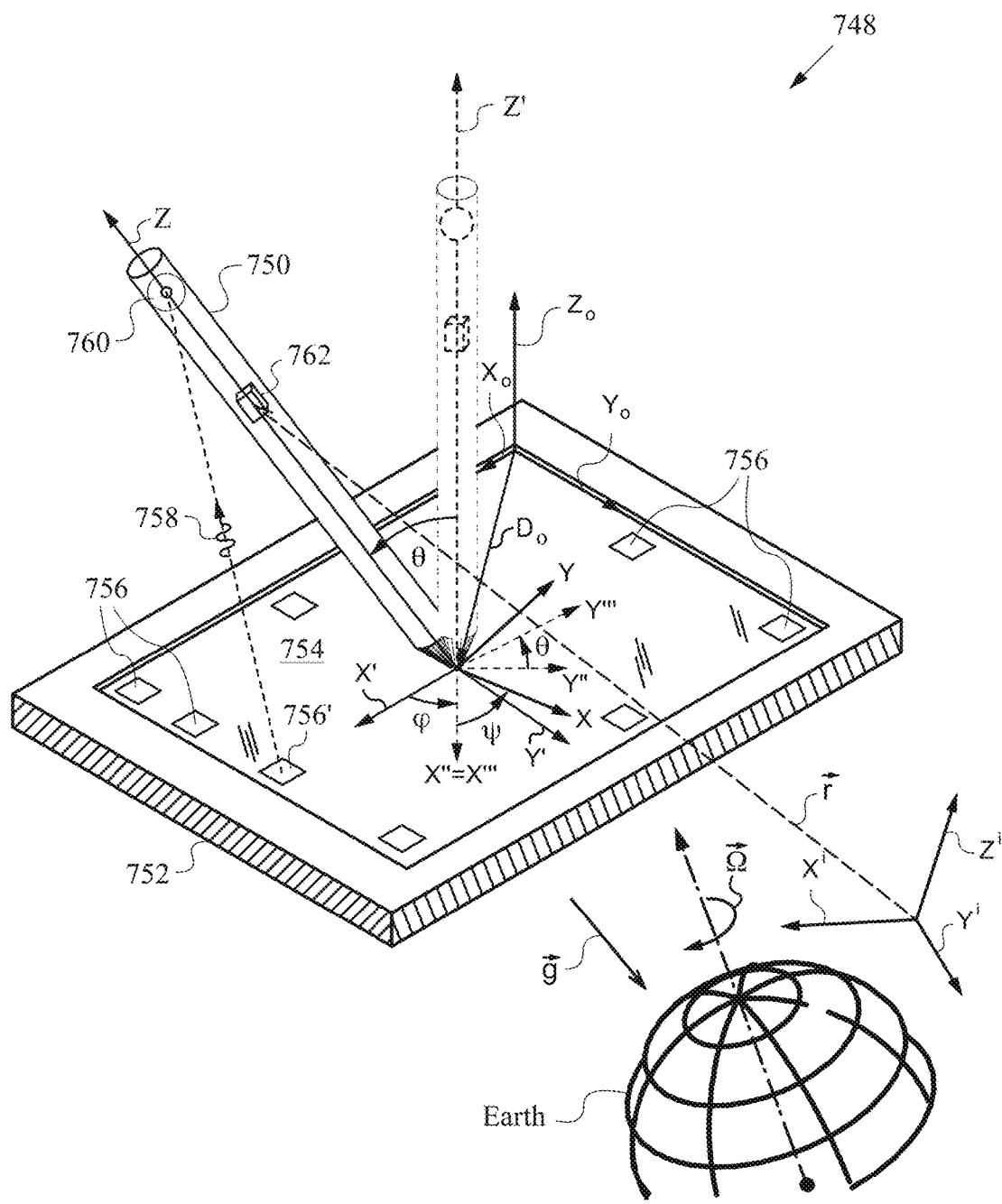
FIG. 18 is a three-dimensional diagram illustrating a manipulated object having an auxiliary motion detection component with an inertial sensing device.

FIG. 18 illustrates an embodiment of an apparatus 748 that has a jotting implement 750 employed with an electronic book reader 752. Reader 752 has a display screen 754 with a number of display pixels 756 playing the role of high optical contrast invariant features. Preferably, display screen 754 in this embodiment is an OLED device and designated display pixels 756 emit light 758 in the infrared range of the electromagnetic spectrum so as not to interfere with a user's visual experience. In addition screen 754 is a touch sensitive screen that allows a user to manipulate visual elements by touch or multi-touch gestures.

Implement 750 has an on-board optical measuring component 760 with a lens that images its field of view onto a photosensor (not shown). Component 760 uses pixels 756 as beacons. For this reasons, the processor of reader 752 modulates pixels 756 in a known pattern. At the time shown, only pixel 756' is emitting light 758.

With the aid of pixels 756 acting as distinguishable light sources or beacons, the absolute pose of implement 750 is optically inferred by component 760. Nib 750' of implement 750 is selected as the reference point. The absolute pose is expressed as absolute pose data in world coordinates ($X_o$, $Y_o$, $Z_o$) with respect to world origin (0,0,0). As before, the absolute pose data are in the form of Euler rotated object coordinates (x,y,z,φ,θ,ψ) or their equivalent. Depending on the application, the processor of reader 752 identifies among parameters (x,y,z,φ,θ,ψ) the subset that will serve as input to the application running on reader 752. For example, only (x,y) parameters in the plane of display screen 754 are employed if the input is to represent digital ink.

Implement 750 also has an auxiliary component 762 mounted on-board. Component 762 is an inertial sensing device such as a gyroscope or accelerometer. The principle of operation of these relative motion devices relies on detecting or integrating changes in motion. While undergoing these changes, such devices may take into account the constant presence of the gravitational field g in the Earth's frame of reference ($X^i, Y^i, Z^i$). In addition, may be subject to spurious measurements in accelerating frames of reference, such as in a car or on an airplane. For this reason, inertial devices are not suitable for determining the absolute pose of implement 750. However, over short periods of time, e.g., between times $t_i$ when absolute pose is inferred optically by component 760, these devices can detect relative changes in pose.

In cases where it may be required to minimize the computational load of the on-board absolute motion detection component 760 by collecting absolute pose data (x,y,z,φ,θ,ψ) at a slower rate, then it may be advantageous to use such inertial devices for interpolation of the motion between times $t_i$. The combining of absolute and relative tracking data is sometimes referred to as "sensor fusion" and is based on techniques that are well known in the art of robotics. For more general information about inertial sensors, the reader is referred to the product manuals for inertial systems produced by Crossbow Technology, Inc.

Figure 19:
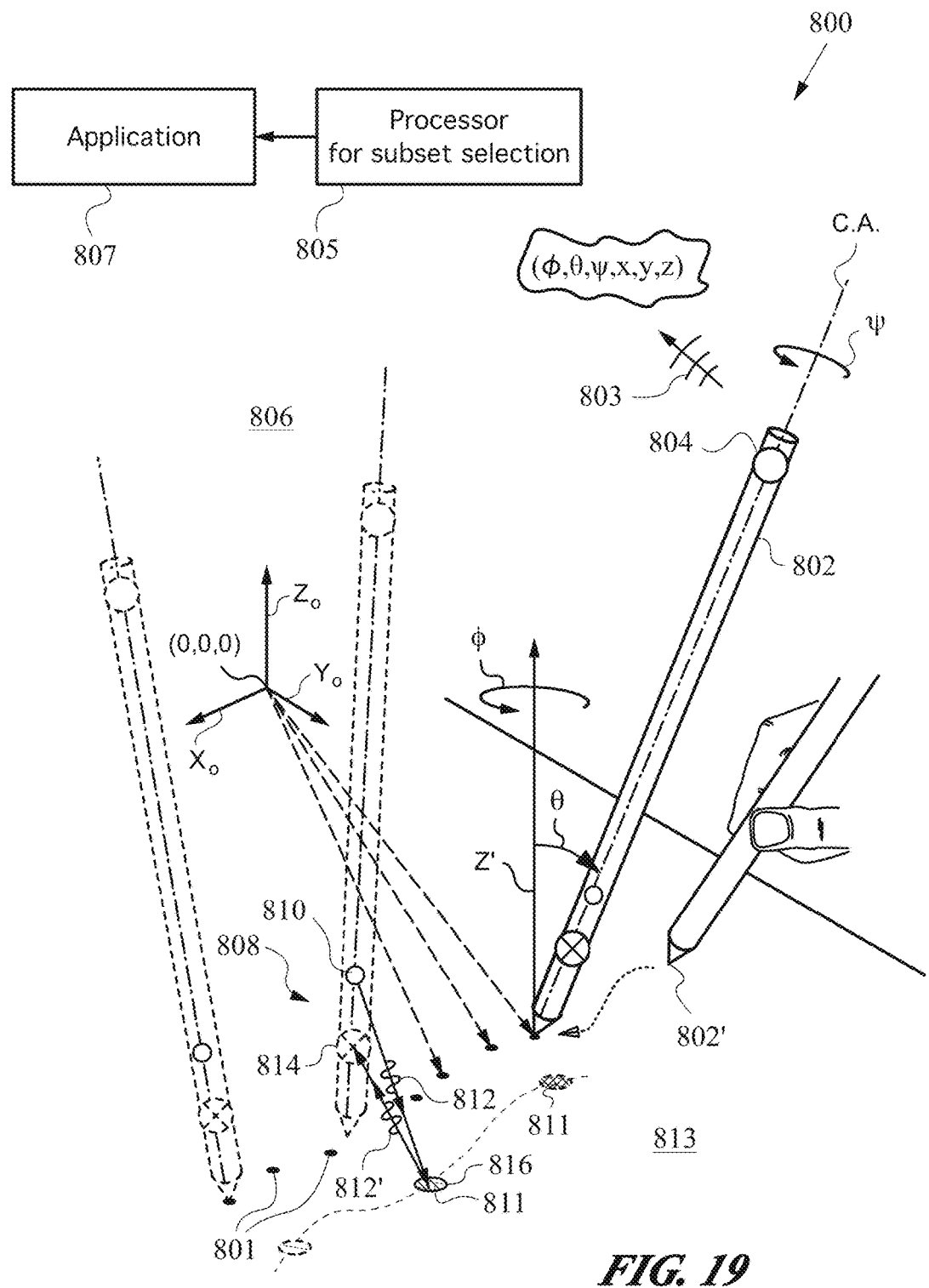
FIG. 19 is a three-dimensional diagram showing how an optical flow measuring unit serves as an auxiliary motion detection component.

In an alternative apparatus 800 shown in FIG. 19, a hand-held manipulated object 802 has an on-board optical measuring arrangement 804 for optically inferring the absolute pose of object 802 in a real three-dimensional environment 806. The absolute pose is expressed with absolute pose data (x,y,z,φ,θ,ψ) in world coordinates ($X_o, Y_o, Z_o$) with respect to world origin (0,0,0). Tip 802' of object 802 is the reference point for the Euler rotated object coordinates. Any of the arrangements taught above can be used in conjunction with any types of invariant features to infer the absolute pose. These elements are not shown in this embodiment for reasons of clarity.

Arrangement 804 infers the absolute pose of object 802 at measurement times $t_i$. It sends the corresponding absolute pose data (x,y,z,φ,θ,ψ) via a communication link 803 to a processor 805. For better visualization, times $t_i$ when absolute pose is inferred correspond to tip 802' locations indicated by points 801. Then, as in the prior embodiments, processor 805 identifies the necessary subset or subsets and provides them to an application 807 for use as input.

Object 802 has an auxiliary motion detection component 808 in the form of an optical flow measuring unit. Unit 808 has an emitter 810 for emitting a light 812 and a detector 814 for measuring scattered light 812'. During operation, scattered light 812' returning from a scattering point 816 on a surface, or else from miniature scattering centers provides a relative measure of change in pose.

Unit 808 will be familiar to those skilled in the art and is analogous to those used by an optical flying mouse or a regular optical mouse, if tip 802' is maintained near a scattering surface. In the case of an optical flying mouse, the image flow data is derived from the moving images of distant microscopic 3-D objects that are imaged onto a CCD camera sensor playing the function of detector 814. The information gained by this type of motion is used to track primarily only the relative angular motion of the mouse with respect to the 3-D environment containing the distant objects. In the case where component 808 is that of an ordinary optical mouse, the image flow data is derived from the moving images of microscopic features 811 on a surface 813 that object 802 is moving over, as shown in the present embodiment. Features 811 are imaged up close and magnified onto CCD camera 814, and the information gained by this method allows relative tracking of primarily only the translational motion of the mouse with respect to surface 813 containing features 811.

In both cases, the relative tracking data can be in the form of angular or linear velocities. These data can be integrated to give points along a relative path of motion and used for used for interpolation between times $t_i$ when absolute pose data is found. Thus, as absolute data is used to define an absolute motion of hand-held manipulated object 802 at a certain resolution dictated by times $t_i$, relative data is used to fill in relative motion information between times $t_i$.

A person skilled in the art will realize that the absolute motion detection arrangements of the invention can itself be operated in a relative capture mode in addition to operating in the absolute motion capture or tracking mode. In other words, they can also double as auxiliary motion detection modules that provide relative motion information in some embodiments.

Figure 20A:
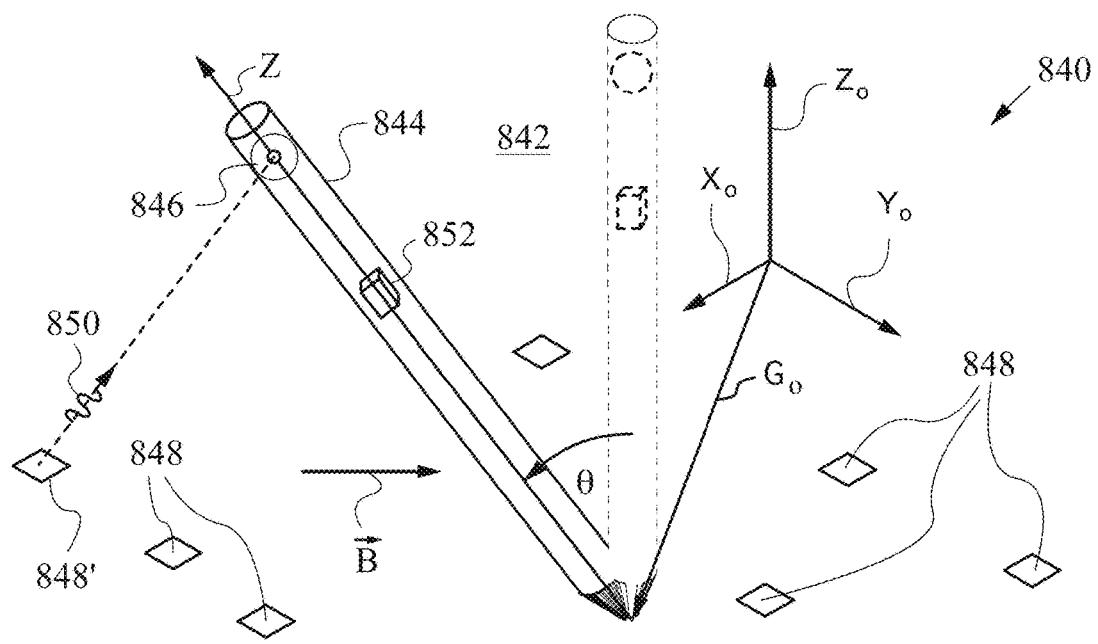
FIG. 20A is a three-dimensional diagram illustrating how an on-board optical measuring arrangement for inferring absolute pose is supplemented by an auxiliary motion detection component using an electronic magnetic sensing element.

FIG. 20A illustrates another apparatus 840 operated in a real three-dimensional environment 842. Apparatus optically infers the absolute pose of a manipulated object 844 with the aid of an on-board optical measuring arrangement 846 and suitable invariant features 848 in environment 842. At time $t_i$ shown in the figure, feature 848' is emitting a light 850.

Environment 842 is of the kind in which there exists a stationary magnetic field B, here indicated by a corresponding vector. This type of environment 842 is found, for example, on the surface of the Earth. Apparatus 840 has an auxiliary motion detection component 852 that is represented by an electronic magnetic sensing component. Component 852 is located in the body of manipulated object 844 for sensing changes in rotation of object 844 with respect to the magnetic field lines established by field B. Such changes produce a signal that represents the relative rotational velocity of manipulated object 844. These relative rotational velocities can be used for interpolation between times $t_i$, or when absolute pose is not being measured by arrangement 846.

Figure 20B:
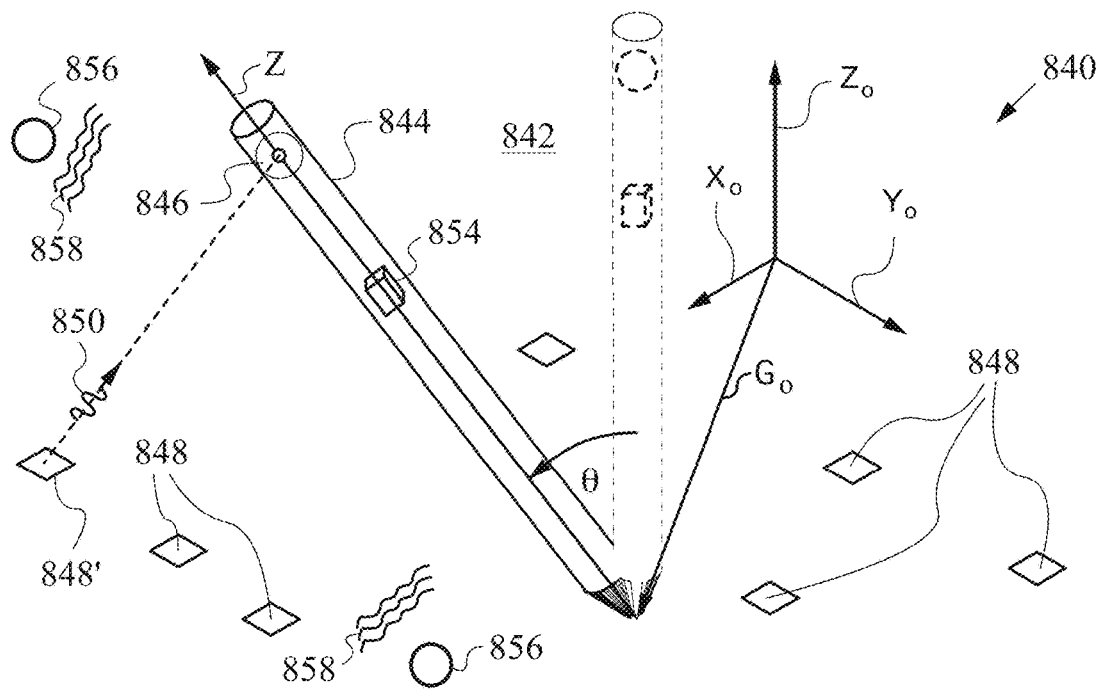
FIG. 20B is a three-dimensional diagram illustrating how an on-board optical measuring arrangement for inferring absolute pose is supplemented by an auxiliary motion detection component using an acoustic sensor and acoustic sources.

FIG. 20B illustrates same apparatus 840, but with a different on-board auxiliary motion detection component 854. Component 854 is an acoustic sensor and it works in conjunction with a number of acoustic sources 856 located in three-dimensional environment 842. Sources 856 emit acoustic signals 858. Component 854 measures relative motion of object 804 between measurement times $t_i$ based on the measurement of the relative Doppler frequency shifts of acoustic signals 858 emanating from acoustic sources 856. A person skilled in the art will be familiar with the operation of acoustic systems with requisite performance features. In fact, a skilled artisan will recognize that the present absolute pose inferring apparatus and method can be advantageously combined with any single or multiple auxiliary motion detection components that determine relative motion or position and hence provide data useful for interpolation or cross-checking of absolute pose data.

The various embodiments of apparatus and methods of the invention for optically inferring absolute pose from on-board a manipulated object and reporting absolute pose data in a priori established world coordinates is useful for many applications. In particular, any application for which actions or movements of the manipulated object in real three-dimensional environment yields useful input stands to benefit from the apparatus and method. Such application may involve a simulation in which real environments are reproduced in a cyberspace or in a virtual space used by the application as part of its output.

Figure 21:
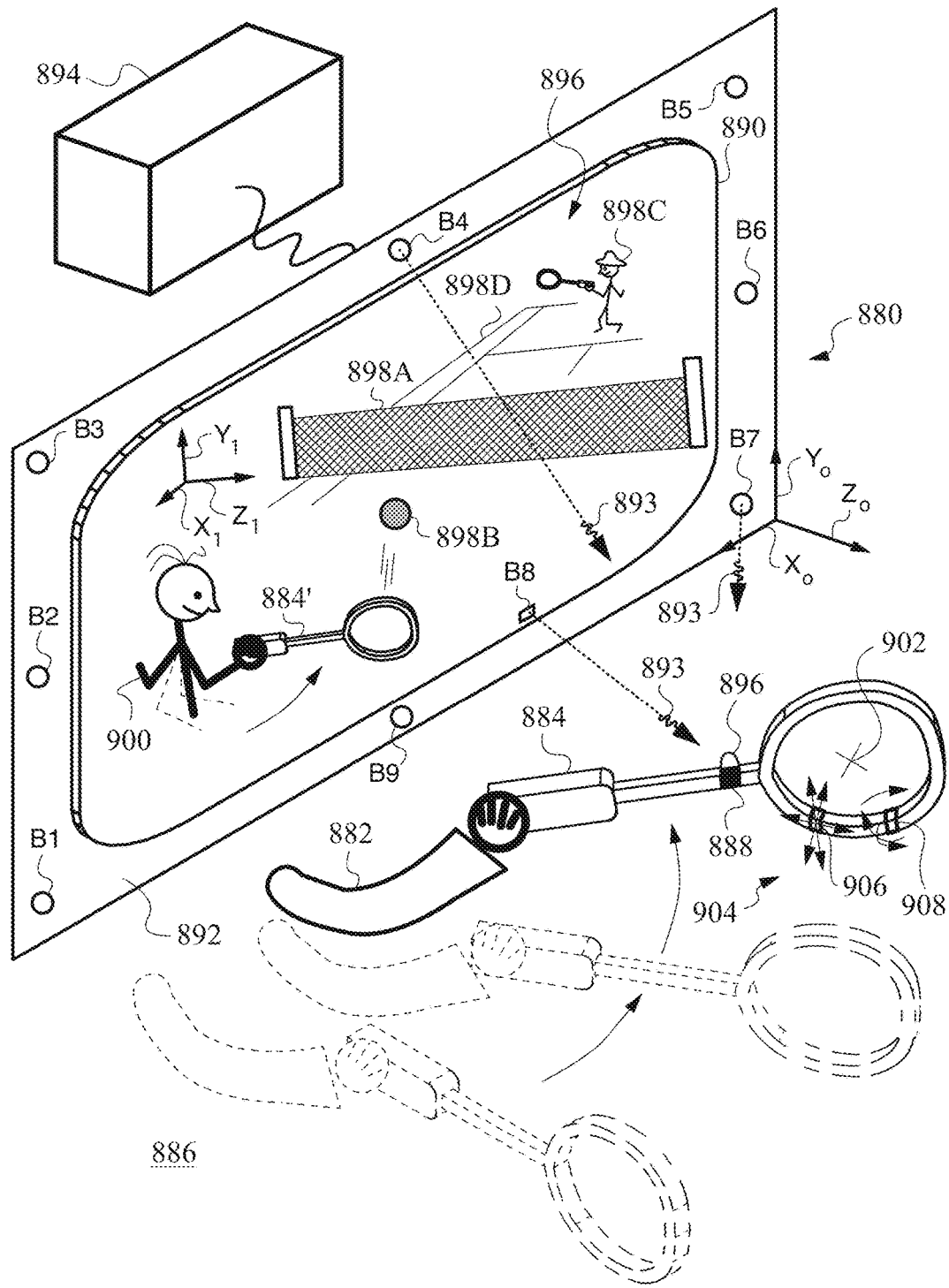
FIG. 21 illustrates how the apparatus and method of invention are embodied in a cyber game.

FIG. 21 illustrates an application 880 that is a cyber game. A user or player 882 (only right arm shown) interacts with application 880 by moving a manipulated object 884, in this case a tennis racket in a real three-dimensional environment 886. Racket 884 is a game control rather than an actual tennis racket. According to the invention, racket 884 has an on-board optical measuring arrangement 888 that infers the absolute pose of racket 884. Arrangement 888 performs this task by viewing temporally modulated beacons B1-B7, B9 disposed on a frame 892 around a display screen 890 and a screen pixel B8, also used as a beacon. Preferably, all beacons B1-B9 emit electromagnetic radiation or light 893 in the infrared portion of the spectrum.

Conveniently, environment 886 is parametrized by a Cartesian coordinate system $(X_o,Y_o,Z_o)$ whose origin $(0,0,0)$ is set at the lower right corner of frame 892. This Cartesian coordinate system serves as the world coordinates for application 880 and for arrangement 888. In addition, origin $(0,0,0)$ is selected as the reference location with respect to which absolute poses of racket 884 will be optically inferred.

A computing device 894 that runs game 880 employs screen 890 for presenting an output 896 to user 882. Computing device 894 can be a personal computer, a dedicated gaming computer, a portable computer, a television system, any general computing device, hosting network or computing platform with sufficient resources to run game 880 on screen 890. In the present case, game 880 is a cyber game of tennis, and thus output 896 includes visual elements 898 necessary to represent a tennis court and a tennis match. Elements 898 include a tennis net 898A, a tennis ball 898B, an adversary with a tennis racket 898C, a court 898D and a replica or image 884' of racket 884 held by user 882 playing game 880. In addition, an avatar 900 representing user 882 is added to output 896. It is avatar 900 that is shown holding a token of the racket; in this particular case it is just replica 884' of racket 884.

Output 896 is in fact a cyberspace in which tennis game 880 unfolds and in which its elements 898, racket replica 884' and avatar 900 are represented. Cyberspace 896 does not need to be parametrized like real three-dimensional environment 886. However, to provide user 882 with a realistic game experience, it is preferable that cyberspace 896 bear a high degree of correspondence to real space. For that reason, cyberspace 896 is parameterized with three-dimensional Cartesian coordinates $(X_1,X_2,X_3)$ that are at least loosely related to world coordinates $(X_o,Y_o,Z_o)$. In the most realistic scenarios, game 880 can even use a one-to-one mapping of cyberspace 896 to real space 886.

Racket 884 has a reference point 902, which is in the center of its face and corresponds to the "sweet spot" of a normal tennis racket. Unlike the previous embodiments, reference point 902 is not an actual point on manipulated object 884 but a point that is defined in a clear relation thereto. Nonetheless, reference point 902 is used for reporting absolute pose data $(x,y,z,\varphi,\theta,\psi)$ inferred at measurement times $t_i$ by arrangement 888.

Racket 884 is also provided with an auxiliary motion detection component 904. In this embodiment, component 904 is an inertial sensing device. This specific device has a three-axis accelerometer 906 and a three-axis gyroscope 908. Between measurement times $t_i$, gyroscope 908 provides information about changes in the orientation. This information can be represented by some or all Euler angles $(\varphi,\theta,\psi)$, any subset or combination thereof, some other angular description of orientation changes including concepts such as pan angles and changes therein. Meanwhile, also between measurement times $t_i$, accelerometer 906 provides information about linear displacements that can be expressed in parameters (x,y,z), their subset, some combination thereof or still another description of linear displacement.

The combination of the subset or subsets from absolute pose data $(x,y,z,\varphi,\theta,\psi)$ and relative motion data are used by tennis game 880 as input for interacting with output 896. Specifically, the visual elements 898B, 898C as well as avatar 900 and replica 884' of racket 884 are modified and re-arranged as a function of the input in accordance with the rules of the game of tennis implemented by the software programming of game 880. Thus, visual element 898B representing the ball bounces from replica 884' as the latter is "swung" in cyberspace 896 to hit gall element 898B. When "hit" correctly, ball element 898B flies to the side of court 898D of adversary 898C. Meanwhile, avatar 900 follows the presumed motion of player 882 in real three-dimensional environment 886. The input does not re-arrange or modify court element 898D, since that part of the game is a stationary part of cyberspace 896.

A person skilled in the art will recognize that with minor modifications to cyberspace 896, game 880 could be a squash match where game object 884 is a squash racket. Game 880 could also be a golf game in which game object 884 is a golf club, or a baseball game in which game object 884 is a bat. Similar modifications can be made to implement games in cyberspace 896 in which game object 884 is a club, a bowling ball, a knife, a sword, a spear, a joystick, a steering wheel or a flying control. It should also be noted, that replica 884' could be a different visual element or a token that does not even correspond in appearance to the physical appearance of game object 884. In this manner, a generally elongate game object 884 could be represented by suitable token 884' within game 880. Such token would not be an image or a replica of game object 884 but, rather, the appropriate game object required by game 880. It is especially useful, when implementing game 880 to perform to make gamer 882 feel like they are performing moves with game objects 884 better than in real life, as this type of ego stroking will promote more usage.

Figure 22:
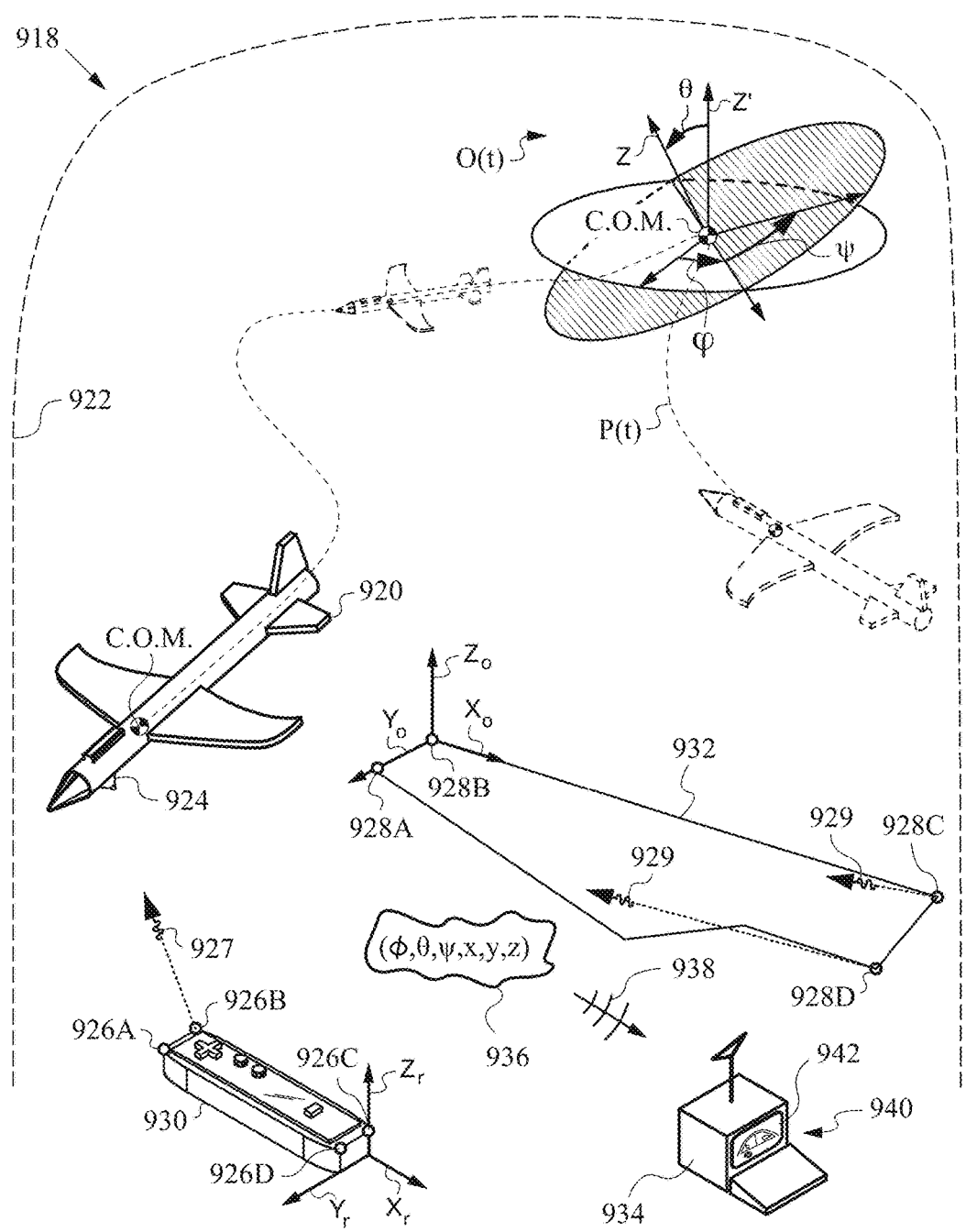
FIG. 22 illustrates an apparatus in which the manipulated object is an aircraft and the three-dimensional environment is provided with stationary and moving sets of invariant features.

FIG. 22 illustrates another apparatus 918 according to the invention, in which a manipulated object 920 is an aircraft being remotely controlled or thrown by a user (not shown) in real three-dimensional space or environment 922. Aircraft 920 has an on-board optical measuring arrangement 924 of the type that determines the absolute pose of aircraft 920 with a single absolute pose measuring component that has a lens and a PSD. Although no auxiliary motion detection component for measuring relative changes in pose parameters is shown, it will be apparent to a person skilled in the art that one or more such components could be used.

Invariant features in this embodiment are two sets of temporally modulated IR LEDs acting as beacons, namely: 926A-D and 928A-D. Beacons 926A-D are mounted on a remote control 930, and more precisely on a flying control. Beacons 928A-D are mounted around a landing strip 932. Beacons 928A-C may emit light 929 at a different wavelength $\lambda$ than that of light 927 emitted by beacons 926A-D. This makes it easier to differentiate beacons that are stationary in environment 922 from those that are moving (on flying control 930).

A computer 934 remotely controls the modulations of all beacons 926A-D, 928A-D and also receives absolute pose data 936 from arrangement 924 via a wireless communication link 938. The processor of computer 934 determines which of absolute pose data 936 to include the subsets to be used by a flying application 940 running on computer 934.

Flying application 940 requires one-to-one mapping between real three-dimensional environment 922 and its cyberspace. For this reason, world coordinates $(X_o,Y_o,Z_o)$ with a reference location at their origin that is coincident with a corner of landing strip 932 are chosen as global coordinates. The reference point on aircraft 920 for reporting absolute pose data 936 in Euler rotated object coordinates (X,Y,Z)—shown with all three rotations in the upper right corner for easy reference—is its center of mass (C.O.M).

Meanwhile, flying control 930 defines an auxiliary reference coordinate system $(X_r,Y_r,Z_r)$ with its origin at the lower right-hand corner of control 930. At each measurement time $t_i$, computer 934 computes the relative pose of control 930 in global coordinates $(X_o,Y_o,Z_o)$. This relative information is made available to arrangement 924 via link 938. Thus, arrangement 924 has all the requisite information about the instantaneous locations of all beacons 926, 928. This enables it to optically infer its absolute pose at measurement times $t_i$. In addition, the pose of flying control 930 can be used to remotely control the flying behavior of aircraft 920. For example, the pose in which flying control 930 is held, corresponds to the pose that the user is instructing aircraft 920 to assume next. The mechanisms for aircraft control to implement such command are well known and will not be discussed herein.

Application 940 may keep track of the orientation O(t) and position P(t) of the center or mass (C.O.M.) of aircraft 920. It may further display this information in a visual form to the user on its display 942. For example, it may display O(t) and P(t) at the various times during flight in the form of a view from the cockpit. Such display may serve for flight simulation programs, training purposes or military drills. In addition, audio output, such as danger signals or tones can be emitted when O(t) and P(t) indicate an impending stall situation based on the application of standard avionics algorithms.

Figure 23:
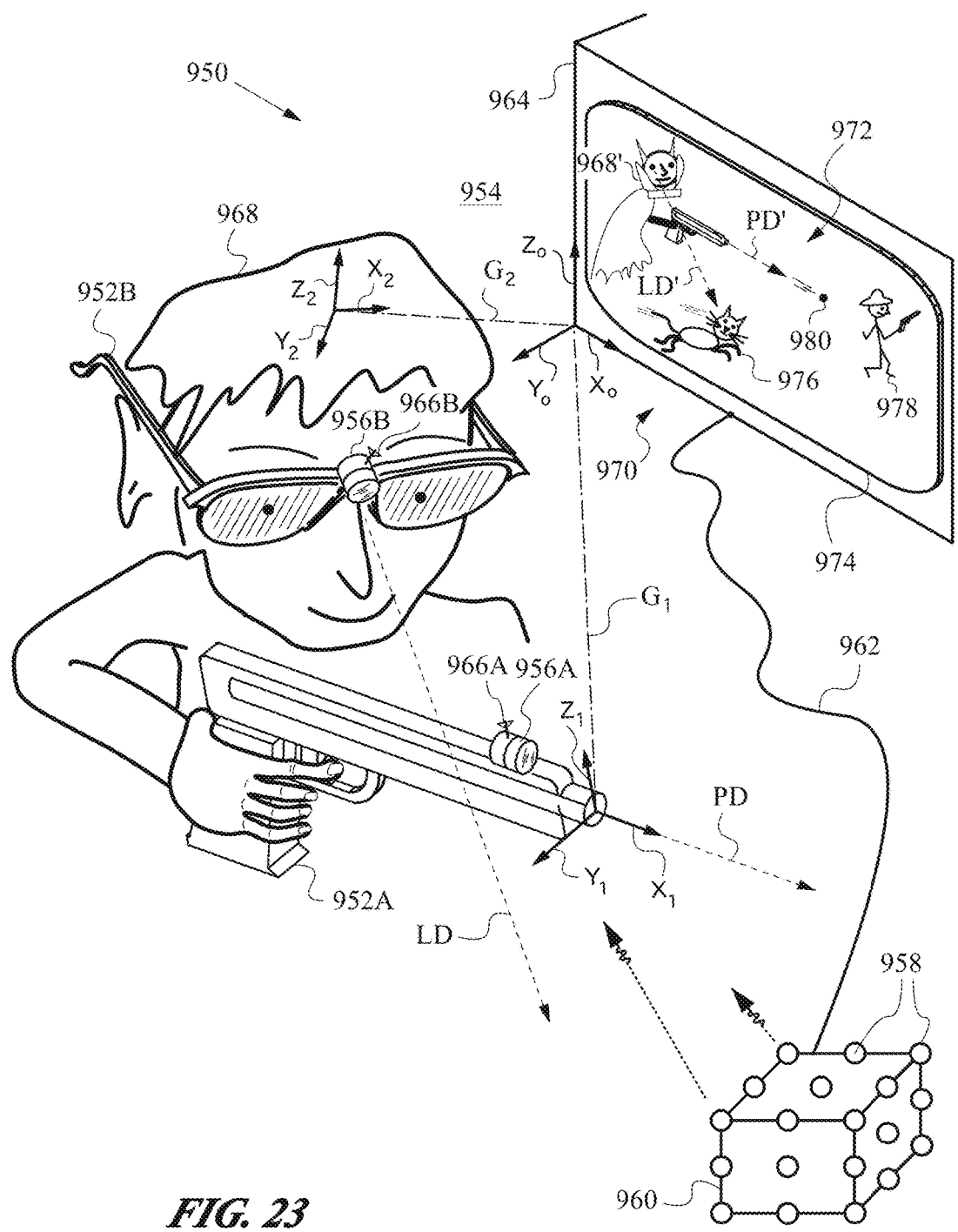
FIG. 23 shows an embodiment in which more than one manipulated object is configured to infer its absolute pose optically from on-board in accordance with the invention.

Yet another apparatus 950 supporting two manipulated objects 952A, 952B in a real three-dimensional environment 954 according to the invention is illustrated in FIG. 23. Objects 952A, 952B are equipped with their on-board optical measuring arrangements 956A, 956B that use lenses and PSDs to infer their absolute poses from viewing beacons 958. A 3-D reference object 960 supports a number of beacons 958 disposed in a 3-D grid pattern thereon. A wired link 962 connects object 960 to a computer 964.

Computer 964 defines world coordinates $(X_o,Y_o,Z_o)$ having an origin coinciding with its lower left corner. These are the global coordinates for reporting absolute pose data of both objects 952A, 952B. Computer 964 also controls the modulation pattern of beacons 958 via link 962. Furthermore, it sends corresponding information about the full location (absolute pose) of object 960 with its beacons 958 in world coordinates $(X_o,Y_o,Z_o)$ to arrangements 956A, 956B via corresponding wireless communication links 966A, 966B. Thus, arrangements 956A, 956B are appraised of the location and modulation of beacons 958 at all measurement times $t_i$ to permit absolute motion capture or tracking of objects 952A, 952B.

Object 952A is a gun, a laser shooter, a general projectile launcher or another war object or implement. War object 952A is handled by a military trainee 968 in the conventional manner. The reference point of war object 952A corresponds to the center of the outlet of its projectile launching nozzle. The coordinates defining the Euler rotated object coordinates $(X_1,Y_1,Z_1)$ of object 952A are shown on the nozzle with direction $X_1$ being collinear with a projectile direction PD. The origin of these object coordinates $(X_1,Y_1,Z_1)$ is described by vector $G_1$ in world coordinates $(X_o,Y_o,Z_o)$.

Object 952B is a wearable article, in this case a pair of glasses worn by military trainee 968. The reference point of object 952B is not a point on object 952B, but rather an estimated position of the center of the trainee's head. Thus, the orientation portion $(\varphi,\theta,\psi)$ of the absolute pose of object 952B as optically inferred by arrangement 956B is also an indication of the attitude of the trainee's head. Specifically, trainee's looking direction LD can thus be automatically inferred and tracked. The Euler rotated object coordinates $(X_2,Y_2,Z_2)$ of object 952B are thus drawn centered on the trainee's head and described by vector $G_2$ in world coordinates $(X_o,Y_o,Z_o)$.

A virtual reality simulation program 970, which is a military drill runs on computer 964. Program 970 displays the combat scenario in a virtual reality 972 on a projected display 974 to help monitor the progress of trainee 968. Scenario is constructed in cyberspace with output that includes visual elements 976, 978, 980. Elements 976, 978, 980 correspond to two virtual enemy combatants and a virtual projectile. Also, the projectile direction PD' and looking direction LD' are visualized. An avatar 968' corresponding to trainee 968 is located in virtual reality 972 and is displayed on projected display 974 for monitoring purposes.

Preferably, trainee 968 is provided with the same visual elements of virtual reality 972 as shown on display 974 via a virtual retinal display or a display integrated with glasses 952B. This way, trainee can test his war skills on enemy combatants 976, 978. However, for pedagogical reasons, avatar 968' is not displayed to trainee 968. Direct display technologies are well known to those skilled in the art of virtual reality or augmented reality.

During operation, arrangements 956A, 956B infer their absolute poses in environment 954 and transmit the corresponding absolute pose data to computer 964. The computer uses a subset of the data to enact the war exercise. Note that because objects 952A, 952B report their absolute pose data separately, they can be decoupled in virtual reality program 970. This is advantageous, because it allows to simulate a more realistic scenario in which trainee 968 can point and shoot gun 952A in a direction PD that is different from where he or she is looking, i.e., direction LD. In fact, in the present situation this behavior is required in order to deal with two virtual combatants 976, 978 simultaneously.

A person skilled in the art will realize that the application will be important in dictating the appropriate selection of manipulated object or objects. In principle, however, there is no limitation on what kind of object can be outfitted with an on-board optical arrangement for inferring its absolute pose with respect to a reference location in global coordinates parametrizing any given real three-dimensional environment. Of course, many applications that simulate the real world and many gaming applications, virtual reality simulations and augmented reality in particular, may request subsets that include all absolute pose data $(\varphi,\theta,\psi,x,y,z)$. This request may be necessary to perform one-to-one mapping between space and the cyberspace or virtual space employed by the application.

Whether fully virtual or not, applications typically provide the user with output of some variety. Normally, a rather small subset of absolute pose data can allow the user to interact with the output. For example, the supported interaction may include text input, which only requires a trace or re-arrangement of the output. In another case, it may only require a subset of one translational parameter to move or re-arrange some visual elements of the output. Given that the output may include audio elements and visual elements, the interaction applies to either or both of these types of output elements at the same time or sequentially. Since in many cases not all of the absolute pose data is necessary to interact with the output, the remainder of the absolute pose data can be used for still other purposes. For example, a certain absolute motion sequence executed with the manipulated object can be reserved for commands outside the application itself, such as dimming the display, adjusting display brightness, rotating or touching-up visual elements or even turning the computer running the application on and off.

Some augmented reality applications may further superpose one or more virtual elements onto the real three-dimensional environment. The virtual element or elements can be then rendered interactive with the manipulated object by the application.

Figure 24:
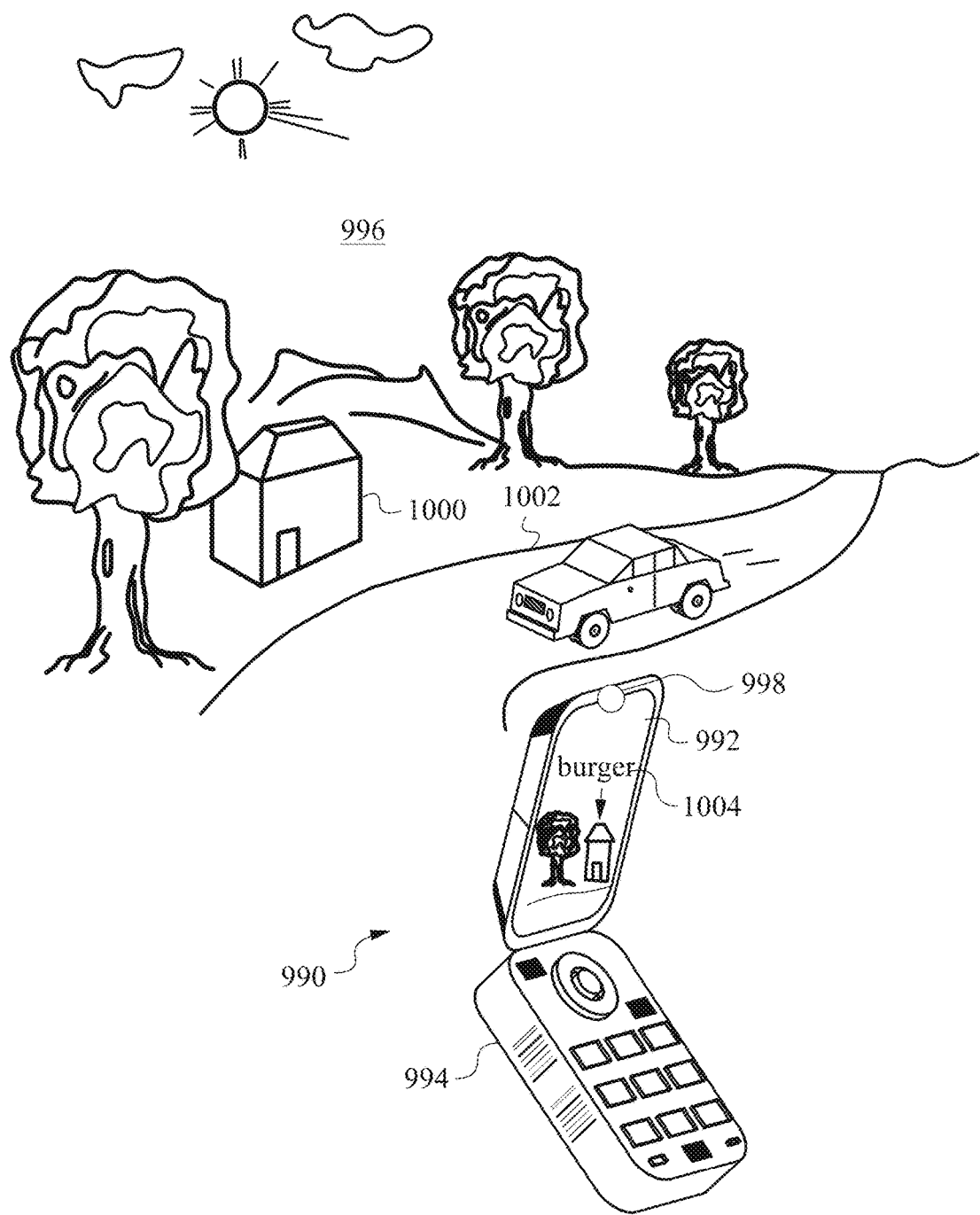
FIG. 24 shows an embodiment in which the apparatus of invention is employed with an augmented reality application.

This situation is illustrated in FIG. 24, where an augmented reality application 990 shows on a display 992 of a mobile device 994 an image of real three-dimensional environment 996. To do this, device 994 is equipped with a camera module.

Mobile device 994 is simultaneously a manipulated object in the sense of the present invention. Thus, device 994 has an on-board optical measurement arrangement 998 for inferring its absolute pose at times $t_i$ with respect to environment 996. The coordinate systems, reference location and reference point on object 994 are not shown in this drawing for reasons of clarity. Also, in this case the invariant features used by arrangement 998 are not light sources but, rather, are known objects in environment 996, including house 1000, road 1002 and other features that preferably have a high optical contrast and are easy for arrangement 998 to detect.

Augmented reality application 990 displays not only an image of environment 998, but also has a virtual element 1004. In the present case, element 1004 is a description of services provided in house 1000 at which device 994 is pointed. Element 1004 is superposed on the image of environment 996 at an appropriate position to make it easily legible to the user.

A person skilled in the art will appreciate that the Euler convention used to report absolute pose data is merely a matter of mathematical convention. In fact, many alternative parametrization conventions that are reducible to the Euler parameters or subsets of the Euler parameters can be employed.

It should further be noted that the manipulated object can be any type of device whose absolute pose can yield useful data. Thus, although the above examples indicate a number of possible manipulated objects other types of objects can be used. Also, the subset identified from the absolute pose data can be supplemented with various additional data that may be derived from other devices that are or are not on-board the manipulated object. For example, pressure sensors can indicate contact of the manipulated device with entities in the real three-dimensional environment. Other sensors can be used to indicate proximity or certain relative position of the manipulated object with respect to these entities. Furthermore, the absolute pose data and/or supplemental data in the subset can be encrypted for user protection or other reasons, as necessary.

Figure 25A:
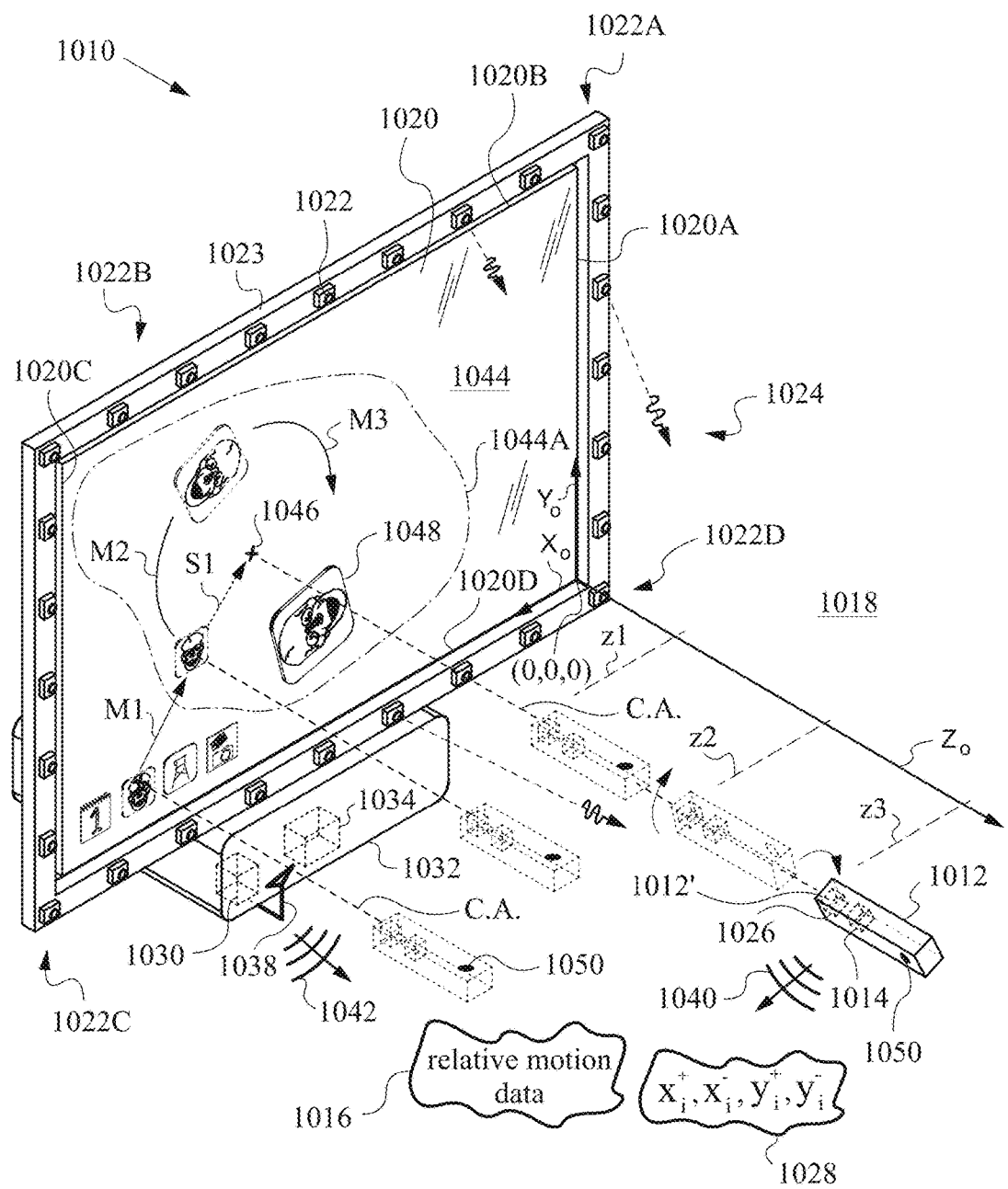
FIG. 25A is a three-dimensional diagram of a system according to the invention that permits complex interactions between an application having visual elements and a wand.

FIG. 25A illustrates a system 1010 that takes advantage of the invention in which the manipulated object is a remote control 1012 that is equipped with an auxiliary motion detection component in the form of a relative motion sensor 1014. As in the prior embodiments, sensor 1014 can include any suitable device, such as one or more inertial sensing devices. In this instance, sensor 1014 has an accelerometer and a gyroscope. Based on their operation, relative motion sensor 1014 outputs data 1016 that is indicative of a change in position of remote control 1012.

Remote control 1012 moves in a real three-dimensional environment 1018. For example, remote control 1012 is a device that is designed for handling by a user (not shown) and is associated with or coupled to a screen or display 1020. In the present embodiment remote control 1012 is a wand. Environment 1018 is a volume in front of and around display 1020.

System 1010 has a number of invariant features 1022. In this embodiment, features 1022 are high optical contrast features instantiated by light sources. Preferably, light sources 1022 are infrared diodes or other point sources that output light 1024 in the infrared range of the electromagnetic spectrum into environment 1018.

IR LEDs 1022 are grouped into four groups. A first group 1022A is aligned along a first edge 1020A of display 1020. A second group 1022B is aligned along a second edge 1020B, a third group 1022C along a third edge 1020C and a fourth group 1022D along a fourth edge 1020D. Edges 1020A-D are the right, top, left and bottom edges of display 1020 in this embodiment. A frame 1023 girds display 1020 and supports all IR LEDs 1022. Note that any circuitry required to modulate IR LEDs 1022 in accordance with any suitable modulation pattern that makes them distinguishable (beacons) can be integrated into frame 1023. This is especially useful in cases where frame 1023 is provided separately from display 1020 and/or is expected to work with many different display types (e.g., touch-sensitive displays).

System 1010 has a photodetector 1026 provided on-board wand 1012 for detecting light 1024. Photodetector 1026 outputs data 1028 indicative of detected light 1024. In fact, data 1028 in this case is just raw image data. Preferably, photodetector 1026 is a position-sensing two-dimensional diode or a PSD. More precisely, photodetector 1026 is analogous to optical sensor 212 of absolute motion detection component 208 designed for sensing light 222 from IR LEDs B1-Bn in the embodiment described in reference to FIG. 7 and outputs analogous data.

Photodetector 1026 is located on-board wand 1012 for receiving light 1024 emitted by IR LEDs of the four groups 1022A-D. As described in the above embodiment, suitable optics (not shown) for imaging, guiding and conditioning ensure that light 1024 is properly imaged from environment 1018 onto PSD 1026.

Further, system 1010 has a controller 1030 configured to determine an absolute position of remote control 1012 based on data 1016 output by relative motion sensor 1014 and data 1028 output from photodetector 1026. Controller 1030 is not on-board wand 1012, but is instead resident in an electronic device 1032 that contains further circuitry 1034 for executing one or more applications. Both relative motion data 1016 and data 1028 from photodetector 1026 are communicated to controller 1030 with the aid of communications circuitry 1038. Only communications circuitry 1038 of electronic device 1032 is shown for reasons of clarity. Corresponding circuitry is also present on-board wand 1012. Communications circuitry 1038 provides an up-link 1040 for transmitting data 1016, 1028 to controller 1030 from wand 1012, and a down-link 1042 for controller 1030 requests, e.g., changes in subset data or operation parameters of wand 1012.

The absolute position of wand 1012 is determined with respect to a reference location, which is the lower right corner of display 1020 set to be world origin (0,0,0) of world coordinates $(X_o, Y_o, Z_o)$. These coordinates are Cartesian and they parametrize environment 1018. World coordinates $(X_o, Y_o, Z_o)$ are posited in a certain relationship to an image 1044 that is produced on display 1020. More specifically, a first axis or the $X_o$ world axis is co-extensive with edge 1020D of display 1020, while a second axis or the $Y_o$ axis is co-extensive with edge 1020A.

Image 1044 is thus substantially defined or parametrized by two orthogonal axes $X_o$, $Y_o$. The location of any part of image 1044, e.g., visual elements that constitute the output of any application running on circuitry 1034, is thus immediately defined along the $X_o$ and $Y_o$ axes. In other words, all such visual elements are displayed on display 1020 in the $(X_o, Y_o)$ plane. No further coordinate transformations are required from the $(X_o, Y_o)$ plane of image 1044 to world coordinates $(X_o, Y_o, Z_o)$.

Of course, choices in which image 1044 is not co-planar with a plane in world coordinates $(X_o, Y_o, Z_o)$ can be made. In those cases, coordinate transformations from image coordinates to world coordinates will need to be performed to express the absolute position of wand 1012 with respect to image 1044 and any of its visual elements. These transformations are well understood and can be made in the Euler rotation convention explained above. Also note, the location of world origin (0,0,0) in the $(X_o, Y_o)$ plane can be re-set from time to time, as necessary (e.g., during calibration of image 1044 on display 1020).

Now, electronic device 1032 that hosts controller 1030 and circuitry 1034 that runs an application whose output produces image 1044 on display 1020 can be any type of device. In practice, device 1032 will most often be a television box, a game console or a stand-alone computing device. However, device 1032 can also be an application-specific computer or a mobile device that communicates with display 1020 via a wireless link (not shown). For example, device 1032 can be a cell phone or a personal digital assistant. In the present embodiment, device 1032 is a stand-alone computing device that can perform the functions of a television box and is in direct communication with display 1020.

A reference point 1012' is selected on wand 1012 for expressing its absolute position in world coordinates $(X_o, Y_o, Z_o)$. In the present case, reference point 1012' is in the middle of the front face of wand 1012. Thus, absolute pose of wand 1012 is expressed by absolute pose data $(x, y, z, \varphi, \theta, \psi)$ in Euler rotated object coordinates using reference point 1012' as their origin. Absolute pose data $(x, y, z, \varphi, \theta, \psi)$ is inferred optically or measured from on-board wand 1012 using output data 1028 which is the raw image data output by PSD 1026. All the necessary operations, including the application of the rules of perspective geometry, image warping etc. (see teachings above, especially in reference to FIGS. 6, 7 & 9) are applied by controller 1030.

Controller 1030 is configured to generate signals for rendering display 1020. For this purpose, controller 1030 identifies a subset of absolute pose data $(x, y, z, \varphi, \theta, \psi)$ that will be used in the signals that render display 1020. In the present embodiment, that subset contains only one of the three absolute position parameters (x,y,z), namely (z) which is the absolute position of remote control or wand 1012 in or along the a third axis that is orthogonal to the $X_o$, $Y_o$ axes defining image 1044. Because of advantageous parametrization, this third orthogonal axis is simply the $Z_o$ axis of world coordinates $(X_o, Y_o, Z_o)$. The subset also contains requisite orientation parameters $(\varphi,\theta,\psi)$ to express the roll of wand 1012 around center axis C.A. In particular, orientation parameters $(\varphi,\psi)$ are required to completely express that roll. Therefore, the subset is just $(z,\varphi,\psi)$. In some cases a single orientation parameter derived from $(\varphi,\psi)$ can be employed to express the roll, as will be appreciated by those skilled in the art.

During operation, IR LEDs 1022 are modulated and emit infrared radiation or light 1024. In this embodiment of the method, the four groups 1022A-D of IR LEDs 1022 are modulated in a sequential pattern. Thus, only one IR LED 1022 emits light 1024 at any measurement time $t_i$. For better understanding, FIG. 25A shows light 1024 emitted from three different IR LEDs 1022 at different times $t_i$.

Now, PSD 1026 outputs data 1028 which is the raw image data corresponding to the centroid of the flux of light 1024 emitted by the IR LED 1022 that is on at time $t_i$. Data 1028 is transmitted to controller 1030 via up-link 1040 of communications circuitry 1038. From data 1028 collected from a number of IR LEDs 1022 at different times $t_i$, controller 1030 infers the absolute pose of wand 1012 in terms of absolute pose data $(x,y,z,\varphi,\theta,\psi)$. This part of the method of invention has been described in detail in the above embodiments (see, e.g., FIG. 10 and associated description) and will not be repeated here.

In addition to data 1028, controller 1030 receives relative motion data 1016 from relative motion sensor 1014. Controller 1030 uses data 1016 for interpolating the position of wand 1012 between times $t_i$. Specifically, in the present embodiment, controller 1030 uses relative motion data 1016 to determine the change in pose parameters $(z,\varphi,\psi)$. Once again, the use of relative motion data for interpolation has been described above (see, e.g., FIG. 21 and associated description) and will not be repeated here.

Supplied with absolute pose parameters $(z,\varphi,\psi)$ of the subset identified from among absolute pose data $(x,y,z,\varphi,\theta,\psi)$ and interpolation of changes in pose parameters $(z,\varphi,\psi)$ of the subset obtained from data 1016, controller 1030 is ready to generate signals that render display 1020. Specifically, controller 1030 uses the change in parameter (z) for generating signals for zooming in on or zooming out of at least a portion 1044A of image 1044 shown on display 1020. Additionally, controller 1030 uses parameters $(\varphi,\psi)$ and changes therein to generate signals for rotating at least a portion 1044A or visual elements contained in portion 1044A of image 1044 on display 1020.

These actions will now be explained in more detail. First, controller 1030 uses all parameters $(x,y,z,\varphi,\theta,\psi)$ as the subset in rendering and displaying a visual element or cursor 1046 at the location where a center axis C.A. of wand 1012 intersects display 1020 or, equivalently, image 1044. In doing so it uses absolute data 1028 as well as relative motion data 1016, in accordance with any suitable combination or data fusion technique that is efficient. Such sensor fusion and corresponding data fusion techniques are well known in the art.

The computation and displaying of cursor 1046 is performed periodically at a sufficiently high rate (e.g., 60 Hz or higher) to be acceptable to a human viewer of display 1020. Note that cursor 1046 is a visual element that forms a part of the output of the application running on circuitry 1034 of device 1032. In addition, cursor 1046 defines a center of rotation for a visual element 1048. Element 1048 is also a part of the output of the application running on circuitry 1034. In this case element 1048 is an icon originally located at the lower left corner of display 1020.

A user moves wand 1012 in environment 1018 and by doing so interacts with visual elements 1046, 1048 of the output of the application displayed as image 1044 on display 1020. First, user holds wand 1012 such that its center axis C.A. intersects image 1044 at the original location of icon 1048. Thus, cursor 1046 is displayed on top of icon 1048 at that time. By subsequently depressing a button 1050, user informs controller 1030 that he or she wishes to select icon 1048 produced by the application. The corresponding button depressed signal (not shown) can be communicated to controller 1030 and then the application by using up-link 1040. The operations required to implement such selection are well known in the art.

Once icon 1048 is selected in the application, the user moves wand 1012 diagonally and up such that the motion of cursor 1046, which traces the point of intersection between center axis C.A. and display 1020, executes movement M1. At the end of movement M1, icon 1048 is within image portion 1044A. Now, the user depresses button 1050 again to instruct the application running on device 1032 to leave or stop dragging icon 1048. At this point, user executes a motion S1 with wand 1012 during which only cursor 1046 is displaced to the point of intersection between center axis C.A. and display 1020.

The user now depresses button 1050 twice to inform the application that he or she wishes to fix the location of cursor 1046 on display 1020. This fixed location will be the center of rotation for visual elements in image portion 1044A. Presently, only icon 1048 has been placed in portion 1044A.

At this point, the user rotates icon 1048 about the center of rotation defined by the location of cursor 1046. In particular, the user simply twists wand 1012 clockwise around its central axis C.A. as shown in the figure. Correspondingly, icon 1048 undergoes clockwise rotation. This rotation is broken down into two stages M2 and M3 for better understanding.

While rotating icon 1048 by turning wand 1012 clockwise, the user also moves wand 1012 in or along the $Z_o$ axis. Of course, this axis is orthogonal to axes $X_o$, $Y_o$ that define the plane $(X_o, Y_o)$ of image 1044. Specifically, at the start of stage M2 wand 1012 is at absolute position z1 along the $Z_o$ world coordinate axis. At the end of stage M2 it is at z2, and finally it is at absolute position z3 at the end of stage M3. It should be noticed that reference point 1012' is instrumental in expressing the absolute positions. In fact, the absolute positions in $Z_o$ correspond to the absolute positions z1, z2, z3 of reference point 1012'. Controller 1030 generates signals corresponding to absolute positions z1, z2, z3 of wand 1012 in the third axis $Z_o$ for zooming. Specifically, since these values are increasing, the user is moving away. Hence, the application zooms in on portion 1044A of image 1044 shown on display 1020 to enlarge it. As a result, icon 1048 grows in size. When the absolute position values in $Z_o$ decrease, the application zooms out of portion 1044A. Of course, this convention could be inverted or otherwise changed depending on the application.

To simplify and reduce the processing required, controller 1030 can be configured to first determine the absolute position of wand 1012 in third axis $Z_o$. Then, controller 1030 can determine a change in a position of wand 1012 in $Z_o$ by combining the initial absolute position with relative motion data 1016 that encode the change in position. This represents an efficient and wise usage of interpolation under the assumption that the user does not appreciably change the orientation part (i.e., the inclination angles) of the absolute pose of wand 1012. In particular, if the user changes one or more of the orientation parameters, then more frequent reliance on absolute pose data obtained from raw image data 1028 will be necessary.

The above embodiment can be further enhanced by addition of more controllers and wands. In addition, other subsets of absolute and relative orientation and position data can be used to produce useful input for the application of system 1010.

Figure 25B:
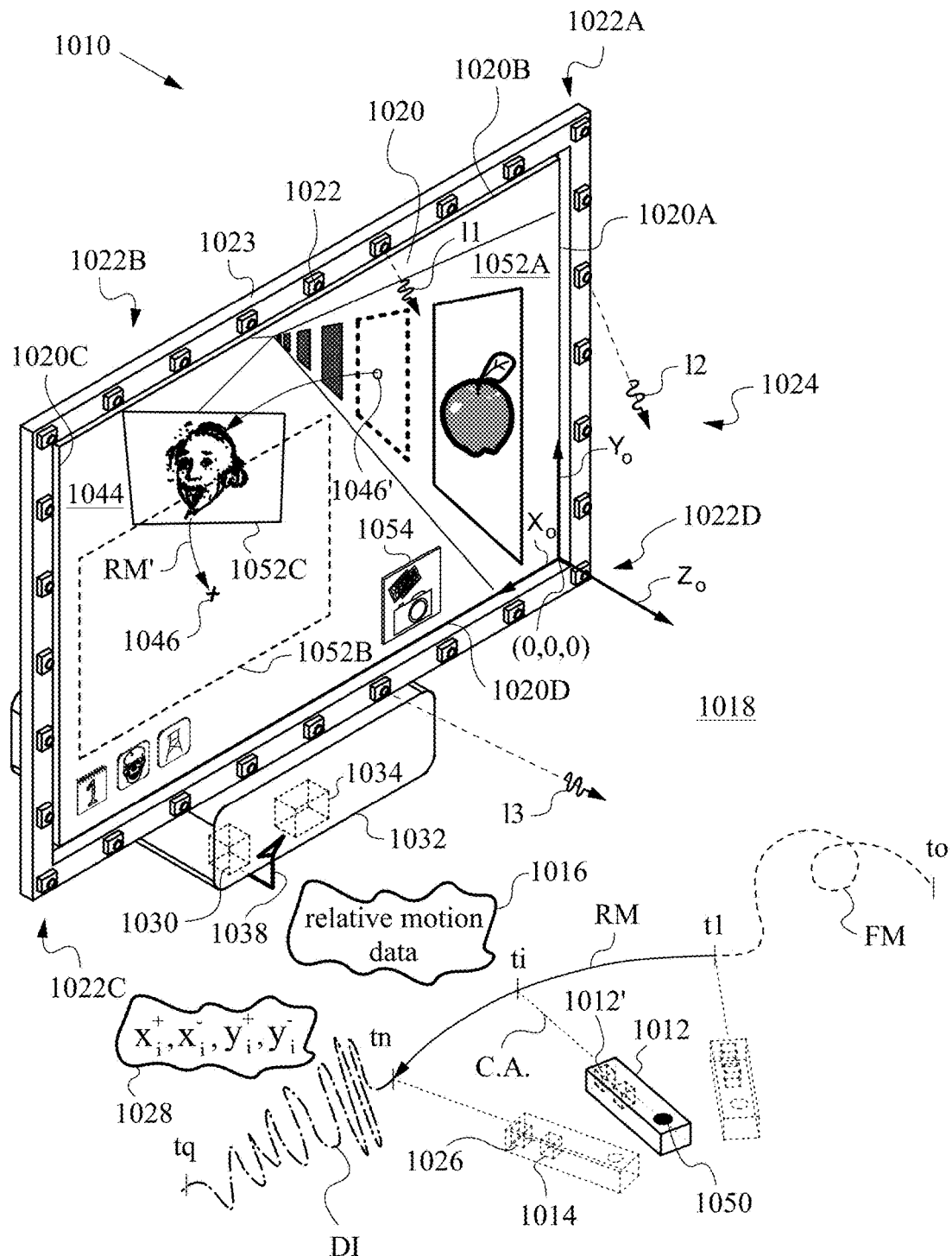
FIG. 25B is a three-dimensional diagram of the system of FIG. 25A used with a gallery application taking advantage of a wand.

FIG. 25B shows system 1010 with another application running on circuitry 1034 of electronic device 1032. Parts of system 1010 corresponding to those in FIG. 25A are referenced by the same reference numbers. In fact, the hardware and operation of system 1010 in FIG. 25B is very similar to system 1010 of FIG. 25A with the following exceptions.

The application supported by device 1032 is a gallery and painting touch-up application. Hence, the output of the application includes visual elements 1052A, 1052B, 1052C displayed on display 1020. Elements 1052 represent a gallery in cyberspace. Specifically, element 1052A is a gallery wall, element 1052B is a re-touching station, and element 1052C is a specific painting taken off wall 1052A. As before, cursor 1046 is located at the instantaneous intersection of center axis C.A. of wand 1012 and image 1044 presented on display 1020. Note that the instantaneous pose (position and orientation) of wand 1012 is drawn in solid lines, while prior and later poses are drawn in dashed lines.

To alert the user that the gallery application is running, an icon 1054 is enlarged and displayed on display 1020. Other icons, representing non-active applications are posted in the lower left corner of display 1020 for user reference.

During operation, controller 1030 uses all absolute pose data $(x,y,z,\varphi,\theta,\psi)$ in the subset for generating signals. It also uses all relative motion data 1016 for interpolation between measurement times $t_i$. FIG. 25B shows the movement of center axis C.A. from a start time $t_o$ through a stop time $t_q$. During time interval from $t_o$ to $t_1$, the user is executing free movements denoted by FM. Controller 1030 uses the absolute pose data supplemented by relative motion data 1016 during that time to track the position of cursor 1046.

At time $t_1$, when cursor was at location 1046', the user depressed button 1050. This informed controller 1030 to generate input for interacting with the gallery application. Specifically, motion RM during the time interval $t_1$ to $t_n$, while button 1050 remains depressed is used to drag painting 1052C from gallery wall 1052A to re-touching station 1052B. At the instant shown, i.e., at time $t_i$, painting 1052C is being moved and rotated into position on re-touching station 1052B. Note that all six absolute pose parameters $(x,y,z,\varphi,\theta,\psi)$ can be used by controller 1030 to generate signals for this operation.

Gallery application indicates motion RM by a corresponding motion RM' in cyberspace of the gallery. In other words, motion RM in real three-dimensional environment 1018 is being mapped to motion RM' in cyberspace of the gallery application. The mapping can be one-to-one when all parameters $(x,y,z,\varphi,\theta,\psi)$ are employed, or it can be simplified. Simplified mapping allows the user to drag painting 1052C without having to appreciably move wand 1012 in the $Z_o$ axis or pay attention to changes in orientation of painting 1052C while it is being dragged. Simplified mapping is performed by controller 1030 identifying a sufficient subset of parameters $(x,y,z,\varphi,\theta,\psi)$ to translate motion RM from environment 1018 to requisite motion RM' in cyberspace.

In the simplest mapping, any rotation of wand 1012 is detected. Then, the selected portion of the image, namely painting 1052C is rotated in response to the detecting step. As painting 1052C is rotated, it is also brought closer in and undergoes a zooming operation, too. In practice, the detecting step is broken down into receiving a transmission from wand 1012 that communicates the output of at least one of motion detection components 1014, 1026 that are incorporated in wand 1012 and detecting that wand 1012 was rotated based on the received transmission.

Figure 25C:
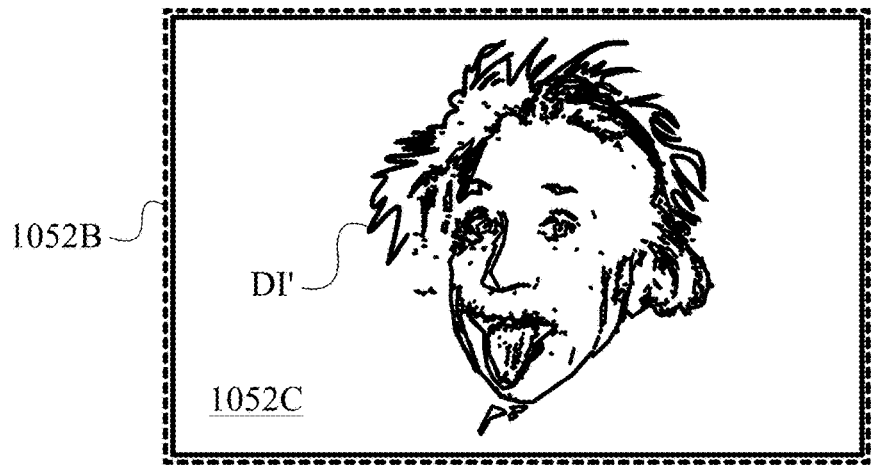
FIG. 25C is a plan view of the re-touching station in the gallery application after the application of digital ink to a selected painting.

Painting 1052C is placed on re-touching station 1052B at time $t_n$. At this time the user depresses button 1050 again to inform controller 1030 that subsequent motion DI is to be interpreted as digital ink. Motion DI takes place between times $t_n$ and $t_q$. Digital ink DI' thus generated on painting 1052C is shown in more detail in FIG. 25C. At time $t_q$ the user depresses button 1050 one more time to indicate the end of re-touching and subsequent motion is no longer interpreted as digital ink.

Referring back to system 1010 of FIG. 25B, it should be appreciated that the method of invention can be further varied. For example, as before, a photodetector 1026 detects light 1024 and generates light data 1028 that are raw image data. From data 1028 controller 1030 infers the absolute pose of wand 1012. However, rather than just modulating light 1024 in a temporal pattern, different IR LEDs 1022 can use distinct or signature wavelengths. Photodetector 1026 is chosen to be of the type that can distinguish signature wavelengths of light 1024. Suitable photodetectors are well known in the art. In the present example light 1024 at three different signature wavelengths l1, l2, l3 is shown being emitted from corresponding IR LEDs 1022. A person skilled in the art will recognize that signature wavelengths, i.e., differently colored sources 1022, can even emit in the visible range and add to user experience when using an appropriate photodetector 1026.

In addition, in this same variant, relative motion data 1016 is accepted by controller 1030 from relative motion sensor 1014 at times $t_i$. As pointed out above, data 1016 is not absolute. Instead, it is indicative of a change in the pose (orientation and position of reference point 1012') of wand 1012. However, if relative motion data 1016 does not exhibit a large amount of drift (usually due to senor drift and noise), then data 1016 can be used together with absolute pose data $(x,y,z,\varphi,\theta,\psi)$ derived from light data 1028 to track the absolute pose of wand 1012 with respect to reference location (0,0,0). In particular, if the orientation portion of the pose is not important for a given application, then the absolute position of reference point 1012' can be tracked by combining absolute and relative data in this manner until relative drift becomes unacceptably large. A similar approach can be employed to track absolute orientation only, or any combination of position and orientation parameters, including the full set of parameters $(x,y,z,\varphi,\theta,\psi)$ and/or their mathematical equivalents.

Figure 26:
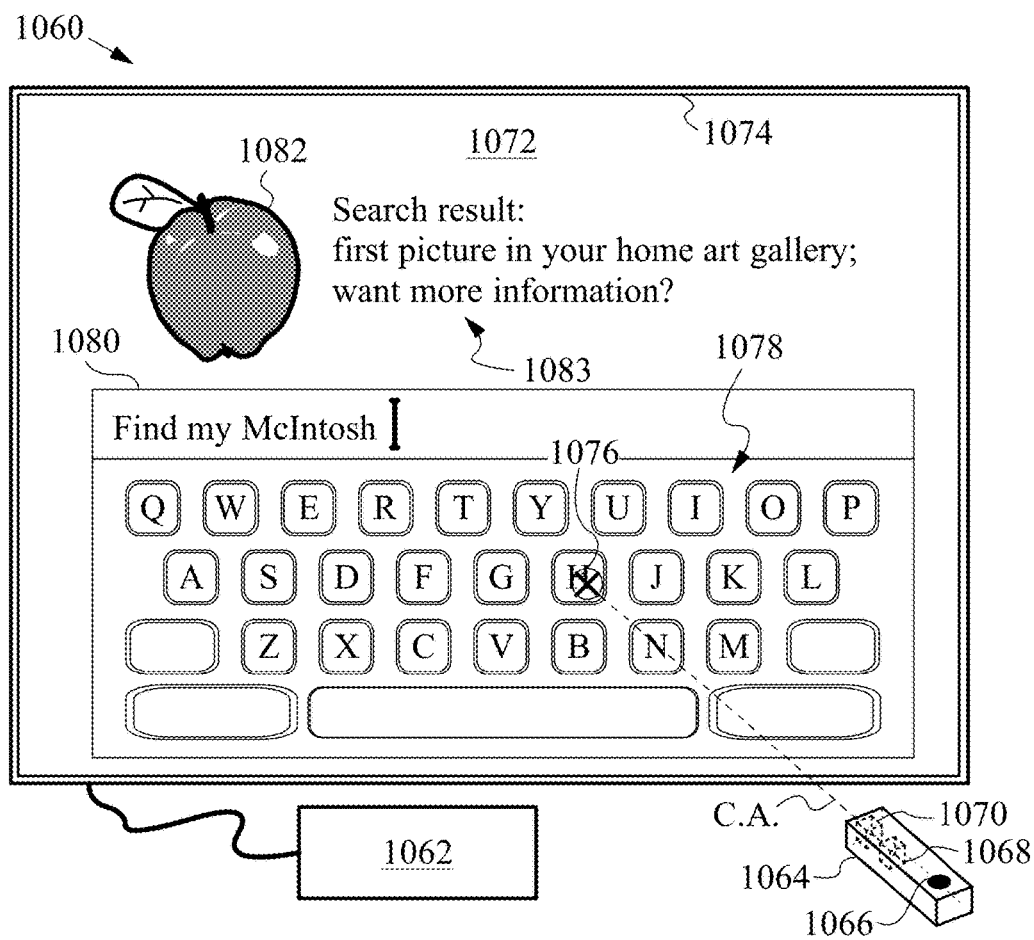
FIG. 26 is a diagram view of a media system application employing the apparatus and method of invention for text entry.

The method of invention is adapted for entering text in a media system 1060 as illustrated in FIG. 26. Media system 1060 has an electronic device 1062 and a wand 1064. Wand 1064 has a button 1066, a relative motion sensor 1068 for monitoring changes in pose and a photodetector 1070 for obtaining light data to track absolute pose. The absolute and relative data can be used together or separately. Also, the method in which wand 1064 and its components function can in accordance to any of the embodiments described herein.

With the aid of the pose data, electronic device 1062 determines where center axis C.A. of wand 1064 intersects the plane of an image 1072 displayed on a display 1074. System 1060 places a cursor 1076 at that location. In the event of mis-calibration or offset, a cursor centering routine can be provided prior to launching any applications. For example, the user points wand 1064 at the four corners of display 1074 attempting to hit suitable displayed fiducials. Electronic device 1062 computes the necessary adjustment and employs it to compensate for any offset or mis-calibration. Such routines are well known to those skilled in the art and will not be described further herein.

The application running on device 1062 is a search. It uses display 1074 of system 1060 to display to a user a number of selectable characters 1078. In this case characters 1078 are the letters of the alphabet. Of course, they could also be numerals found on a conventional QWERTY alphanumeric keyboard or other lettering or signage that is capable of conveying information.

The search application has a box 1080 for text entry. The text entered represents search terms as conventionally understood. To enter text in box 1080, user navigates cursor 1076 to a particular selectable character among characters 1078 by moving wand 1064. In other words, the output of a motion detection component, e.g., 1070 and/or 1068 is used for navigating cursor 1076 on display 1074. The selection of the particular selectable character, in the case shown the letter "H" on which cursor 1076 has come to rest, is received by depressing button 1066. This action informs device 1062 to accept the selection.

In the embodiment shown, a user has employed this method to type in the search term "Find my McIntosh" into box 1080. Upon accepting this search term, system 1060 launches the corresponding search via its device 1062 and its computational and search resources. Such resources may include access to networks (e.g., the world wide web), as is well known to those skilled in the art. The result of the search, namely McIntosh apple 1082 the user was searching for additional visual information in the form of text 1083 are displayed above box 1080.

Figure 27:
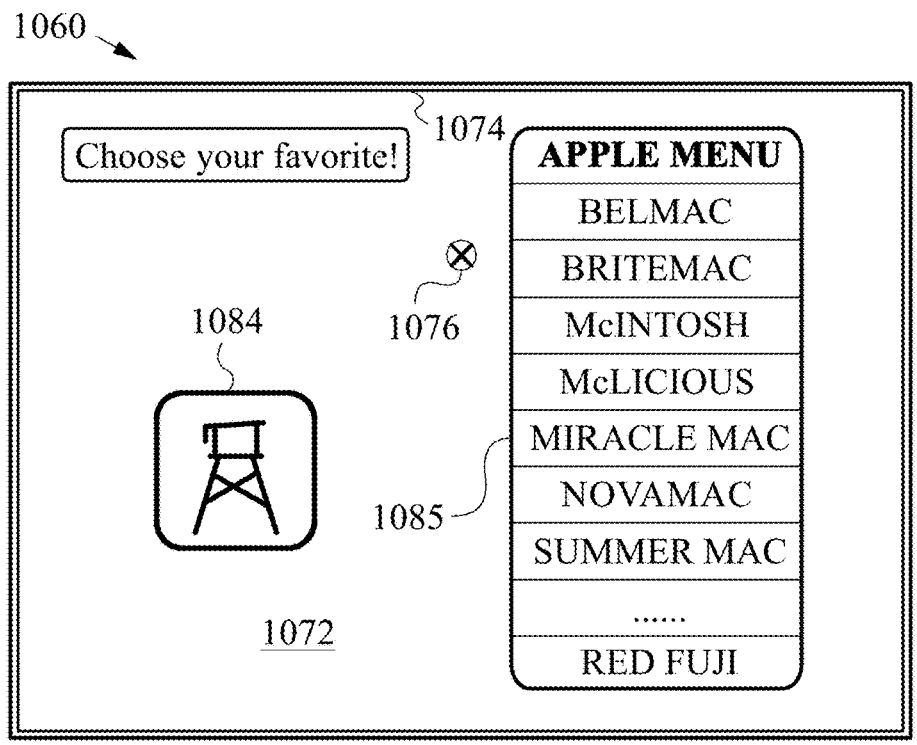
FIG. 27 is a diagram illustrating menu selection with a wand according to the invention.

The user can also use cursor 1076 to launch other applications and interact with other data structures. For example, in FIG. 27, user has selected a "Hunter&Gatherer" application 1084 on display 1074 of media system 1060. A menu of apples 1085 lists all the possible targets available in application 1084. User can navigate cursor 1076 to any desired choice, just as in the case of selectable characters 1078 and make his or her selection by depressing button 1066.

Figure 28:
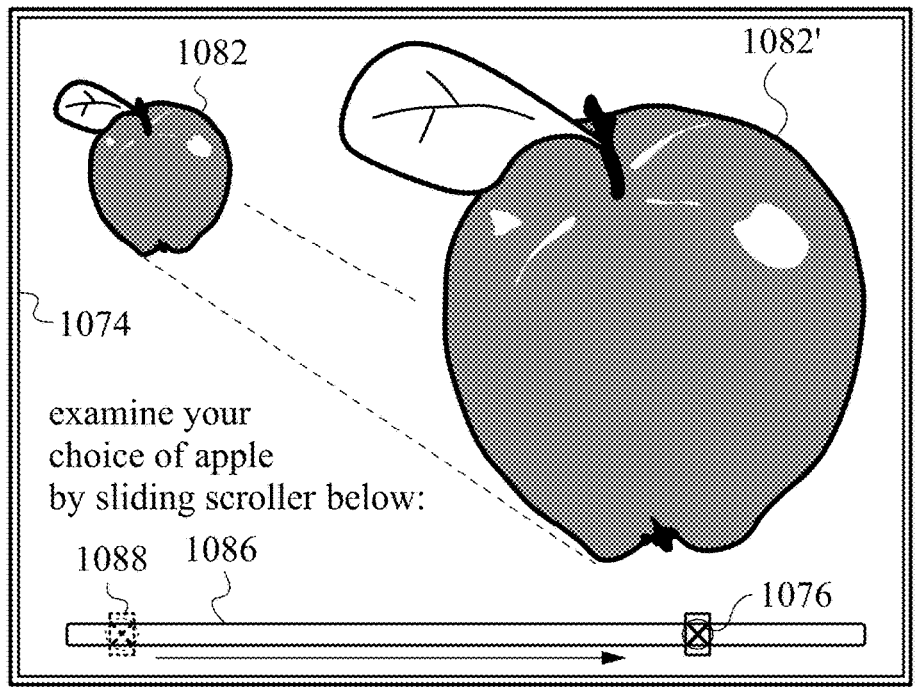
FIG. 28 is a diagram illustrating zooming by means of a scroll bar with a wand according to the invention.

The apple selection made by the user is displayed on screen 1074 in FIG. 28. Specifically, the user selected McIntosh 1082 for which he or she was searching previously. The application running on device 1062, now allows the user to examine the choice by enlarging McIntosh 1082 with the aid of a scroll bar 1086. Scroll bar functions in the conventional manner, but is operated by navigating cursor 1076 to scrolling element 1088, depressing button 1066, and dragging element 1088 to the right until the desired degree of enlargement is reached.

It will be apparent to a person skilled in the art, that navigating cursor 1076 can be used with virtually any input modality in which visual elements are manipulated, altered, entered, removed or otherwise interacted with. These include conventional interfaces as well as three-dimensional interfaces, e.g., in cyberspace, as enabled by the present invention.

Figure 29:
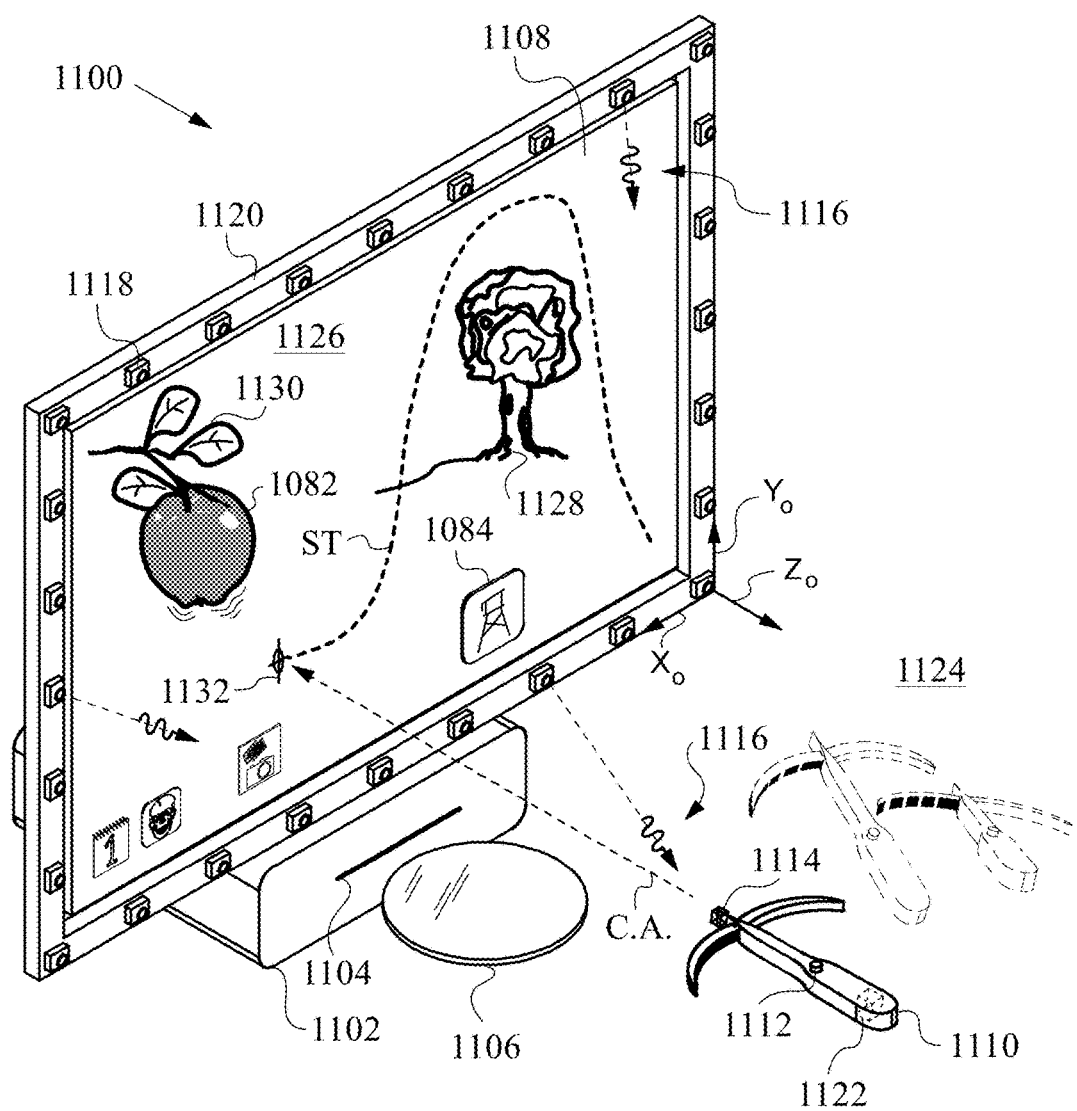
FIG. 29 is a three-dimensional diagram illustrating a media system running an image application.

FIG. 29 illustrates a media system 1100 with an electronic device 1102 that includes a receiving port 1104 for removable media 1106. Media 1106 can be of any type, including optical disks or solid state memory sticks. In the present case, media 1106 is an optical disk that holds the instructions and other necessary data for running an application "Hunter&Gatherer" 1084 from the prior embodiment. Application 1084 is an image application.

Media system 1100 has a display screen 1108, which is preferably high-resolution or high-definition and also touch sensitive. In addition, system 1100 has a remote control or wand in the shape of a game object 1110. The operation of object 1110 is equivalent to the wand. Object 1110 has a button 1112 and at least one absolute motion detection component 1114 with a photodetector such as a PSD. Component 1114 faces media system 1100 so as to receive light 1116 from light sources 1118. Light sources 1118 are modulated IR LEDs mounted in a frame 1120 that girds display 1108. An auxiliary motion detection component 1122, such as a relative motion detection component with a gyroscope and/or an accelerometer, is provided on board object 1110.

Object 1110 is operated by a user in a real three-dimensional environment 1124 in front of media system 1100 where component 1114 receives sufficient light 1116 from IR LEDs 1118. During operation object 1110 provides optical data to a controller residing in electronic device 1102 or even on-board. The controller determines the absolute pose of object 1110 and uses any subset of the absolute pose parameters to generate input for application 1084. As described above, the controller may also use relative motion data from relative motion detection component 1122. For example, controller tracks the absolute position of a reference point on object 1110, or the orientation of object 1110. Controller may also compute and keep track of derived quantities, such as the intersection of the center axis C.A. of object 1110 with screen 1108.

During application 1084, an image 1126 is displayed on screen 1108. Image 1126 contains visual elements 1182, 1128, 1130 and a sight 1132. A cursor having the image of a reticle sight 1132 is placed at the intersection of C.A. and screen 1108. The path of sight 1132 as object 1110 is moved by the user is visualized by trajectory ST. Element 1082 is the McIntosh apple found by the user in a previous search application. Element 1128 is an apple tree, and element 1130 is a visible branch of another apple tree on which McIntosh 1082 is maturing.

Application 1084 allows the user to pick apple 1082 by skillfully detaching its stem from branch 1130. This is done by aiming and shooting with object 1110. First, sight 1132 is centered on the stem, and then button 1112 is depressed to execute the shot.

Figure 30:
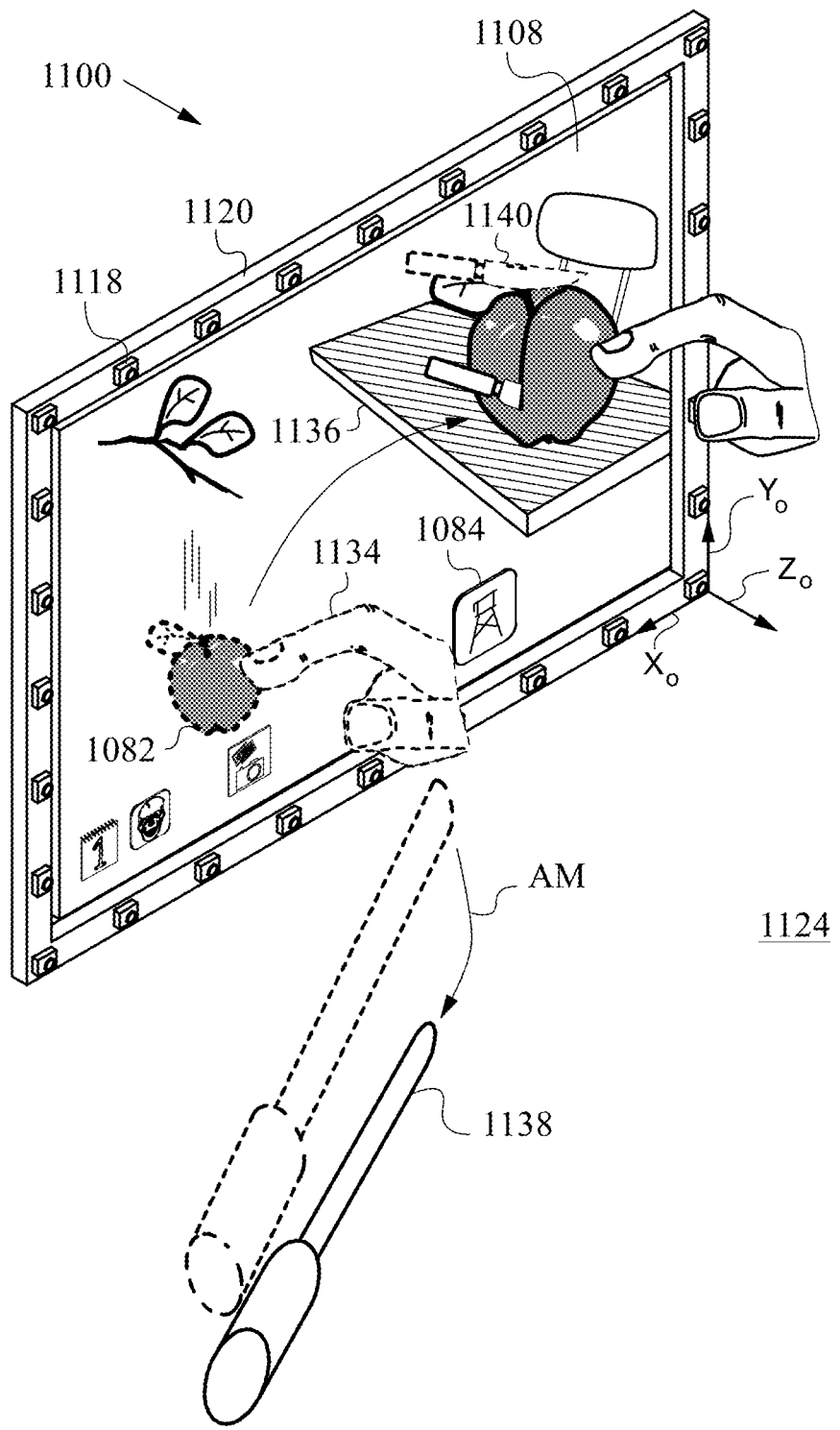
FIG. 30 is a three-dimensional diagram of a part of the media system of FIG. 29 depicting another step in the image application.

The result of a successful execution is shown in FIG. 30, where a part of media system 1100 is illustrated as apple 1082 is falling under the force of gravity simulated in the cyberspace created by application 1084. The user takes advantage of the touch sensitive aspect of screen 1108 to "catch" falling apple 1082 with finger 1134. Then, by gliding finger 1134 in a simple gesture, the user moves apple 1082 to safety on a table 1136. The user then takes another manipulated object 1138 that produces an image 1140 of a virtual knife on screen 1108. Manipulated object 1138 is preferably an optical-tracking-enabled wand such as want 1012, but in the shape of a knife in order to encourage motions correspondent to real-life motions executed with a real knife. By adroitly moving object 1138 in environment 1124, as indicated by arrow AM, the user employs virtual knife 1140 to slice and prepare apple 1082 for consumption. This completes image application 1084.

We now return to system 1010 as illustrated in FIG. 25A to elucidate a few additional advantageous implementations of the invention. This embodiment has four groups of light sources 1022 disposed in asymmetric and generally linear patterns. Namely, a first group 1022A is aligned along a first edge 1020A of display 1020. A second group 1022B is aligned along a second edge 1020B, a third group 1022C along a third edge 1020C and a fourth group 1022D along a fourth edge 1020D. Edges 1020A-D are the right, top, left and bottom edges of display 1020 in this embodiment. The IR LEDs 1022 are modulated in these four groups 1022A-D in succession.

System 1010 has a photodetector 1026 provided on-board wand 1012 for detecting light 1024. Photodetector 1026 outputs data 1028 indicative of detected light 1024.

In this embodiment, controller 1030 of system 1010 is configured to identify a derivative pattern of light sources 1022 from photodetector data 1028. The derivative pattern is indicative of the asymmetric and generally linear patterns of groups 1022A-D of IR LEDs 1022 along edges 1020A-D. As the absolute pose of photodetector 1026 in wand 1012 changes, the asymmetric and generally linear patterns undergo a well-understood transformation. Such transformation is described by perspective distortion plus any optical aberrations introduced by imaging lenses and/or other optics elements cooperating with photodetector 1026. Knowledge of this transformation enables one to correlate the asymmetric and generally linear pattern to the derivative pattern and obtain information about the pose of photodetector 1026 and hence of wand 1012.

It should be noted that in another alternative embodiment, light sources 1022 can simply reflect light. For example, they can reflect light projected from on-board a wand, as described above in conjunction with FIG. 17. Alternatively, they can reflect ambient light.

More generally, first group 1022A of light sources can be disposed proximate any edge of display 1020, at another location, or else on, near, or even beneath display 1020. In this latter case, display 1020 has to be transparent to light 1024. In fact, even certain pixels of display 1020, especially in the case of an OLED display, can serve as light sources 1022 (see embodiment described in conjunction with FIG. 18)

In the preferred embodiment of system 1010, the system is coupled to display 1020 that has first and second edges 1020A, 1020B. System 1010 also has first and second groups of light sources 1022A, 1022B. In this preferred embodiment, the first group of light sources 1022A are disposed proximate first edge 1020A of display 1020 and second group of light sources 1022B are disposed proximate second edge 1020B of display 1020. This arrangement is preferred because of the orthogonal arrangement of groups 1022A and 1022B.

Light sources 1022 can be identified or processed in triads or larger tuples, depending on the specific tracking or navigation algorithms that are employed to determine the absolute pose or position of wand 1012. It should be noted that for determination of the complete absolute pose it is preferable to consider at least four light sources 1022 in each tuple that is positioned proximate the corresponding edge of display 1020.

The apparatus and method of invention are particularly useful in ubiquitous computing environments, as well as applications that run virtual realities, augmented realities and other complex and multi-dimensional representational spaces including three-dimensional cyberspaces. Furthermore, it should be noted that the apparatus supports multiple manipulated objects such as wands or game objects cooperating in the overall system, e.g., media system, simultaneously. This enables collaboration as well as multi-player games. Further, the addition of touch-sensitive screens with multi-touch support expand the modalities in which the user can interact with the application.

A person skilled in the art will recognize that in any of the above embodiments the reference location need not be permanent. Depending on the apparatus and changes in the real three-dimensional environment the reference location can be redefined. This may happen as a part of a re-calibration process or continuously while the application is running. In still another alternative embodiment, the reference coordinates in world coordinates could be made to travel along with the location of the cursor in cyberspace. Skilled artisans understanding the nature of coordinate transformations in three-dimensional space will understand how to implement these kinds of transformations.

It will be evident to a person skilled in the art that the present invention admits of various other embodiments. Therefore, its scope should be judged by the claims and their legal equivalents.

The invention claimed is:

1. A manipulated object cooperating with a first plurality of high optical contrast features disposed in a real three-dimensional environment, said manipulated object comprising:
   a) a photodetector configured to detect said first plurality of high optical contrast features and generate photodetector data representative of the positions of said first plurality of high optical contrast features;
   b) a controller configured to identify a derivative pattern of said first plurality of high optical contrast features from said photodetector data, wherein said derivative pattern is indicative of the position of said photodetector; and
   c) at least one component selected from the group consisting of an auxiliary motion detection component, an active illumination component and a scanning component.

2. The manipulated object of claim 1, wherein said first plurality of high optical contrast features are invariant features within said real three-dimensional environment.

3. The manipulated object of claim 2, wherein said invariant features are disposed in a known pattern within said real three-dimensional environment.

4. The manipulated object of claim 1, wherein said derivative pattern is computed with at least one absolute pose recovery technique selected from the group consisting of geometric invariance, triangulation, ranging, path integration, detection of features in images and motion analysis.

5. The manipulated object of claim 4, wherein said at least one absolute pose recovery technique comprises geometric invariance computed under application of the rules of perspective geometry.

6. The manipulated object of claim 1, wherein said manipulated object is selected from the group consisting of a pointer, a wand, a remote control, a three-dimensional mouse, a game control, a gaming object, a jotting implement, a surgical implement, a three-dimensional digitizer, a digitizing stylus, a hand-held tool, a utensil, a phone, a tablet computer, a portable device, an ultra-mobile device, a PDA and a smart object.

7. The manipulated object of claim 6 deployed in an application selected from the group consisting of virtual reality and augmented reality.

8. The manipulated object of claim 1, wherein said auxiliary motion detection component is selected from the group consisting of accelerometers, gyroscopes, magnetic sensing elements, acoustic sensors and optical flow measuring units.

9. The manipulated object of claim 1, wherein said photodetector is selected from the group consisting of optical sensors, CCD sensors, CMOS sensors, sensors with an array of pixels and position-sensitive diodes.

10. A manipulated object cooperating with a first plurality of high optical contrast features disposed in a real three-dimensional environment, said manipulated object comprising:
   a) a photodetector configured to detect said first plurality of high optical contrast features and generate photodetector data representative of the positions of said first plurality of high optical contrast features;
   b) a controller configured to identify a derivative pattern of said first plurality of high optical contrast features from said photodetector data, wherein said derivative pattern is indicative of the orientation of said photodetector; and
   c) at least one component selected from the group consisting of an auxiliary motion detection component, an active illumination component and a scanning component.

11. The manipulated object of claim 10, wherein said first plurality of high optical contrast features are invariant features within said real three-dimensional environment.

12. The manipulated object of claim 11, wherein said invariant features are disposed in a known pattern within said real three-dimensional environment.

13. The manipulated object of claim 10, wherein said derivative pattern is computed with at least one absolute pose recovery technique selected from the group consisting of geometric invariance, triangulation, ranging, path integration, detection of features in images and motion analysis.

14. The manipulated object of claim 13, wherein said at least one absolute pose recovery technique comprises geometric invariance computed under application of the rules of perspective geometry.

15. The manipulated object of claim 10, wherein said manipulated object is selected from the group consisting of a pointer, a wand, a remote control, a three-dimensional mouse, a game control, a gaming object, a jotting implement, a surgical implement, a three-dimensional digitizer, a digitizing stylus, a hand-held tool, a utensil, a phone, a tablet computer, a portable device, an ultra-mobile device, a PDA and a smart object.

16. The manipulated object of claim 15, deployed in an application selected from the group consisting of virtual reality and augmented reality.

17. The manipulated object of claim 10, wherein said auxiliary motion detection component is selected from the group consisting of accelerometers, gyroscopes, magnetic sensing elements, acoustic sensors and optical flow measuring units.

18. The manipulated object of claim 10, wherein said photodetector is selected from the group consisting of optical sensors, CCD sensors, CMOS sensors, sensors with an array of pixels and position-sensitive diodes.

19. A manipulated object cooperating with a first plurality of high optical contrast features disposed in a real three-dimensional environment, said manipulated object comprising:
   a) an on-board photodetector configured to detect said first plurality of high optical contrast features and generate photodetector data representative of the positions of said first plurality of high optical contrast features;
   b) a controller configured to identify a derivative pattern of said first plurality of high optical contrast features from said photodetector data, wherein said derivative pattern is indicative of the pose of said photodetector; and
   c) at least one component selected from the group consisting of an auxiliary motion detection component, an active illumination component and a scanning component.

20. The manipulated object of claim 19, wherein said first plurality of high optical contrast features are invariant features within said real three-dimensional environment.

21. The manipulated object of claim 20, wherein said invariant features are disposed in a known pattern within said real three-dimensional environment.

22. The manipulated object of claim 19, wherein said derivative pattern is computed with at least one absolute pose recovery technique selected from the group consisting of geometric invariance, triangulation, ranging, path integration, detection of features in images and motion analysis.

23. The manipulated object of claim 22, wherein said at least one absolute pose recovery technique comprises geometric invariance computed under application of the rules of perspective geometry.

24. The manipulated object of claim 19, wherein said manipulated object is selected from the group consisting of a pointer, a wand, a remote control, a three-dimensional mouse, a game control, a gaming object, a jotting implement, a surgical implement, a three-dimensional digitizer, a digitizing stylus, a hand-held tool, a utensil, a phone, a tablet computer, a portable device, an ultra-mobile device, a PDA and a smart object.

25. The manipulated object of claim 24, deployed in an application selected from the group consisting of virtual reality and augmented reality.

26. The manipulated object of claim 19, wherein said auxiliary motion detection component is selected from the group consisting of accelerometers, gyroscopes, magnetic sensing elements, acoustic sensors and optical flow measuring units.

27. The manipulated object of claim 19, wherein said on-board photodetector is selected from the group consisting of optical sensors, CCD sensors, CMOS sensors, sensors with an array of pixels and position-sensitive diodes.

* * * * *